United States Patent
Porath et al.

(10) Patent No.: US 10,768,798 B1
(45) Date of Patent: Sep. 8, 2020

(54) GENERATING QUERY SEARCH BASED ON FIELD NAME SELECTIONS

(71) Applicant: Splunk Inc., San Francisco, CA (US)

(72) Inventors: Michael Porath, San Francisco, CA (US); Finlay Cannon, Vancouver (CA); Thomas Allan Haggie, Vancouver (CA)

(73) Assignee: SPLUNK INC., San Francisco, CA (US)

( * ) Notice: Subject to any disclaimer, the term of this patent is extended or adjusted under 35 U.S.C. 154(b) by 821 days.

(21) Appl. No.: 15/339,366

(22) Filed: Oct. 31, 2016

Related U.S. Application Data

(63) Continuation of application No. 15/276,621, filed on Sep. 26, 2016.

(51) Int. Cl.
| | |
|---|---|
| *G06F 16/00* | (2019.01) |
| *G06F 3/0484* | (2013.01) |
| *G06T 11/20* | (2006.01) |
| *G06T 11/60* | (2006.01) |
| *G06F 3/0482* | (2013.01) |
| *G06F 16/2458* | (2019.01) |

(52) U.S. Cl.
CPC ........ *G06F 3/04845* (2013.01); *G06F 3/0482* (2013.01); *G06F 3/04847* (2013.01); *G06F 16/2477* (2019.01); *G06T 11/206* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,909,642 B2* | 12/2014 | Carasso | G06F 17/271 |
| | | | 707/736 |
| 9,021,304 B2 | 4/2015 | Tonouchi | |
| 9,129,995 B2 | 9/2015 | Nakajima et al. | |
| 9,146,962 B1 | 9/2015 | Boe et al. | |
| 9,215,240 B2 | 12/2015 | Merza et al. | |
| 9,432,022 B2* | 8/2016 | Jung | H03K 3/356182 |
| 9,437,022 B2 | 9/2016 | Vander Broek | |
| 9,596,252 B2 | 3/2017 | Coates et al. | |

(Continued)

OTHER PUBLICATIONS

David Carasso, Exploring Splunk, Search Processing Language (SPL) Primer and Cookbook, Apr. 2012 (Year: 2012).*

(Continued)

*Primary Examiner* — Debbie M Le
(74) *Attorney, Agent, or Firm* — Perkins Coie LLP

(57) ABSTRACT

Embodiments are disclosed for a data analysis tool for facilitating iterative and exploratory analysis of large sets of data. In some embodiments a data analysis tool includes a graphical user interface through which an interactive set of field identifiers is displayed. Each of the listed field identifiers may reference fields associated with a set of events returned in response to a search query, the set of events including machine data produced by components within an information technology (IT) environment that reflects activity in the IT environment. In response to user selections of field identifiers included in the displayed set, a data analysis tool may cause display of manipulable visualizations based on values included in fields referenced by the selected field identifiers.

27 Claims, 60 Drawing Sheets

(56) References Cited

U.S. PATENT DOCUMENTS

| | | | |
|---|---|---|---|
| 9,740,755 B2* | 8/2017 | Lamas | G06F 16/25 |
| 9,753,909 B2 | 9/2017 | Miller et al. | |
| 9,922,099 B2 | 3/2018 | Lamas et al. | |
| 10,185,740 B2* | 1/2019 | Lamas | G06F 16/2428 |
| 10,193,775 B2 | 1/2019 | Fletcher et al. | |
| 10,235,409 B2 | 3/2019 | Miller | |
| 10,331,720 B2* | 6/2019 | Neels | G06F 16/338 |
| 10,372,722 B2* | 8/2019 | Lamas | G06F 16/25 |
| 2011/0066585 A1 | 3/2011 | Subrahmanyam et al. | |
| 2011/0099500 A1 | 4/2011 | Smith et al. | |
| 2015/0006518 A1* | 1/2015 | Baumgartner | G06F 16/248 707/723 |
| 2015/0026167 A1 | 1/2015 | Neels et al. | |
| 2015/0154269 A1 | 6/2015 | Miller et al. | |
| 2016/0092045 A1 | 3/2016 | Lamas et al. | |
| 2016/0216873 A1 | 7/2016 | Filippi et al. | |

OTHER PUBLICATIONS

U.S. Appl. No. 15/276,621 of Porath, M. et al., filed Sep. 26, 2016.
U.S. Appl. No. 15/339,286 of Porath, M. et al., filed Oct. 31, 2016.
U.S. Appl. No. 15/339,323 of Porath, M. et al., filed Oct. 31, 2016.
U.S. Appl. No. 15/339,393 of Porath, M. et al., filed Oct. 31, 2016.
U.S. Appl. No. 15/339,417 of Porath, M. et al., filed Oct. 31, 2016.
U.S. Appl. No. 15/419,969 of Porath, M. et al., filed Jan. 30, 2017.
Non-Final Office Action dated Aug. 21, 2019 for U.S. Appl. No. 15/339,323 of Porath et al., filed Oct. 31, 2016.
Non-Final Office Action dated Aug. 21, 2019 for U.S. Appl. No. 15/339,417 of Porath et al., filed Oct. 31, 2016.
Non-Final Office Action dated Jul. 23, 2019 for U.S. Appl. No. 15/276,621 of Porath et al., filed Sep. 26, 2016.
Non-Final Office Action dated Oct. 18, 2019 for U.S. Appl. No. 15/339,393 of Porath et al., filed Oct. 31, 2016.
Non-Final Office Action dated Oct. 18, 2019 for U.S. Appl. No. 15/419,969 of Porath et al., filed Jan. 30, 2017.
Non-Final Office Action dated Oct. 31, 2019 for U.S. Appl. No. 15/339,286 of Porath et al., filed Oct. 31, 2016.
Notice of Allowance dated Mar. 13, 2020 for U.S. Appl. No. 15/339,286 of Porath et al., filed Oct. 31, 2016.
Notice of Allowance dated Feb. 21, 2020 for U.S. Appl. No. 15/339,417 of Bath et al., filed Oct. 31, 2016.
Final Office Action filed on Dec. 27, 2019 for U.S. Appl. No. 15/276,621 of Porath et al., filed Sep. 26, 2016.
Notice of Allowance dated Jan. 24, 2020 for U.S. Appl. No. 15/339,323 of Porath et al., filed Oct. 31, 2016.

* cited by examiner

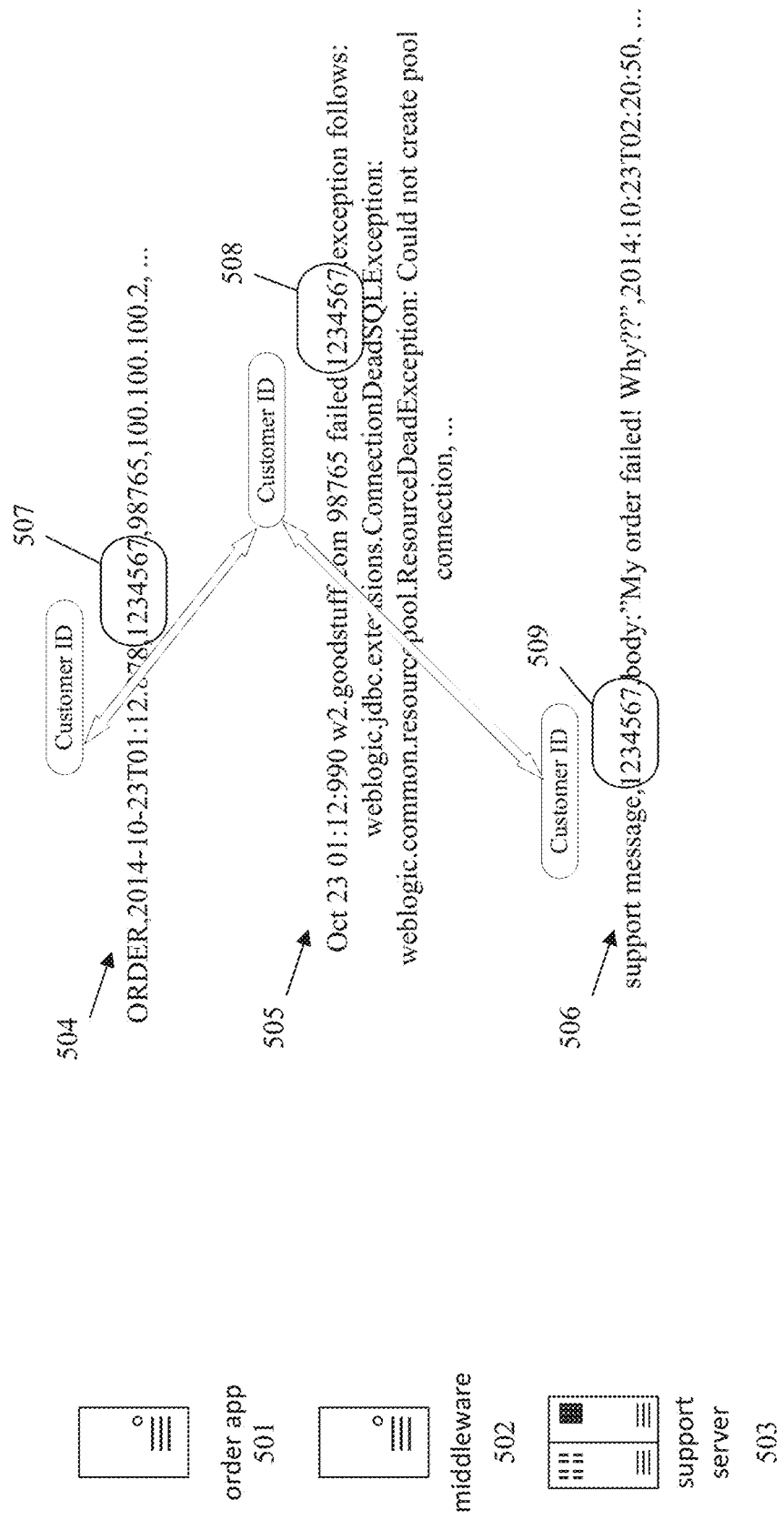

| Data Summary | | | |
|---|---|---|---|
| Hosts (5) | Sources (8) | Sourcetypes (3) | |
| *filter* | | | |
| Host | | Count | Last Update |
| mailsv | | 9,839 | 4/29/14 1:32:47.000 PM |
| vendor_sales | | 30,244 | 4/29/14 1:32:46.000 PM |
| www1 | | 24,221 | 4/29/14 1:32:44.000 PM |
| www2 | | 22,595 | 4/29/14 1:32:47.000 PM |
| www3 | | 22,975 | 4/29/14 1:32:45.000 PM |

GENERATING QUERY SEARCH BASED ON FIELD NAME SELECTIONS

CROSS-REFERENCE OF RELATED APPLICATIONS

The present application is a Continuation of U.S. patent application Ser. No. 15/276,621, filed on Sep. 26, 2016, entitled "FIELD ANALYZER FOR EVENT SEARCH SCREEN", which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least one embodiment of the present disclosure pertains to information organization and understanding, and more particularly, to generating and displaying visualizations of event data (e.g. machine-generated event data) for analysis.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system or other information technology environment. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

One or more embodiments of the present disclosure are illustrated by way of example and not limitation in the figures of the accompanying drawings, in which like references indicate similar elements.

FIG. 5 illustrates a scenario where a common customer ID is found among log data received from three disparate sources in accordance with the disclosed embodiments;

FIG. 6B illustrates a data summary dialog that enables a user to select various data sources in accordance with the disclosed embodiments;

FIG. 32 shows a screen capture of an example search screen that is displayed in response to a request to view a visualization generated by the data analysis tool in search in accordance with the disclosed embodiments.

DETAILED DESCRIPTION

Figure 1:
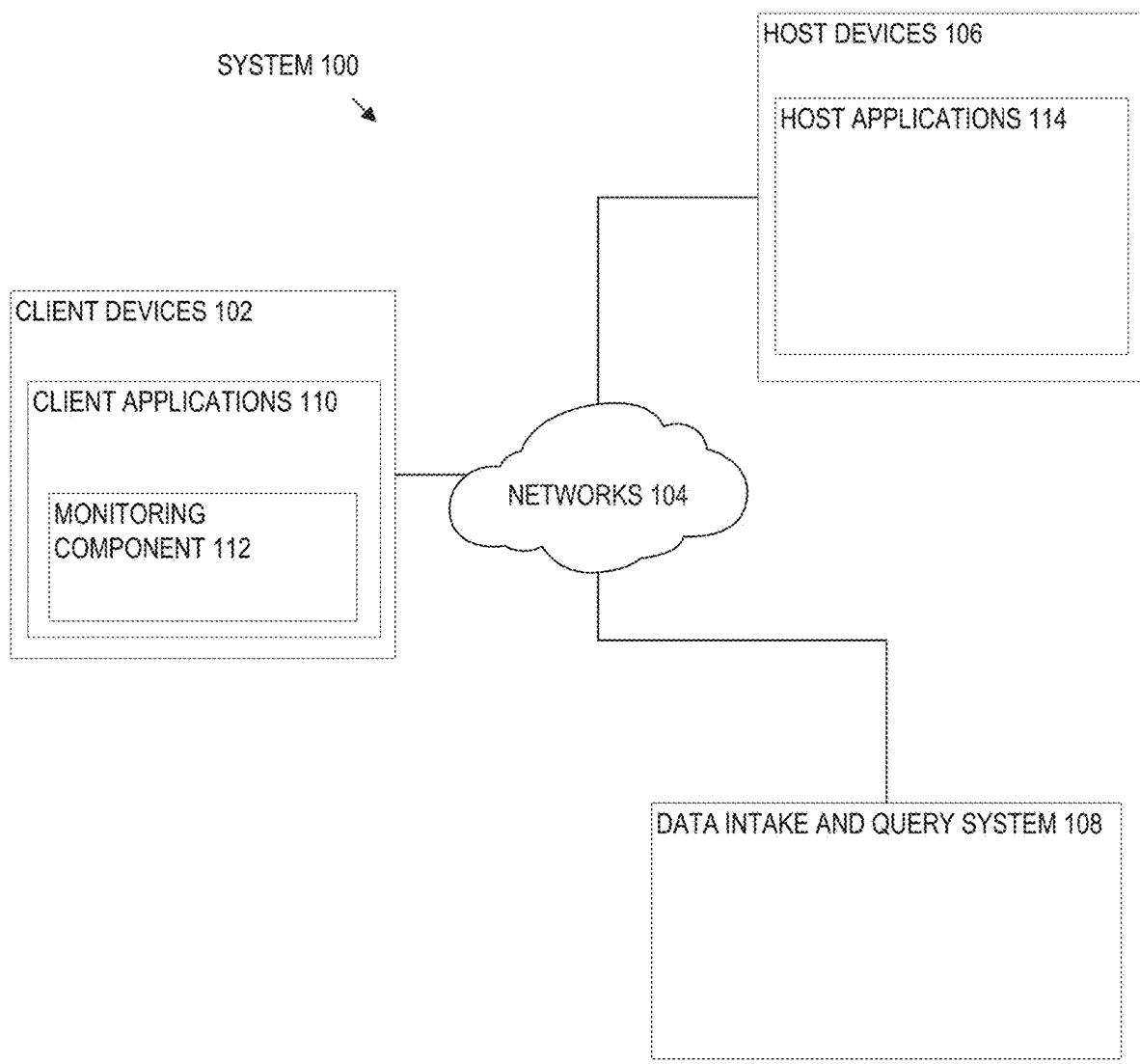
FIG. 1 illustrates a networked computer environment in which an embodiment may be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Table of Contents

Embodiments are described herein according to the following outline:
1.0. General Overview
  1.1 Overview of Data Analysis Tool
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7. Field Extraction
  2.8. Example Search Screen
  2.9. Data Modelling
  2.10. Acceleration Techniques
    2.10.1. Aggregation Technique
    2.10.2. Keyword Index
    2.10.3. High Performance Analytics Store
    2.10.4. Accelerating Report Generation
  2.11. Security Features
  2.12. Data Center Monitoring
  2.13. Cloud-Based System Overview
  2.14. Searching Externally Archived Data
    2.14.1. ERP Process Features
  2.15. IT Service Monitoring
3.0. Data Analysis Tool
  3.1. Data Analysis Tool Processes
  3.2. Data Analysis Tool Graphical User Interfaces
4.0. Computer Processing System 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

1.1. Overview of Data Analysis Tool

In general, many existing tools for analyzing data rely on a structured data sources. Aforementioned techniques for ingesting and searching machine data provide powerful tools for analyzing what is in some cases unstructured data and gaining insights into the underlying activities described in the data. For example, technical users that are well-versed in other query languages can develop proficiency, with relative ease, in a query language such as SPL (Splunk Processing Language) (described in more detail herein) that utilizes a late-binding schema for searching what is in some cases raw unstructured data. This ability enables the user to continue investigating to learn valuable insights about the raw data that may not be initially evident. However, due to its complexity, a query language such as SPL can be difficult to adopt for both non-technical users as well as data-savvy users that do not typically work in reactive settings. Such users will inevitably resort to using other tools for data analysis that often do not provide access to underlying data that is indexed and available.

Further, reporting tools used for generating highly-customizable visualizations can be effectively utilized as a next step in a workflow after analysis is completed, but are not otherwise not well suited to facilitating exploratory analysis of large amounts of data. Existing techniques for reporting and visualizing data, even those built upon the foundational techniques for late-binding schema, often require that a user have some sort of pre-existing operational insight to guide in defining the report or visualization to be produced. Without this pre-existing insight, reporting tools can prove cumbersome as the user is left to iteratively redefine parameters on their own, for example by modifying underlying searches, changing visualization types, rearranging visualizations, etc.

Introduced herein are techniques for facilitating iterative and exploratory analysis of data that address the aforementioned problems with existing techniques. Examples of a data analysis tool, and associated graphical user interfaces, are described herein in the context of facilitating analysis of values included in fields associated with a set of events in a data set. In this sense, the "data analysis tool" may be referred to in some instances as a "field analysis tool" or "field analyzer." However, the innovations described herein are not limited to the analysis of fields in a data set. A person having ordinary skill will recognize that the innovations described in the disclosed embodiments can similarly be applied to other data analysis applications.

In an embodiment a data analysis tool is described that can cause display to a user, via a graphical user interface (GUI), a set of selectable field identifiers (e.g. field names) that reference fields that occur in a set of events in a data set, for example returned in response to an initial search query. Through the GUI, a user can select one or more of the field identifiers from the displayed list of field identifiers. In response, the data analysis tool can automatically cause display of a manipulable visualization based on values included in the one or more fields referenced by the one or more selected field identifiers.

In some cases, displayed visualizations case be based on aggregations and splits of the values included in the selected fields. In other words, values representing numerical measures can be summarized for visualization using defined aggregation functions (sum, average, median, 95th percentile, etc.). Visualizations of these aggregated measures can also be split according to values representing categorical dimensions, thereby creating juxtaposed plots, graphs, charts, etc. of aggregated measures for each value of a given dimension. For example, a log of credit card transactions may include a measure (i.e. a field) called "amount" that includes numerical values. The log may also include categories such as "month" and "country" (also both fields) that include categorical values (represented either numerically or literally). Based on this schema, a user can select one or more of the field identifiers displayed in the set of field identifiers to automatically cause display of a visualization based on any of the following example aggregations/split combinations:

sum of all transaction amounts across a time range
sum of all transaction amounts per day of a selected month
average transaction amount per country
average transaction amount per country for each day of the month Certain options for re-configuring the arrangement of a generated visualization can be presented to a user. For example, an option to modify the juxtaposition of categorical splits in a given visualization can be presented to a user to aid in analysis. However, in general, the process of generating a visualization can be performed automatically and in the background, for example in response to user field selections. Defining each visualization is not presented as a focus to the user, thereby allowing the user to iteratively explore the data and arrive at serendipitous insights. For example, consider again the log of credit card transactions. Given this data set, the data analysis tool may cause display to the user of a set of field names that reference fields that occur in the data set (amount, year, month, day, time, country, city, issuing bank, balance, etc.). In response to the user simply selecting the "amount" field and the "country" field, the data analysis tool may automatically cause display of a bar chart that charts the average transaction amount split in each of several countries. If the user then additionally selects the "month" field, the visualization may automatically and dynamically update to reflect multiple bar charts showing the average transaction amount per country during each day of a particular month. In some embodiments, decisions made by the analysis tool selecting certain visualization parameters (e.g. type, arrangement, scale, axes, splits, etc.) may be based at least in part on heuristic techniques to generate visualizations intended to provide human insight given a limited number of user inputs (e.g. one or more field selections).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
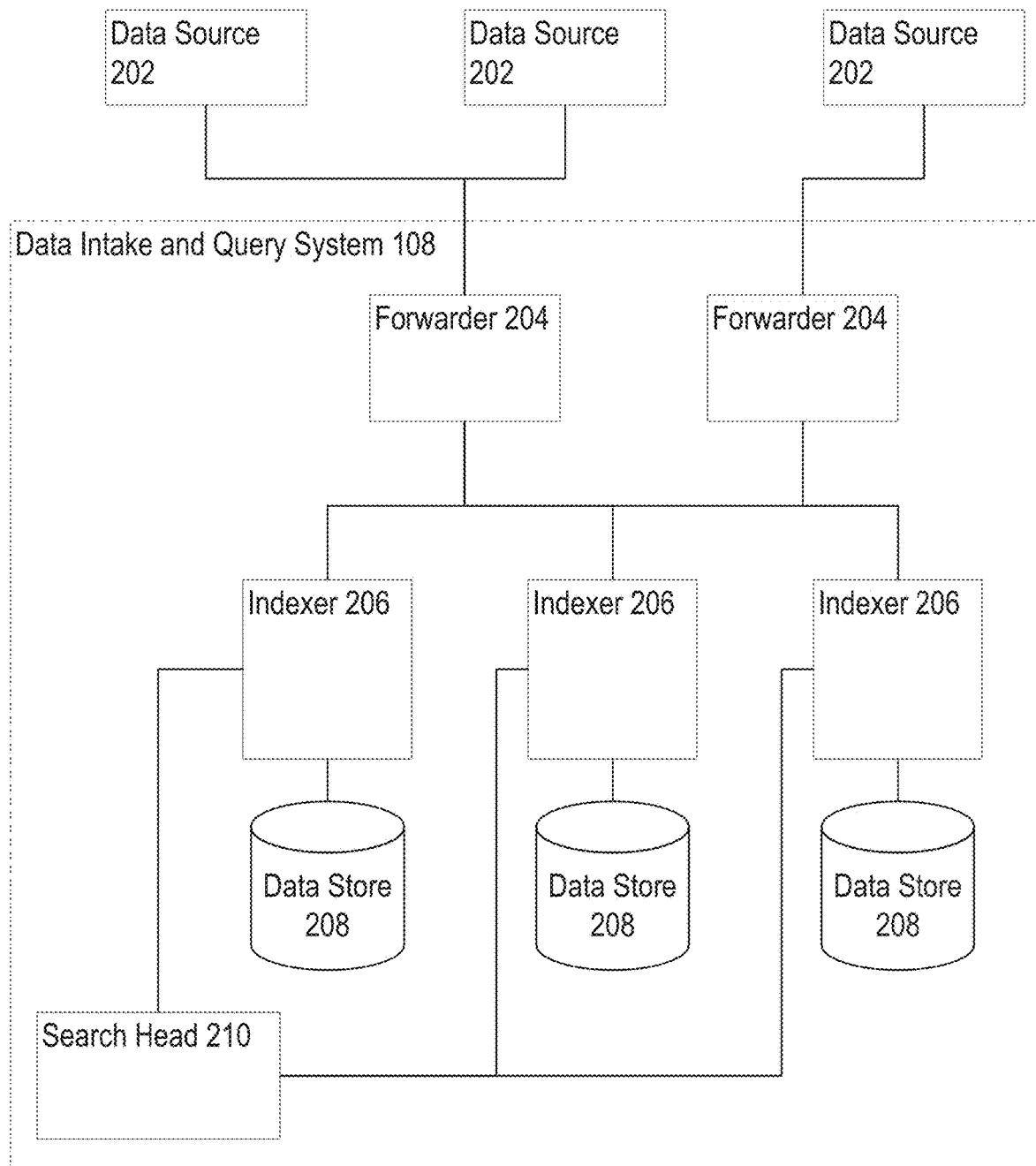
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
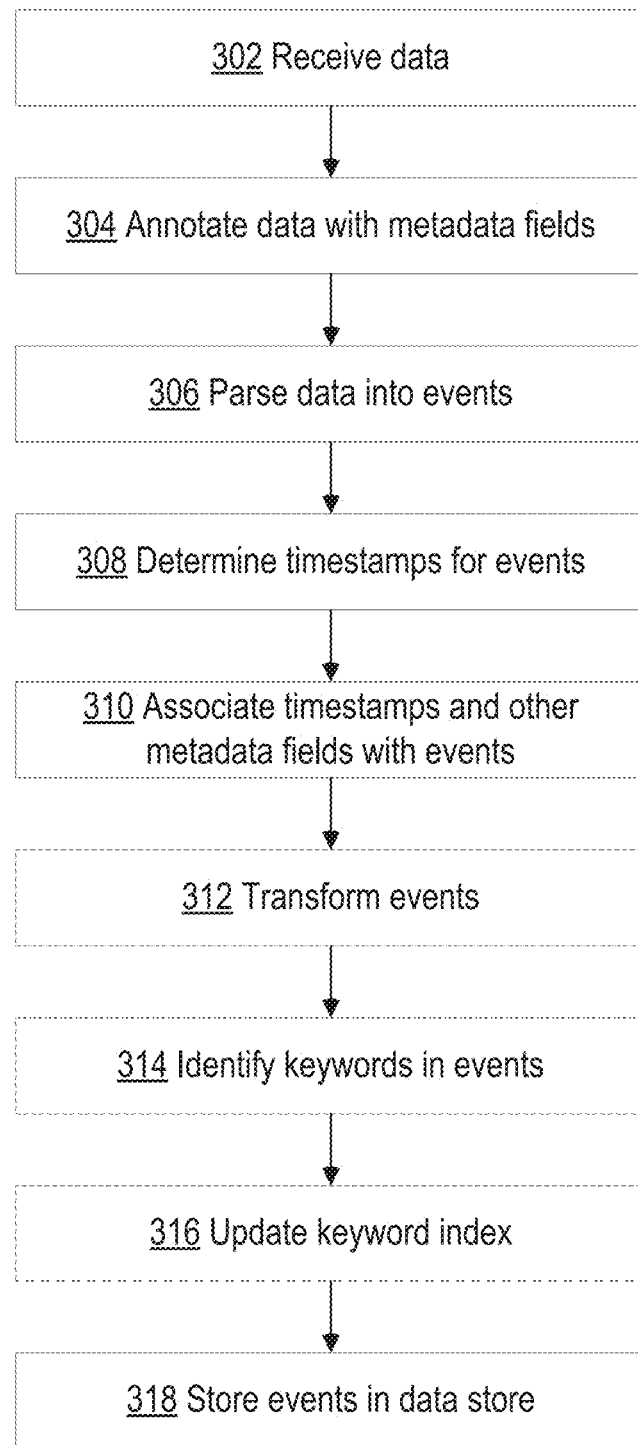
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING" also filed on 30 Apr. 2014, each of which is hereby incorporated by reference in its entirety for all purposes.

2.6. Query Processing

Figure 4:
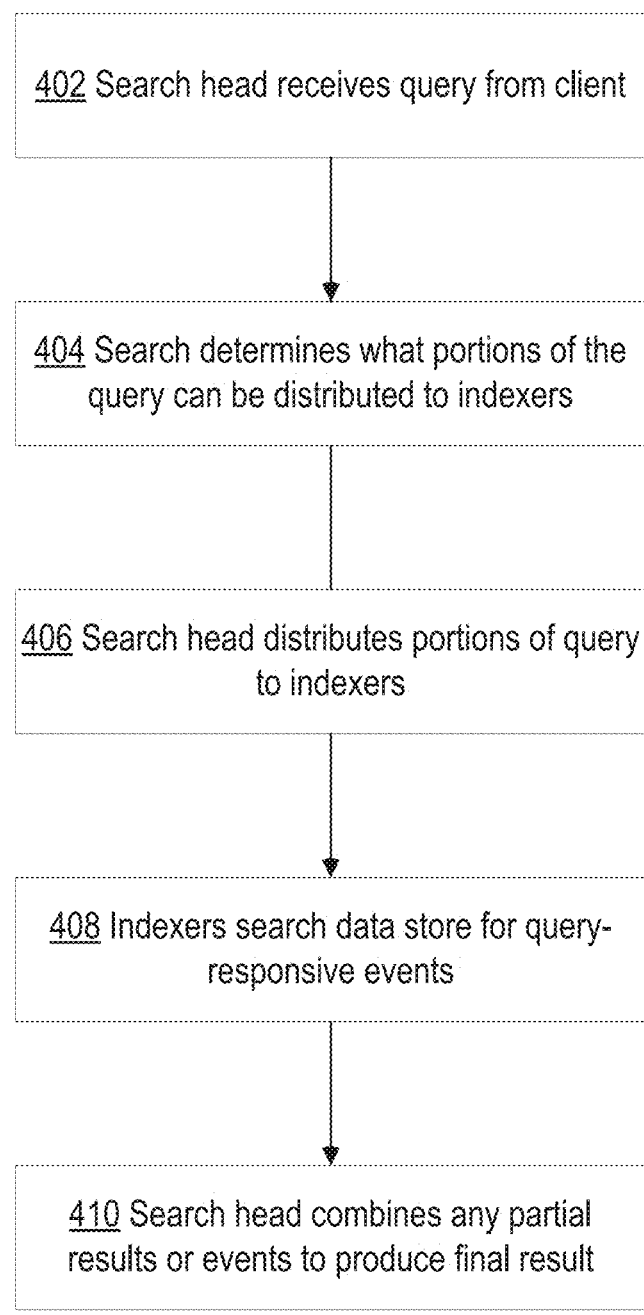
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7 Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
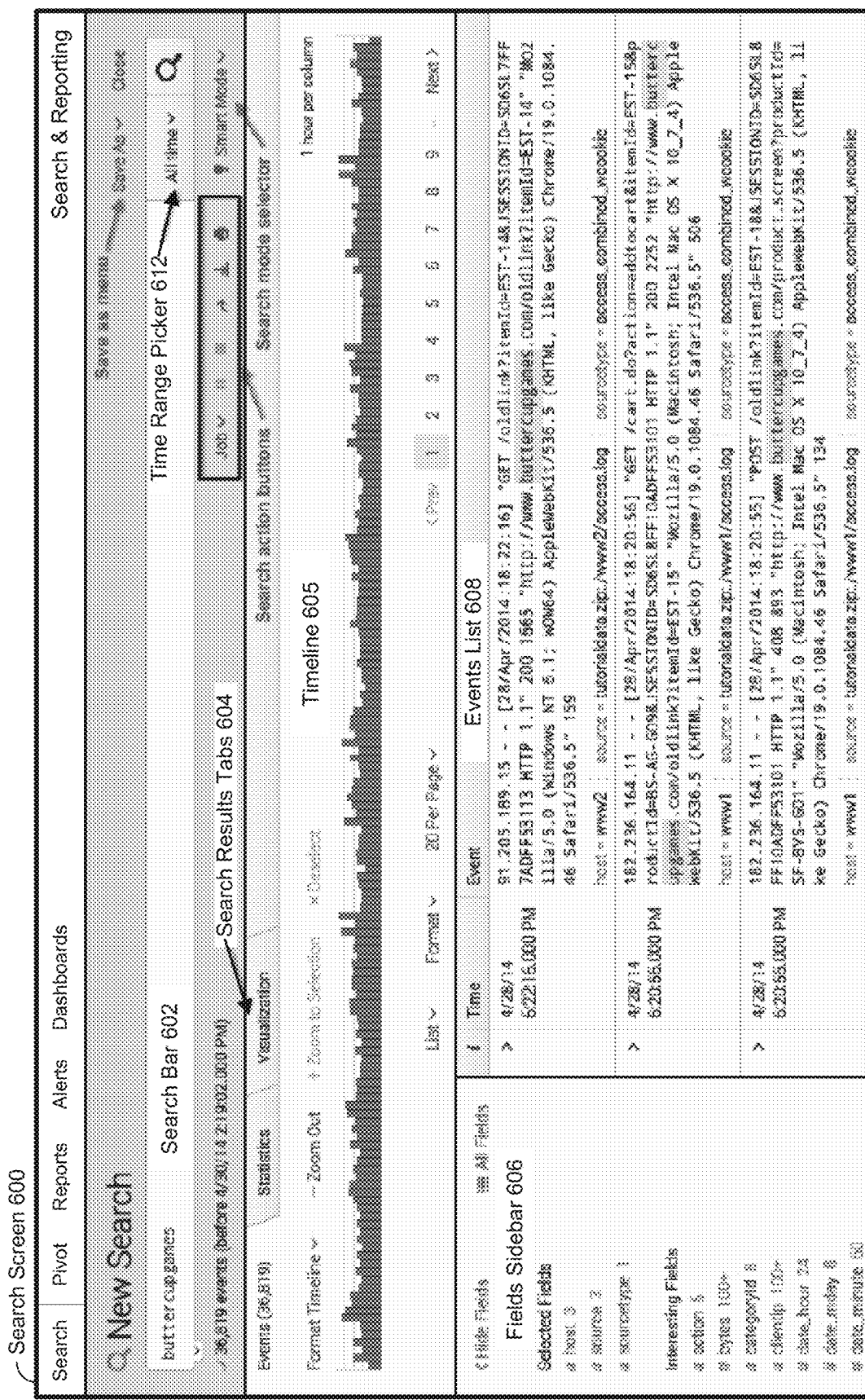
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
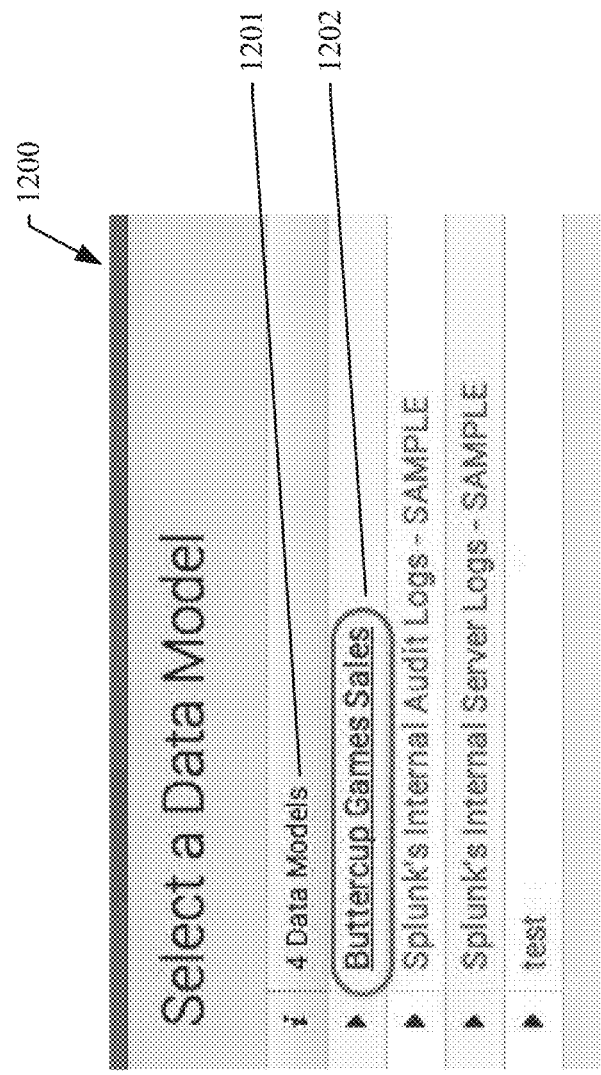
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
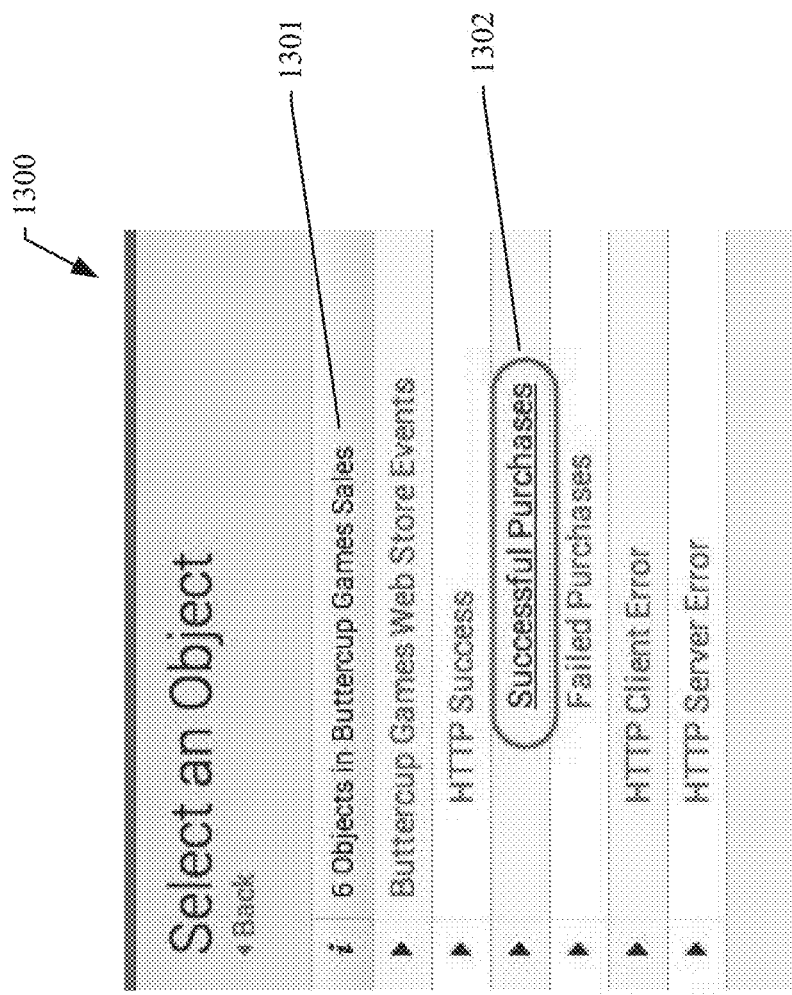

FIG. 13 illustrates an example data model object selection graphical user interface 1300 that displays available data objects 1301 for the selected data object model 1202. The user may select one of the displayed data model objects 1302 for use in driving the report generation process.

Figure 7A:
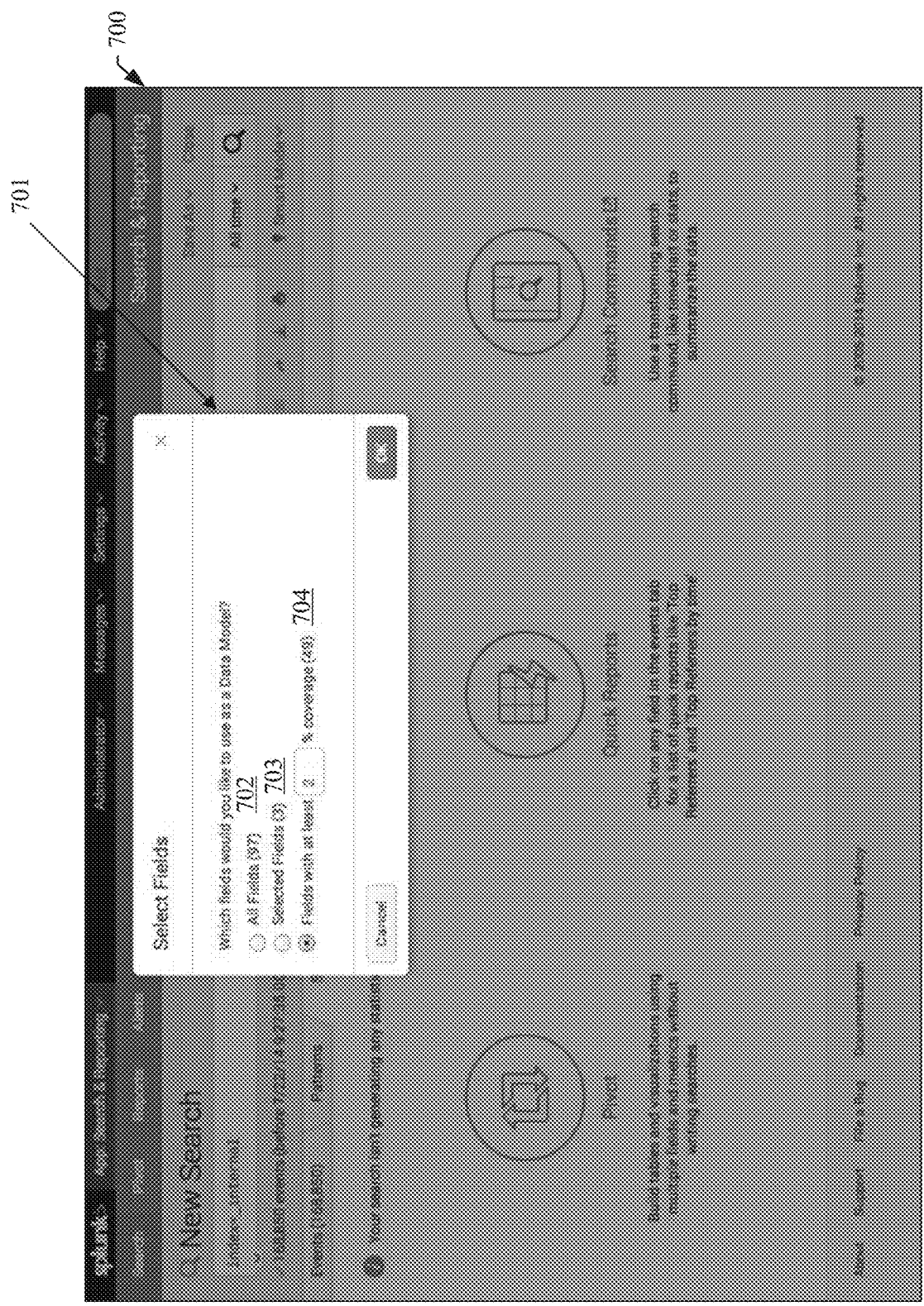
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
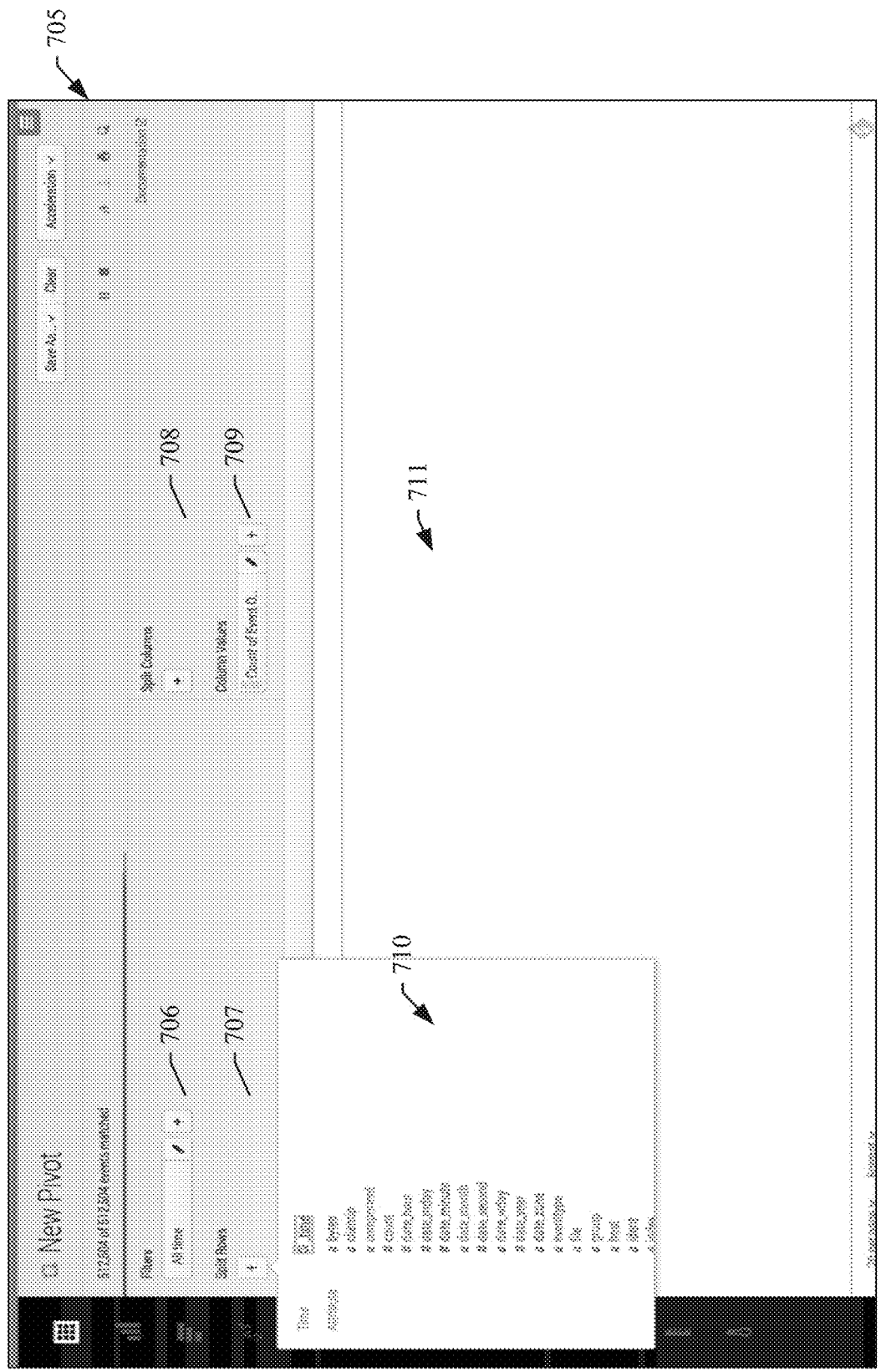
Figure 7C:
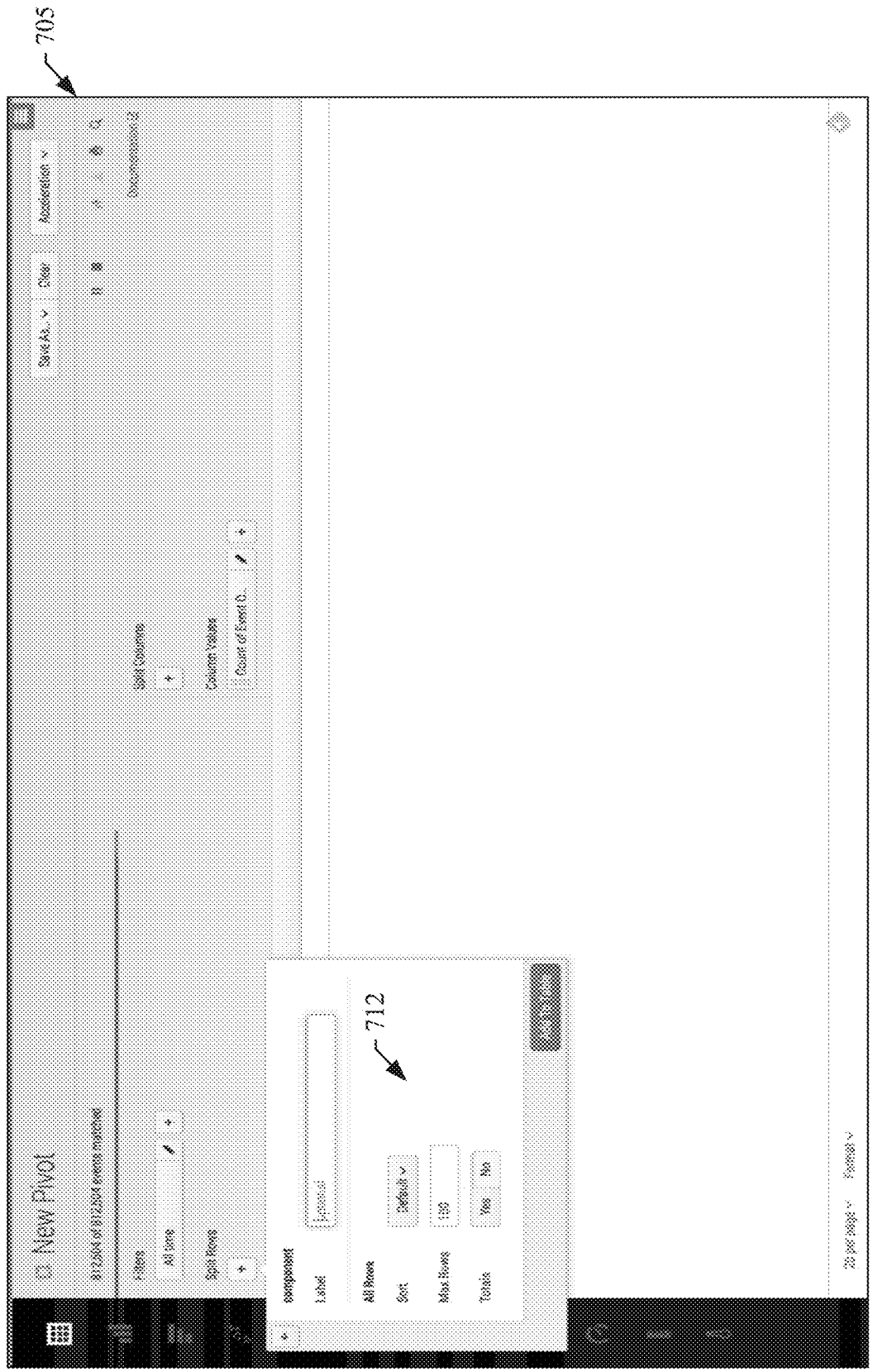

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
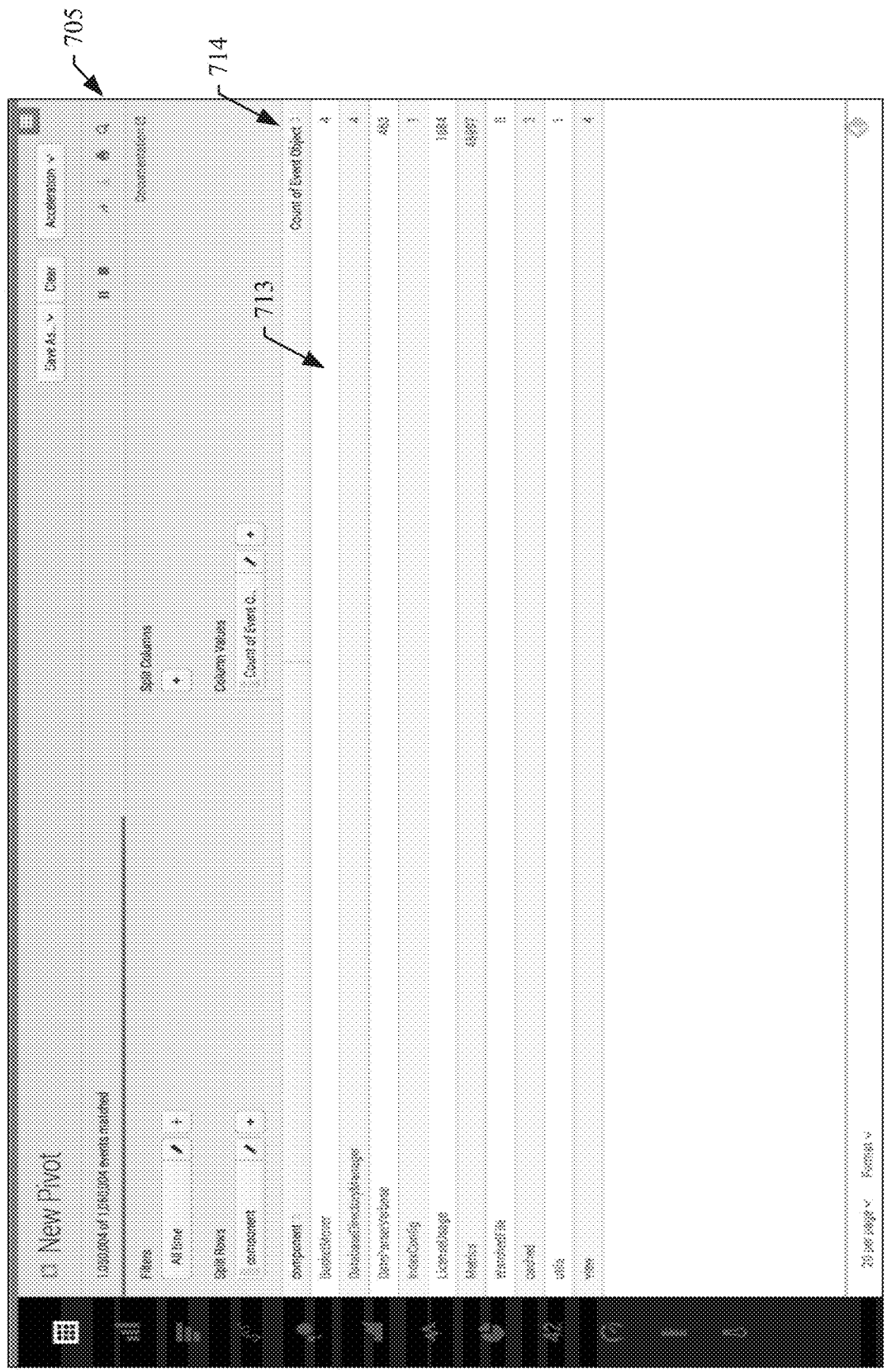

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
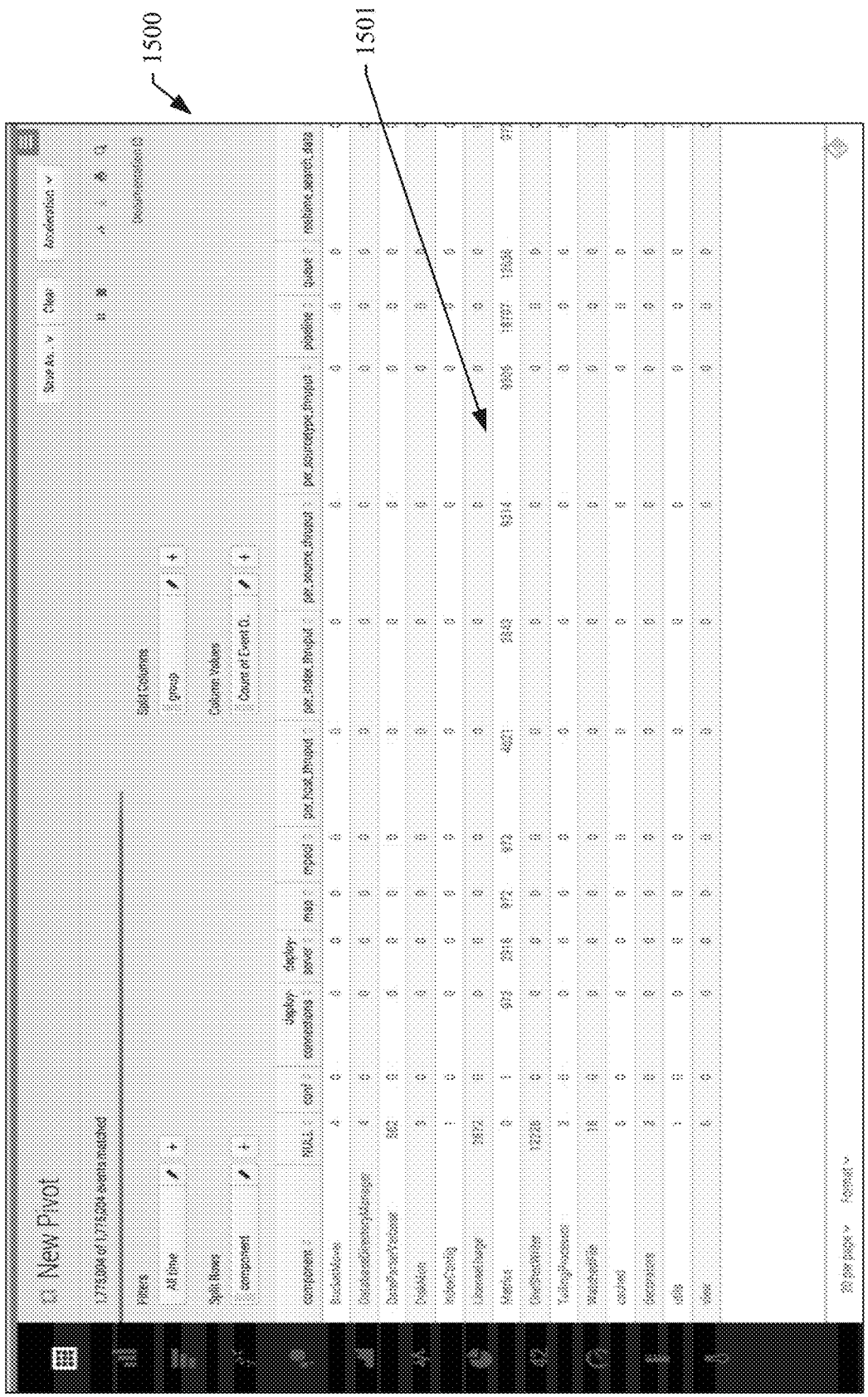
FIGS. 15-17 illustrate example visualizations generated by a reporting application in accordance with the disclosed embodiments.
Figure 16:
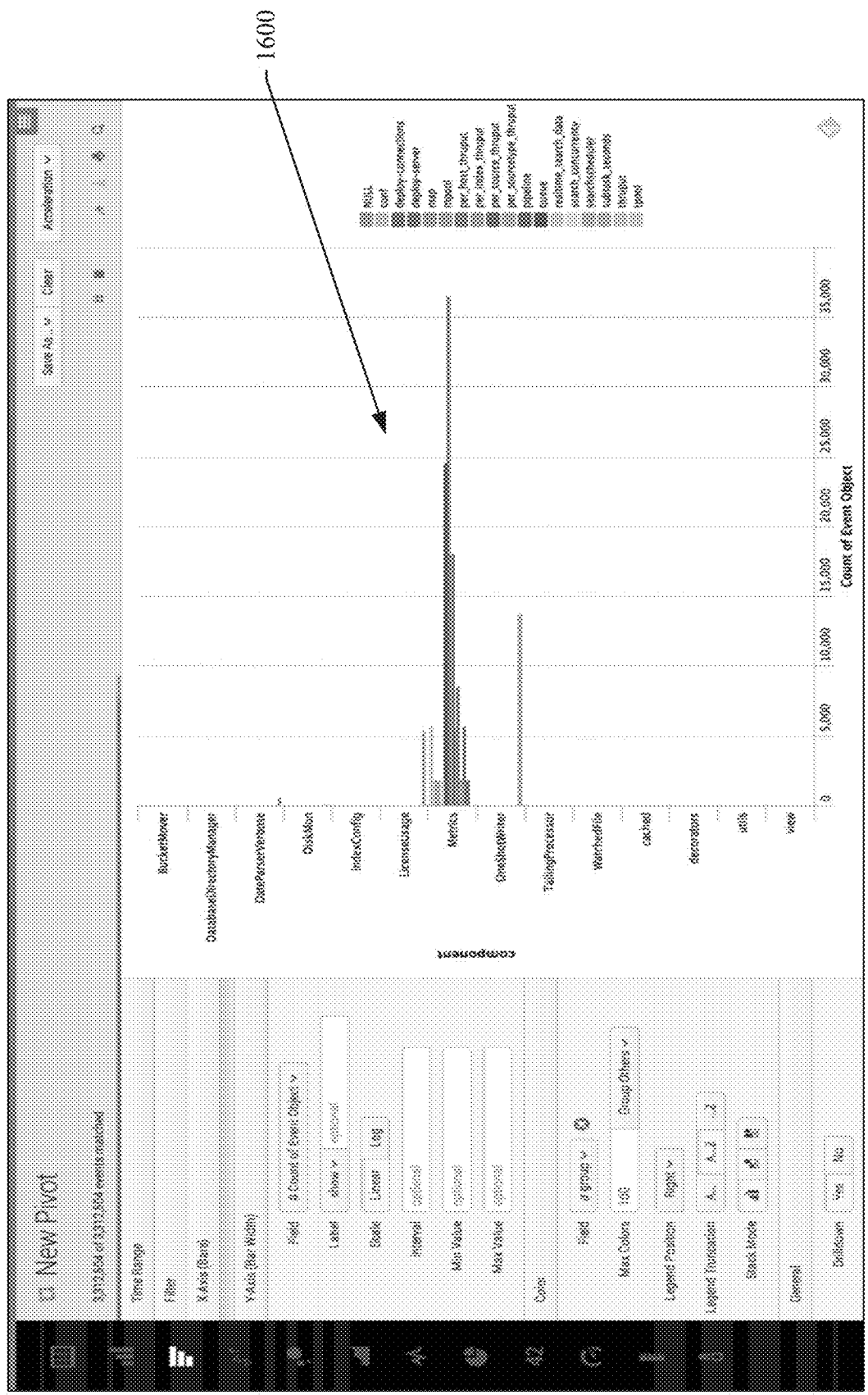
Figure 17:
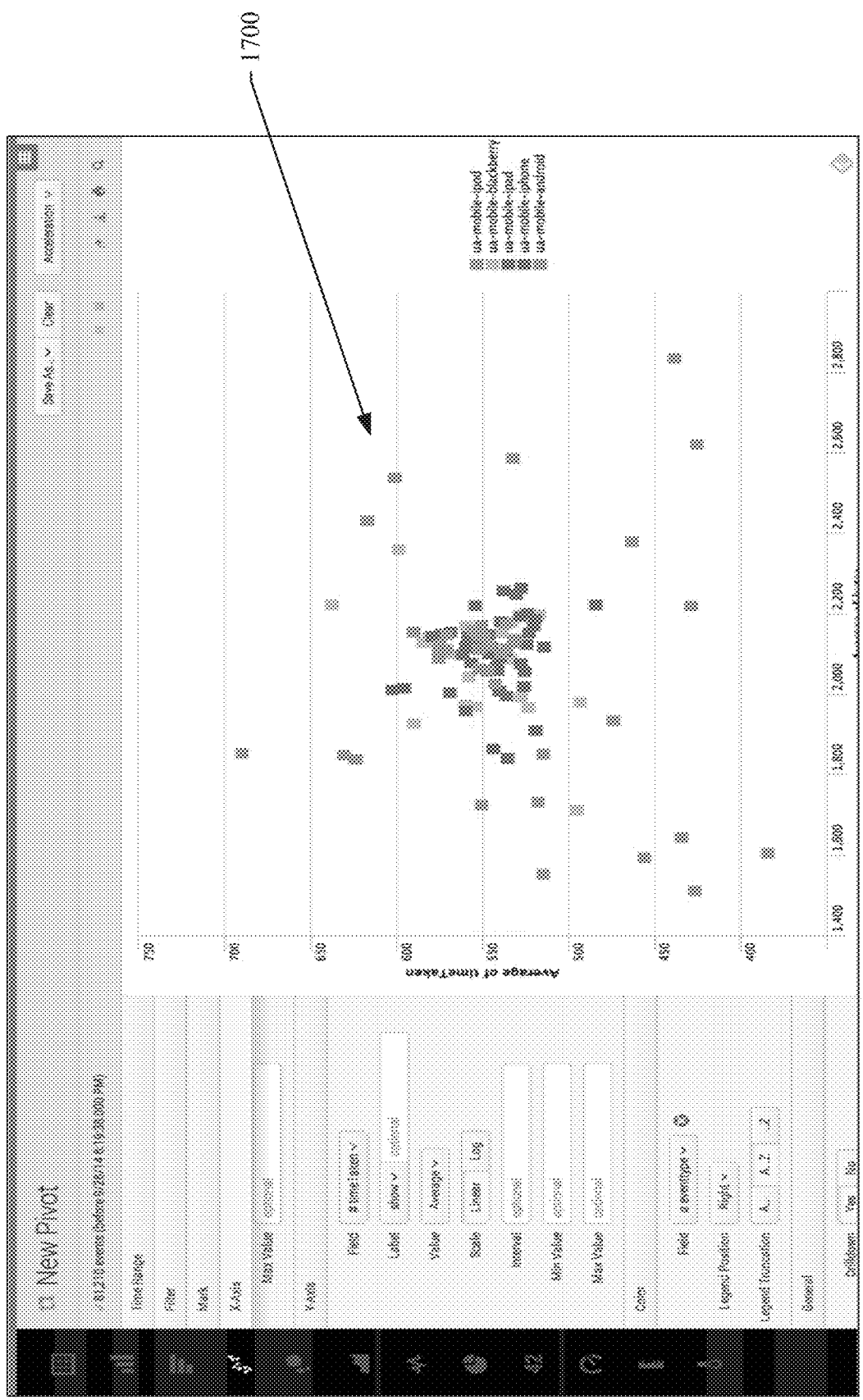

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Techniques

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
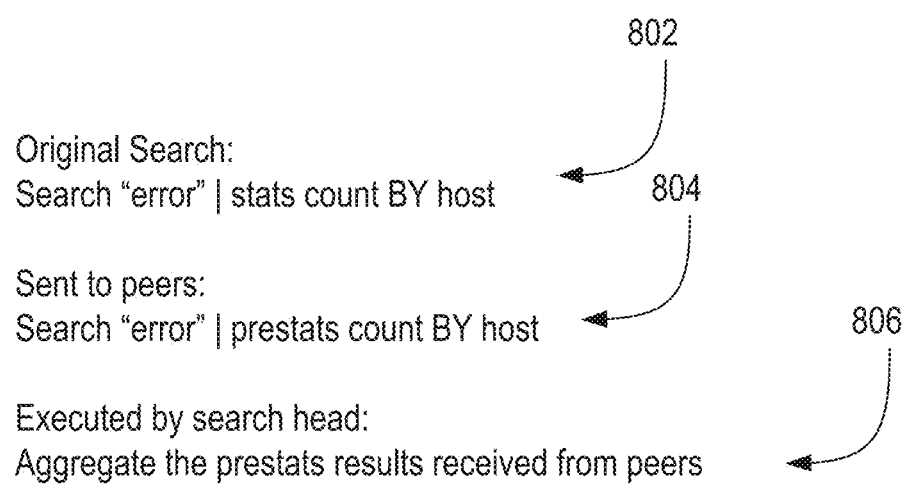
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High-Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
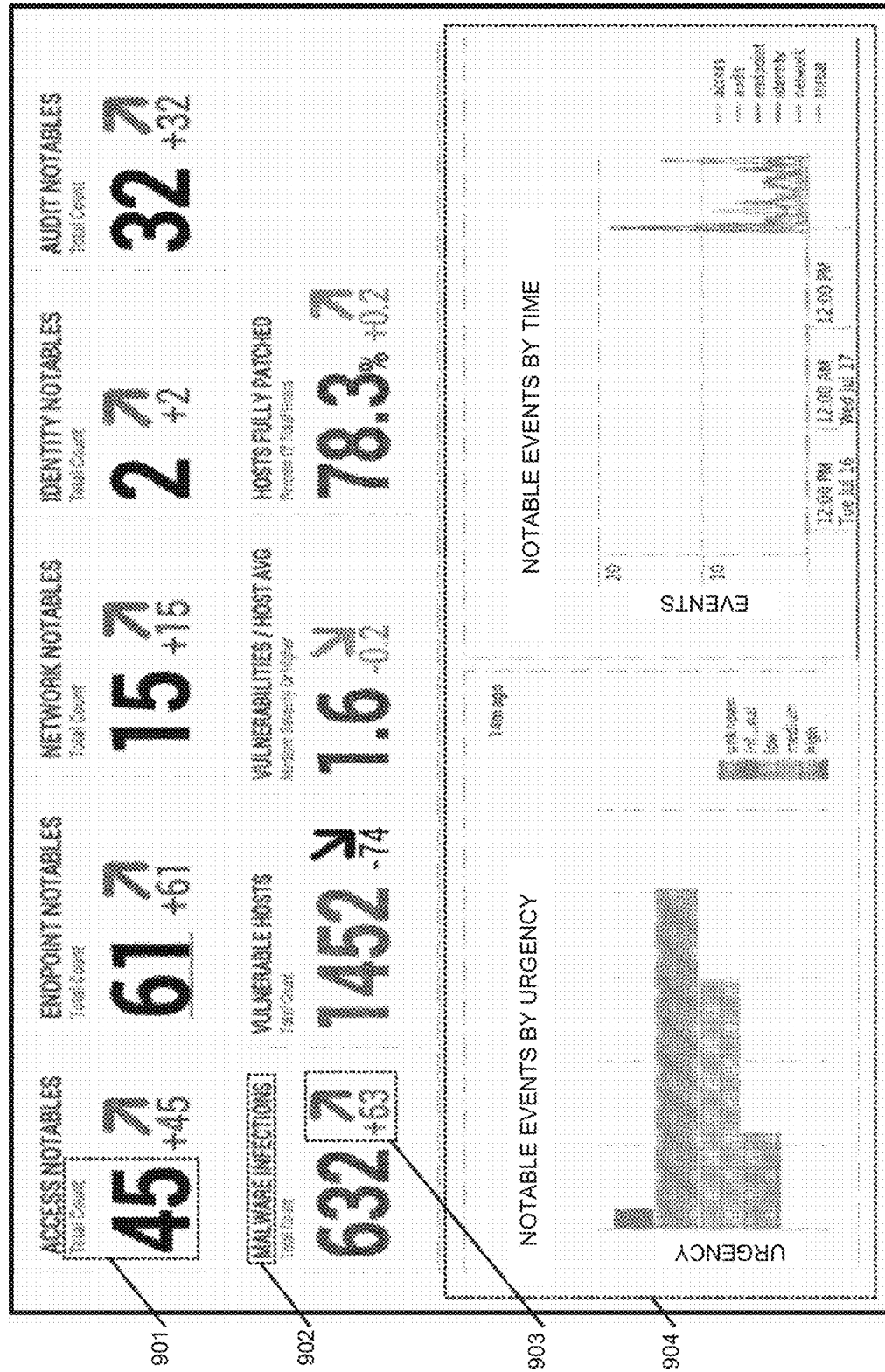
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
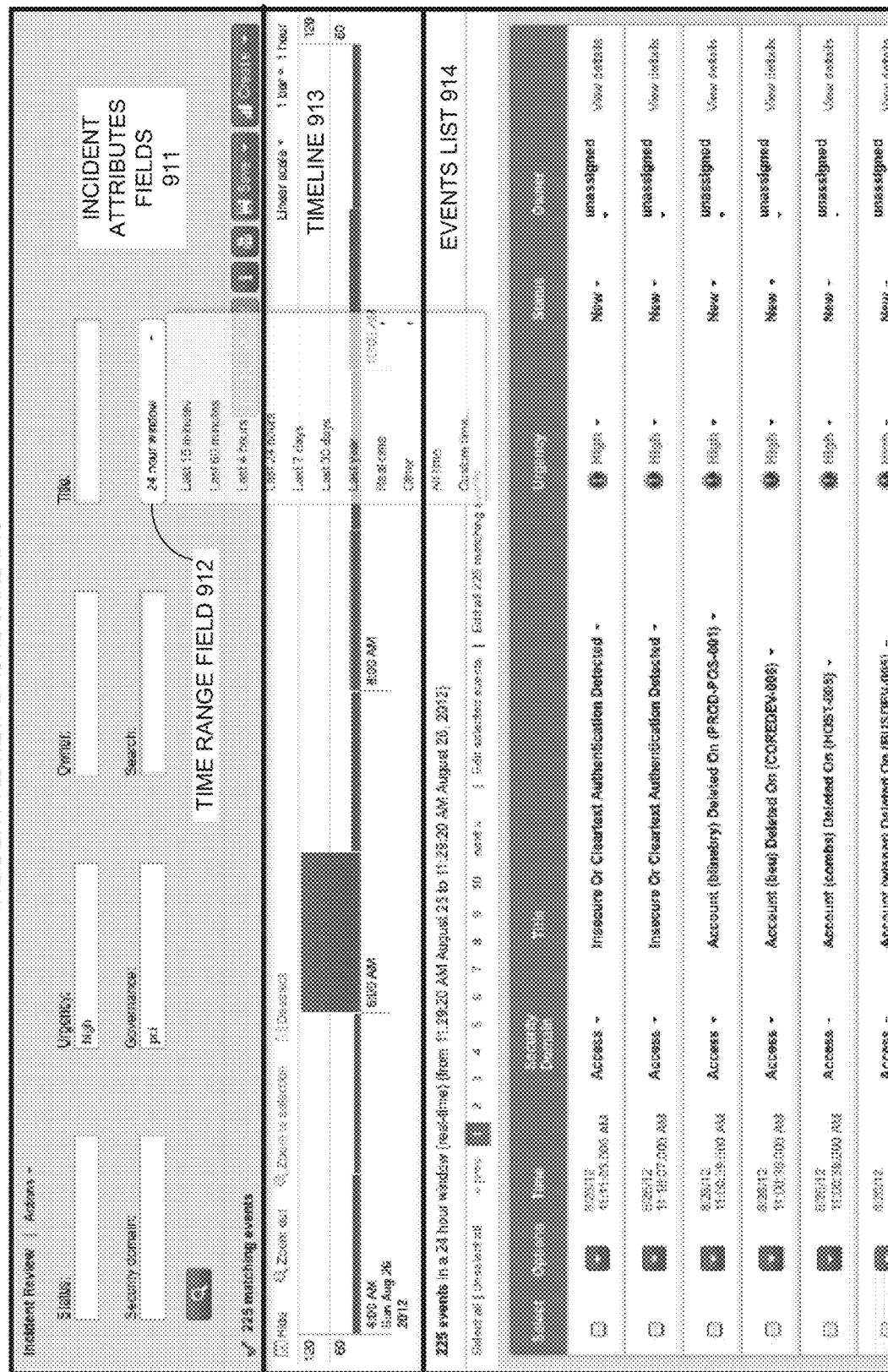
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
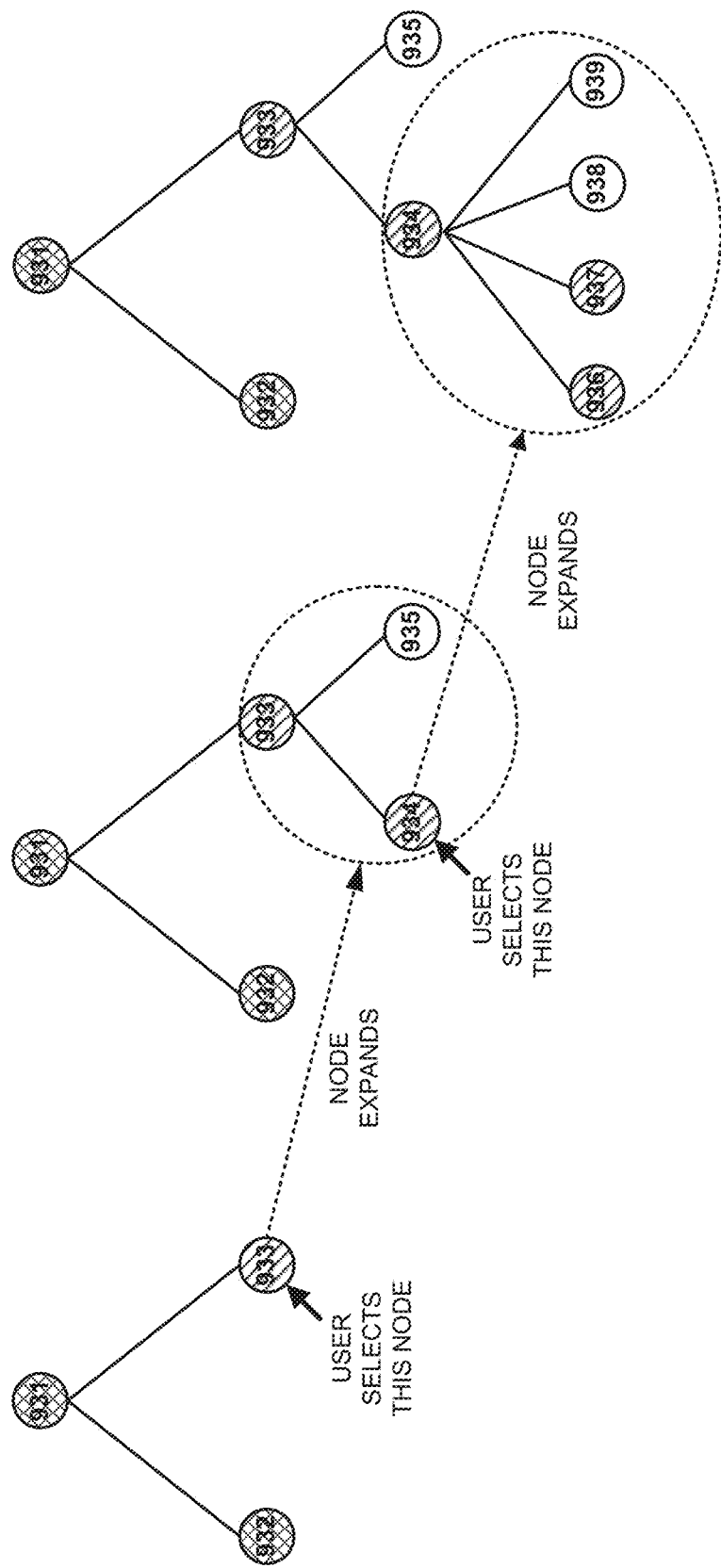
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
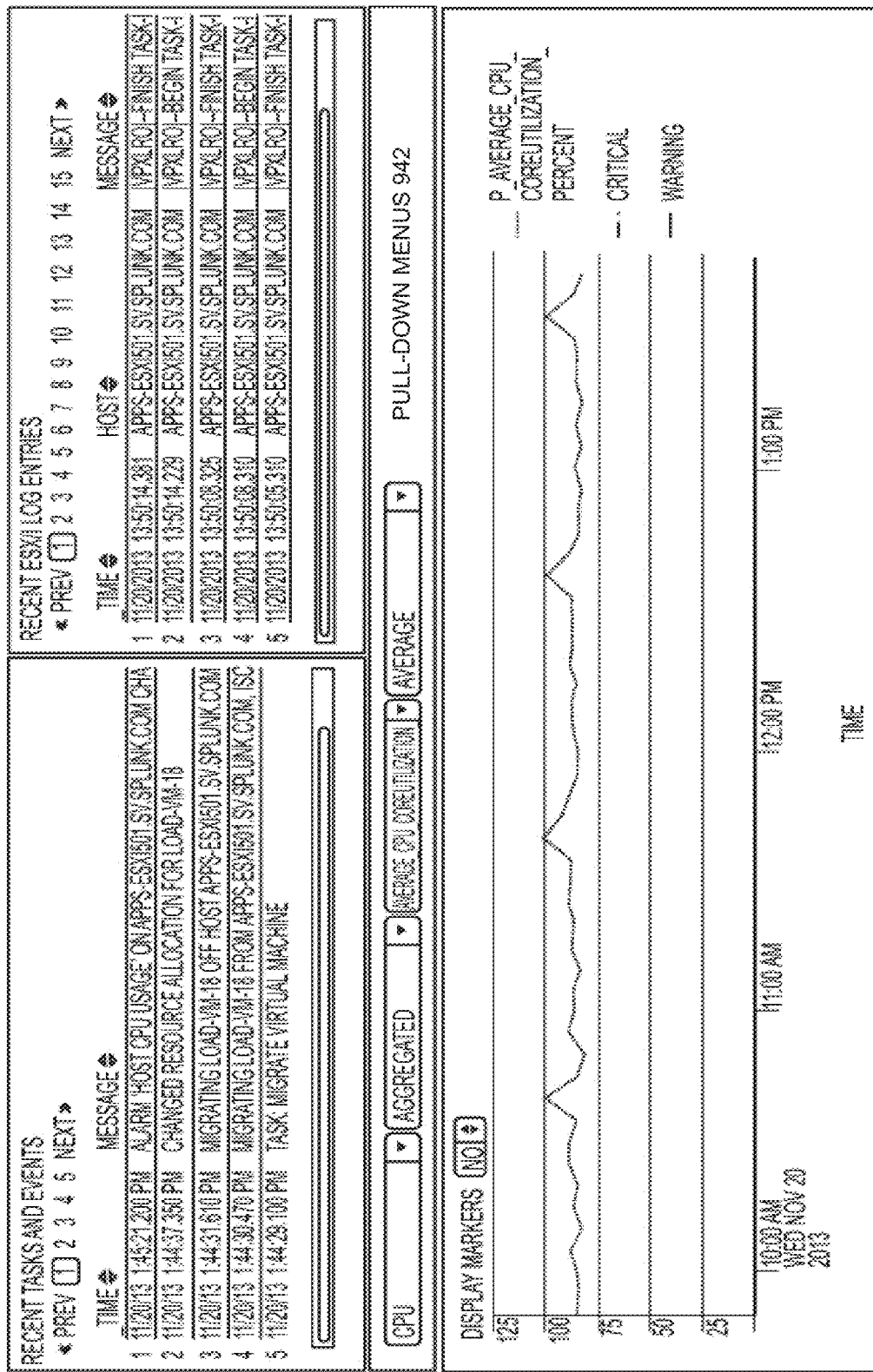
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
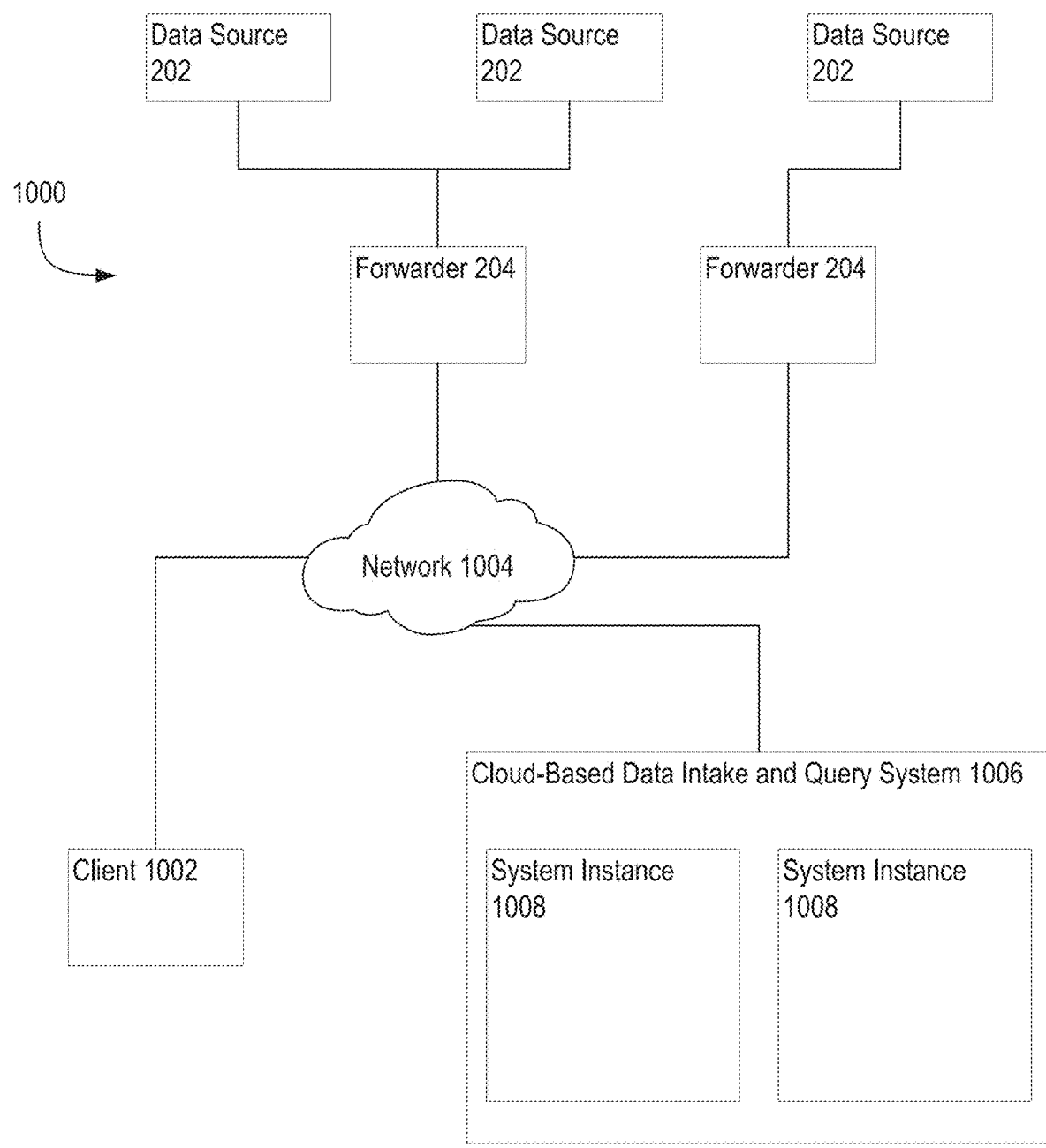
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
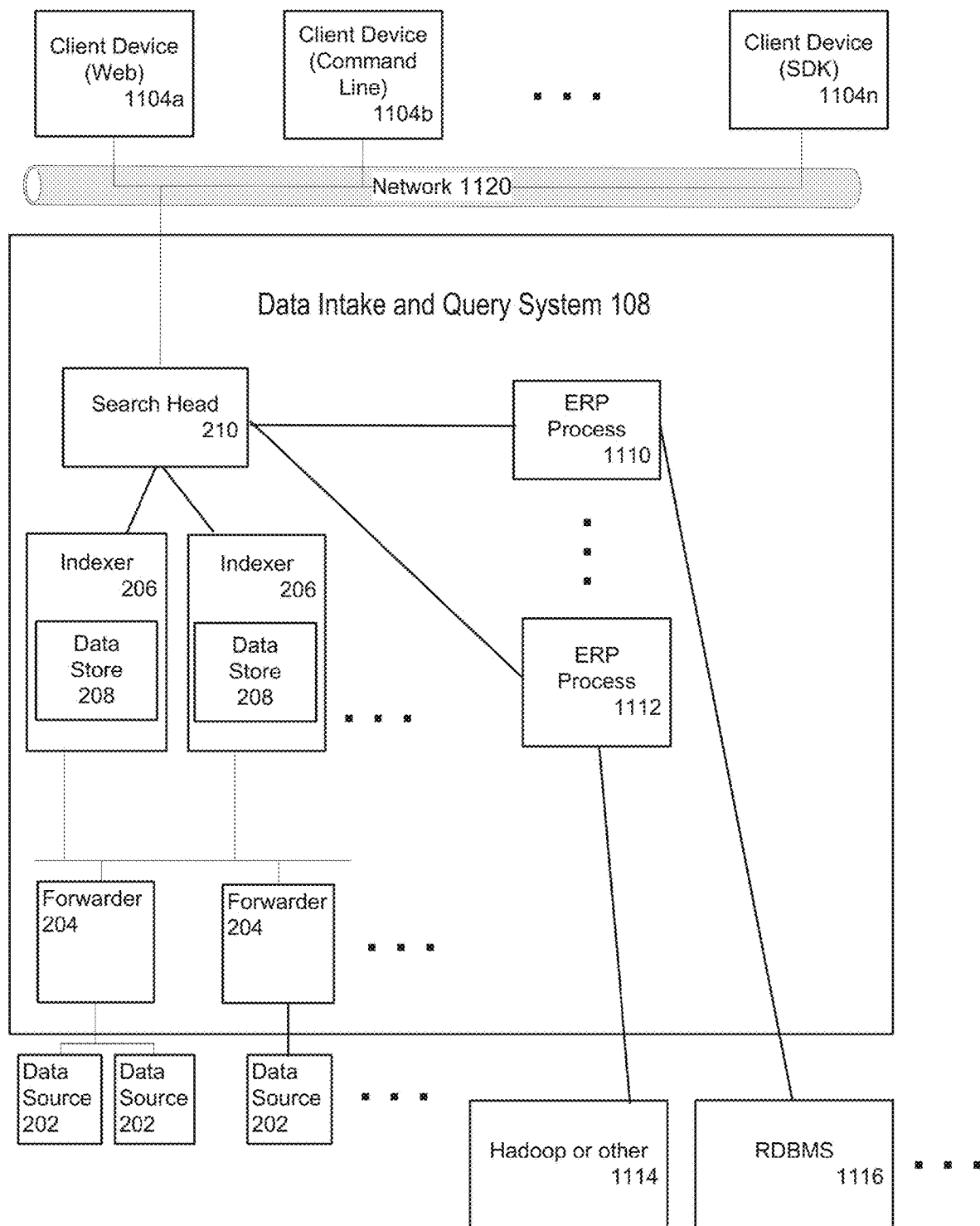
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.15. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Data Analysis Tool

Figure 18A:
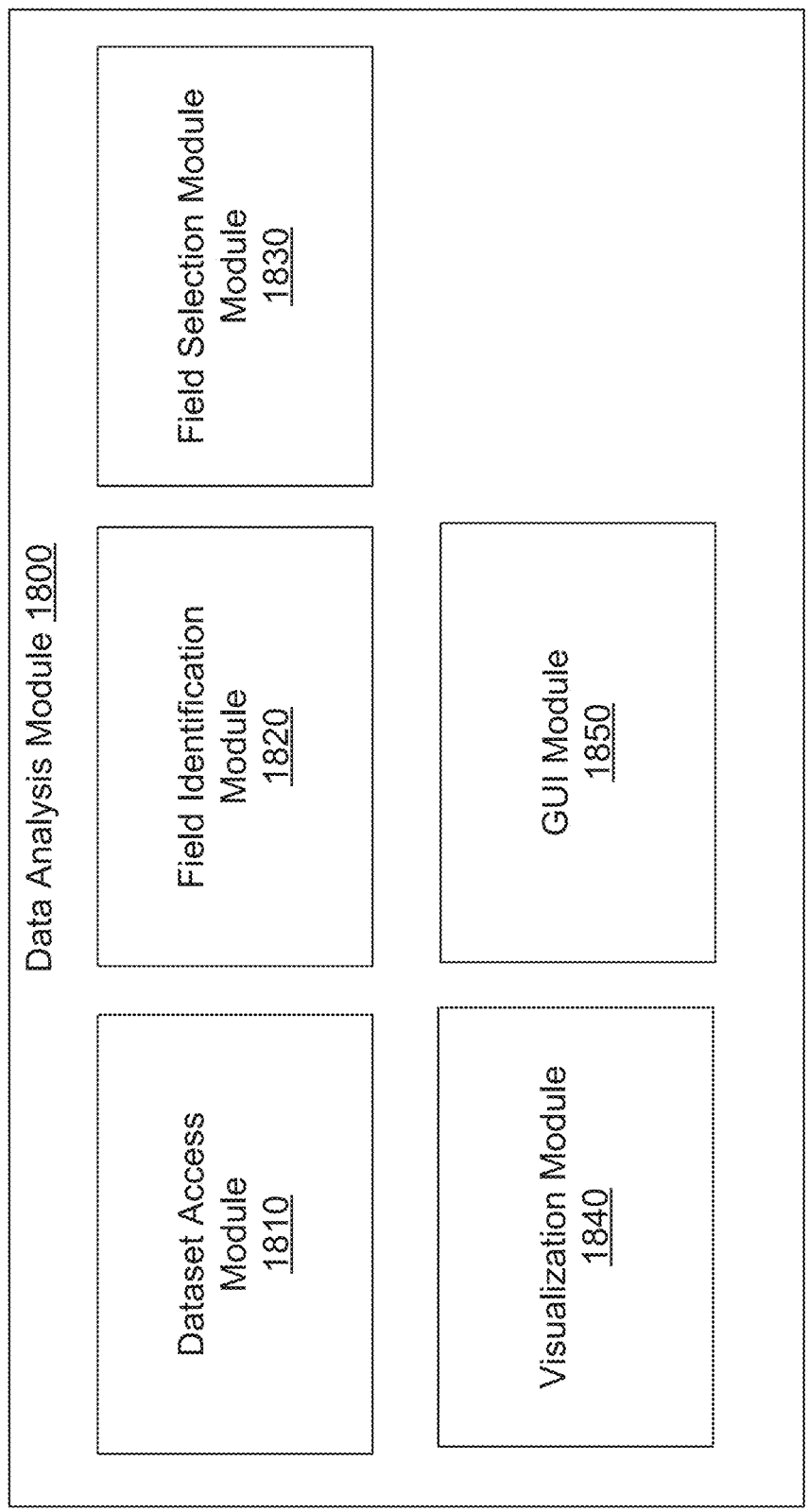
FIG. 18A is a block diagram that illustrates an example data analysis module in accordance with the disclosed embodiments.

FIG. 18A is a block diagram that illustrates an example data analysis tool, in the form of a module 1800 in accordance with one or more embodiments. The data analysis module 1800 may include any combination of hardware and/or software and may be implemented, for example, as part of any of as part of any of data intake and query system 108, client devices 102, or host devices 106 described with respect to FIG. 1. Data analysis module 1800 may include, for example, a dataset access module 1810, a field identification module 1820, a field selection module 1830, a visualization module 1840, and a graphical user interface (GUI) module 1850.

In an embodiment, dataset access module 1810 may identify one or more data sets that are accessible for analysis using data analysis module 1800. In this context, a dataset may be any structured or unstructured set of data. For example, a dataset may include the results of an initial search query. In other words, the dataset may include any of the set of events that satisfy the initial search query, or a sub portion of the data in the set of events that satisfy the search query. In an embodiment, dataset access module 1810 working as part of and/or in conjunction with a search head 210 may operate to receive a user search query, process the search query and return results based on the search query. This process is described in more detail with respect to flow chart illustrated in FIG. 4.

In some embodiments a dataset may be based on a pre-defined data model. As previously described, a data model in this context is a hierarchically structured search-time mapping of semantic knowledge about one or more datasets. The data model encodes the domain knowledge necessary to build a variety of specialized searches of those datasets. Those searches, in turn, can be used to perform analysis. Additional information on data models can be found in the previous section 2.9 of this document titled "Data Models."

In some embodiments a dataset may be based on one or more defined performance metrics for one or more target computing resources. For example, cloud computing services such as Amazon™ AWS may track and offer access to defined performance metrics (e.g. storage utilization, CPU utilization, memory utilization, data I/O, etc.) for their computing resources. In an embodiment, a given metric can be represented as a tuple of four fields: time, metric name, measurement, and dimension. The time field may include a timestamp indicating a time at which a value for a given measurement was taken at the target resource. The metric name field may include string literal that represents the name of the given metric (e.g. nginx.upstream.responses.5xxx). The Measurement field will typically include a numerical data point representative of the value of the metric. Metric measurements may come in different types such as count, timing, sample, gauge, sets (unique occurrences of events), etc. A given metric may also include multiple measurements or at least multiple data points based on a particular measurement such as different statistical aggregations (e.g. count, sum, average, median, etc.). Based on the resource being monitored many metric measurements may be based on a pre-defined aggregation function and a set bin span. Each metric may have different aggregations, or may also have different aggregation resolutions (different bin spans). The metric's dimension may include a string literal that represents a tag or name that provides metadata about the metric (e.g. technology—nginx, cloud environment—aws, cloud region—us-east-1a, etc.).

These examples of datasets have been provided for illustrative purposes, but are not to be construed as limiting. Any of the data analysis techniques that will be described may also be applied to any time of dataset (e.g. a prepared tabular dataset).

In addition to facilitating retrieval of a dataset (e.g. via search), dataset access module 1810 may facilitate user selection of pre-prepared data sets (e.g. that are based on a data model). As will be described, in some embodiments, dataset access module 1810 operating in conjunction with GUI module 1850 may cause display of an interactive set (e.g. a list) of dataset identifiers (e.g. dataset names) that reference datasets that are available for analysis (see e.g. screen 1900 shown in FIG. 19). Through the interactive set, a user may then select one or more of the available datasets to analyze.

In an embodiment, field identification module 1820 may identify fields that occur in a given dataset. For example, where a dataset is based on an initial search query, field selection module 1820 may return one or more field names that reference fields that occur in events returned in response to the search query. In other words, field identification module 1820 will only return reference to fields that are included in at least one of the events that satisfy a criteria in the initial search query. Field identification module 1820 may also return data associated with the identified fields such as a field type (e.g. measurement, category, etc.), a value type (e.g. numerical, literal, etc.), and a count of values that occur in a particular field (e.g. total values, total unique values, etc.).

In an embodiment, field selection module 1830 may identify fields selected from the set of identified fields that occur in a given dataset. Fields may be selected automatically (e.g. based on one or more predefined selection algorithms) and/or, as will be described in more detail, in response to user inputs. As will be described, in some embodiments, the field selection module 1830 operating in conjunction with field identification module 1810 and GUI module 1850 may identify and cause display of an interactive set (e.g. a list) of field identifiers (e.g. field names) that reference fields that occur in a given data set. For example, these modules may operate to cause display to a user of interactive set of field identifiers that reference fields that occur in events that satisfy a search query. Here, each field name may include the name of the field as well as additional information regarding the field (e.g. field type, value type, statistical information on values that occur in the field, etc.). Through the displayed interactive list, a user may then select one or more of the identified fields to analyze by interacting with the displayed field identifiers. As will be described in more detail, in some embodiments, in response to a user selection of a field identifier, field selection module 1830 operating in conjunction with field identification module 1810 and GUI module 1850 may cause display of an interactive element including an option to refine the data upon with a visualization is based. For example, in the case of numerical values (e.g. for measurement fields), field selection module 1830 may cause display of an option to apply an aggregation to the values for visualization. Alternatively, in the case of literal values (e.g. for categorical fields), field selection module 1830 may cause display of an option to filter one or more of the values included in the field.

In an embodiment, visualization module 1840 may receive the field selections (e.g. from field selection module 1830) and in conjunction with GUI module 1850 cause display to a user of a visualization based on the values in the selected fields to the user's analysis of the dataset. The process of causing display of a visualization may include accessing the data to be visualized (e.g. the values for selected fields in the dataset), processing the data to be visualized (e.g. by applying aggregation functions), rendering the data to be visualized, and outputting the rendered visualization for display to a user, for example, via a client device 102.

As previously mentioned, and in contrast with the reporting features described with respect to FIGS. 14-16, one aspect of the present innovation is that visualizations may be automatically displayed to a user in response to field selections and with little to no input from the user defining visualization parameters. Accordingly, in some embodiments, visualization module 1840 may operate to automatically define one or more visualization parameters before rendering a visualization according to the parameters. Visualization parameters can include, but are not limited to, visualization type (e.g. bar chart, line graph, map, Sankey diagram, etc.), axis assignments, scaling, ordering, other visual arrangement specifics such as colors, color keys, and available customizing options (e.g. juxtaposition options). In some embodiments, visualization module 1840 may apply one or more rules and/or algorithms to select visualization parameters with a goal of presenting information to the user in a manner to provide the greatest analytical insight. As a simple example, if the user elects to display time-series data, visualization module 1840 may automatically define the visualization type as a line graph and utilize the appropriate rendering libraries to cause display of such a line graph. Conversely, if the user elects to visualize non-time series data, the visualization module 1840 may automatically define the visualization type as a bar graph. As another example, visualization module 1840 may automatically define axis assignments, scales, and data resolution based at least in part on the values (or data derived from the values) for the selected one or more fields. For example, visualization module 1840 may adjust the resolution (i.e. number of plotted points) and/or aggregation function applied to a set of time-series data with a high variance so that trends in the data can be more easily identified by a viewing user. Also, as will be described in more detail, visualization module 1840 may automatically define how data is split in a visualization based on a user's field selections without receiving instructions from the user defining visualization splits. These above provided examples of how visualization module 1840 may define certain visualization parameters have been provided for illustrative purposes and are not to be construed as limiting. A person having ordinary skill will recognize that a similar module may be configured differently to suite particular implementation requirements.

As mentioned, the data used by visualization module 1840 may be based on the values included in a selected field. In some embodiments, these values may be returned in response to a subsequent search query. Consider, for example, a dataset including events returned in response to a search query of a store of indexed events. The returned set of events may include occurrences of fields A, B, C, and D. In response to a user selection of field A, data analysis module 1800 may automatically generate a subsequent search query for events that satisfy a criteria the initial search query and that further include values in field A. For example, field selection module 1830 operating in conjunction with a search generation module (not shown) and/or dataset access module 1810 may automatically generate a search (for example in SPL) based on the user's field selections. Subsequent searches may further be generated based on additional field selections and or options to, for example, aggregate values in a given field, or filter values in a given field. As searches are generated, they may be submitted to a search head 210 of the data intake and query system 108 to return results for visualization. Accordingly, data analysis module 1800 may operate within a framework of the previously described data intake and query system 108 to retrieve data for analysis without the user needing to manually define the query in the appropriate query language. Note, however that such arrangement is not necessary to practice the described techniques. For example, in an alternative embodiment all or some of the raw data for a set of events satisfying the criteria of an initial search may be retrieved and staged as a structured dataset (e.g. a table) and visualized for analysis based on user inputs without needing to generate or execute subsequent search queries.

In some embodiments, the displayed visualization is manipulable by a user (i.e. interactive). Accordingly, in such embodiments, visualization module 1840 may dynamically update a displayed visualization in response to user inputs. For example, as previously mentioned, to aid exploratory and iterative analysis of a dataset, visualization module 1840 may dynamically update a visualization based on an initial field selection in response to a subsequent field selection. This may in some cases include redefining the visualization parameters. For example, as will be described in more detail, a visualization may be dynamically updated to split values included in an initially selected field according to a subsequently selected field (e.g. a categorical field). Visualization module 1840, operating in conjunction with GUI module 1850 may further cause display of options to the user to modify the visualization for a given set of field selections. For options may be presented to change time ranges of visualized data, adjust the juxtaposition of splits, etc.

The graphical user interface (GUI) sub-module 350 may provide for causing display of graphical interface features (e.g., rendering the described interactive GUIs for display to a user) and/or receiving user input (e.g., an initial search query, selection of fields, visualization options, etc.). Certain embodiments are discussed herein with regard to operations performed by certain modules for the purpose of illustration, but are not to be construed as limiting. For example, embodiments of the present innovation may include fewer or more functional operations than as described with respect to data analysis module 1800. Further the functionalities and features of the described modules may be combined (e.g., shared) or divided (e.g., distributed) in to more of fewer modules than as shown in FIG. 18A.

3.1 Data Analysis Tool Process

Figure 18B:
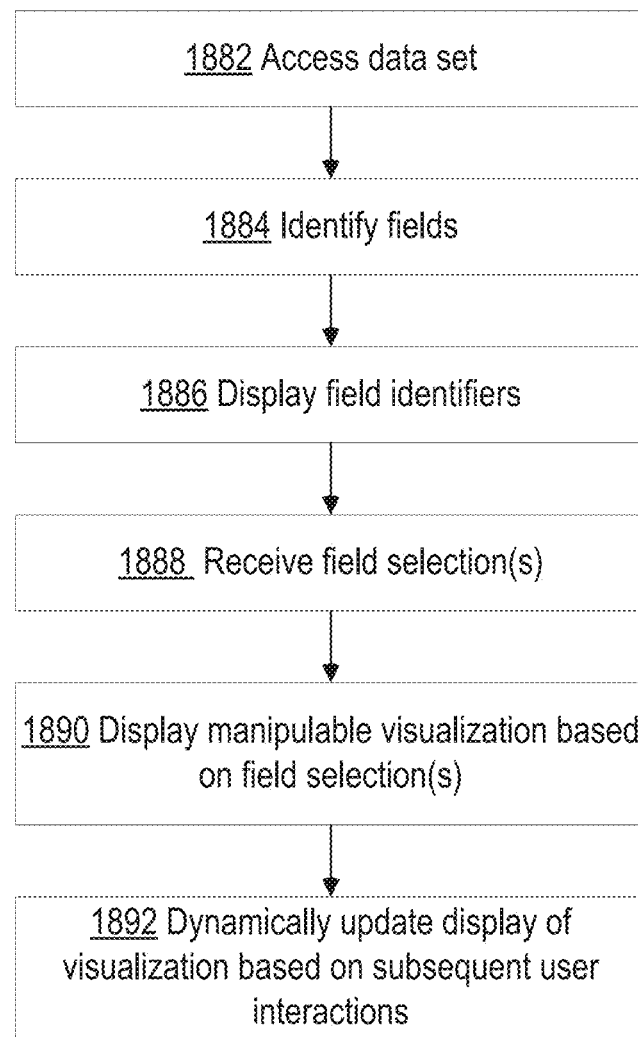
FIG. 18B is flow chart illustrating an example process performed by a computer system implementing a data analysis tool in accordance with the disclosed embodiments.

FIG. 18B depicts a flow chart illustrating an example process performed by a computer system implementing a data analysis tool (e.g. a data analysis module 1800), according to some embodiments. The process described with respect to FIG. 18B may be performed by any of the one or more computing systems described with respect to FIG. 1. For example, in some embodiments, some or all of the steps of described process 1800 are performed by any of a computing system operating as part of data intake and query system 108, client devices 102, or host devices 106. The process flow illustrated in FIG. 18B is provided for illustrative purposes only. Those skilled in the art will understand that one or more of the steps of the processes illustrated in FIG. 18 may be removed or the ordering of the steps may be changed.

Figure 19:
FIG. 19 illustrates an example dataset selection screen in accordance with the disclosed embodiments.

The process depicted in FIG. 18 can optionally begin at step 1882 with a accessing the dataset to be analyzed. As previously discussed with respect to FIG. 18A, in some embodiment s, step 1802 may include receiving, via a search interface (e.g. as shown in FIG. 6A), an expression of the search query in a query language (e.g. SPL), submitting the search query for execution (e.g. to search head 210), and receiving from the search head 210, in response to submission of the search query a set of events that satisfy a criteria of the search query. In some embodiments, step 1882 may include displaying to a user via a dataset selection interface (e.g. as shown in FIG. 19) a list of prepared datasets (e.g. based on predefined data models) available for analysis, and receiving via the interface a selection by the user of a dataset to analyze.

The process continues at step 1884 with identifying fields that occur in the accessed dataset. Fields in this context may be defined based on an extraction rule (e.g. a regular expression) for extracting a sub-portion of the data included in an event returned by the search query. In other words, step 1804 will return references (e.g. field name, field type, value type, etc.) to fields that are included in at least one of the events that satisfy a criteria in an initial search query.

The process continues at step 1886 with displaying to a user a set (e.g. a list) of field identifiers (e.g. field names) that reference fields present in the accessed dataset (e.g. fields present in events included in the dataset). For example, the list of fields may be displayed as an interactive element 2002 (referred to herein as a "field picker") via a GUI (e.g. as shown in FIG. 20A).

Figure 20A:
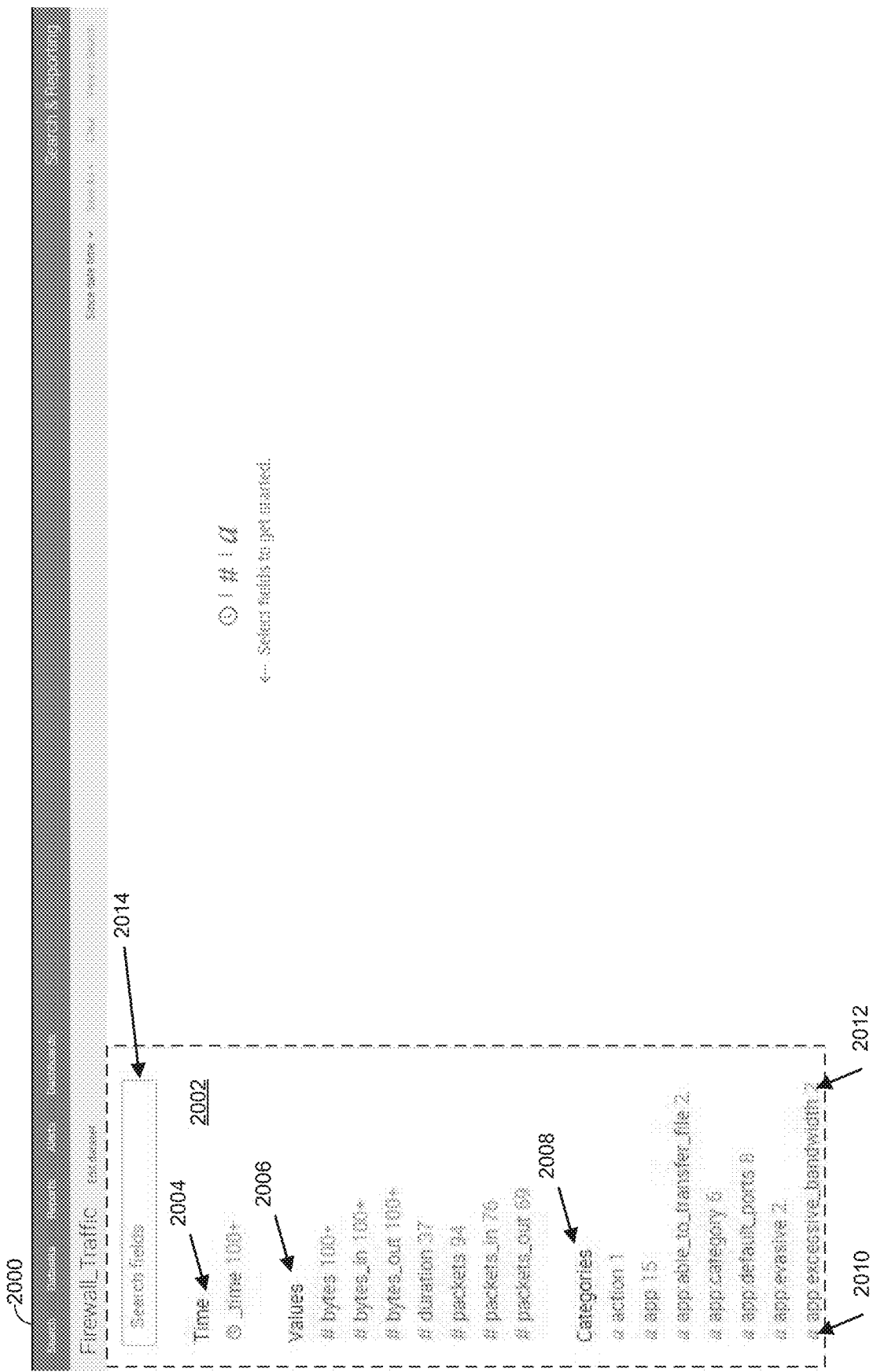
FIGS. 20A-20C show screen captures of an example data analysis interface that illustrate various interactive features related to an example interactive "field picker" element in accordance with the disclosed embodiments.

The process continues at step 1888 with receiving a user selection of one or more field identifiers (e.g. field names) from the displayed set of field identifiers, for example via the interactive element 2002 displayed in the GUI shown in FIG. 20A.

The process continues at step 1890 with displaying a manipulable (i.e. interactive) visualization of values (or calculated data based on the values) included in the selected fields. As previously described step 1890 may include automatically defining one or more visualization parameters based on the fields referenced by the one or more selected field identifiers and generating and rendering the manipulable visualization based on the defined one or more visualization parameters. For example, in some embodiments the defined one or more visualization parameters may be based on any of the values in the selected field, the type of the selected field, or similar information regarding subsequent field selections. Also, as previously described, step 1890 may include, in some embodiments, generating a subsequent search query based on the selected field identifier(s), submitting the generated search to a search head 210 of a data intake and query system 108 for execution, receiving results based on values included in the field(s) referenced by the selected field identifier(s) in response to execution of the search query, and rendering the manipulable visualization based on the received results.

The process continues at step 1892 with dynamically updating the visualization in response to subsequent user interactions. For example, in some embodiments, step 1892 may include dynamically updating a displayed visualization in response to one or more of the user interaction flows described with respect to FIGS. 20A-32.

3.2 Data Analysis Graphical User Interfaces

The following provides illustrations and descriptions of example interactive GUIs of a data analysis tool that can be utilized by a user to analyze a data set. Each of the illustrations are accompanied by description of how the graphical user interfaces operate, definitions available using the graphical user interfaces, and how a user can use the graphical user interface to analyze a data set. Note that the included screen captures of example interactive GUIs and are provided for illustrative purposes to show certain example features of a tool for analyzing a data set. Some embodiments may include fewer or more user interaction features than are described with respect to the following FIGS. while remaining within the scope of the presently described innovations.

FIG. 19 illustrates an example dataset selection screen 1900 in accordance with the some embodiments. In some embodiments dataset selection screen may be accessed by selecting an interactive element 1910 labeled "Datasets" in a tool bar of search screen 600 described with respect to FIG. 6A. Example dataset selection screen 1900 includes an interactive list 1902 of datasets that are available for analysis. As previously described, in some embodiments, the available data sets may be based on predefined data models. Example list 1902 is organized into rows of selectable data sets with columned information identifying, for example, a title 1904, type 1906, and available actions 1908 for each data set. For example, a dataset titled "Firewall Traffic" (highlighted in FIG. 19 by the solid line box) may be selected for analysis by a user by selecting the "analyze" option 1910. As shown in FIG. 19, each dataset may also include other actions such as generating a report ("pivot"), and exploring in search (i.e. displaying corresponding a search for example via a search screen 600 shown at FIG. 6A). The example dataset selection screen 1900 is provided for illustrative purposes and is not to be construed as limiting. More or fewer elements (as well as different arrangements of those elements) that are shown in FIG. 19 may be implemented in a dataset selection screen according to other embodiments. Further, the features described with respect to FIG. 19 do not necessarily appear in all embodiments of the presently described innovations. For example, a user may begin analyzing a dataset by inputting a search query (e.g. via search screen 600 shown at FIG. 6A) without being presented with screen 1900.

Figure 20B:
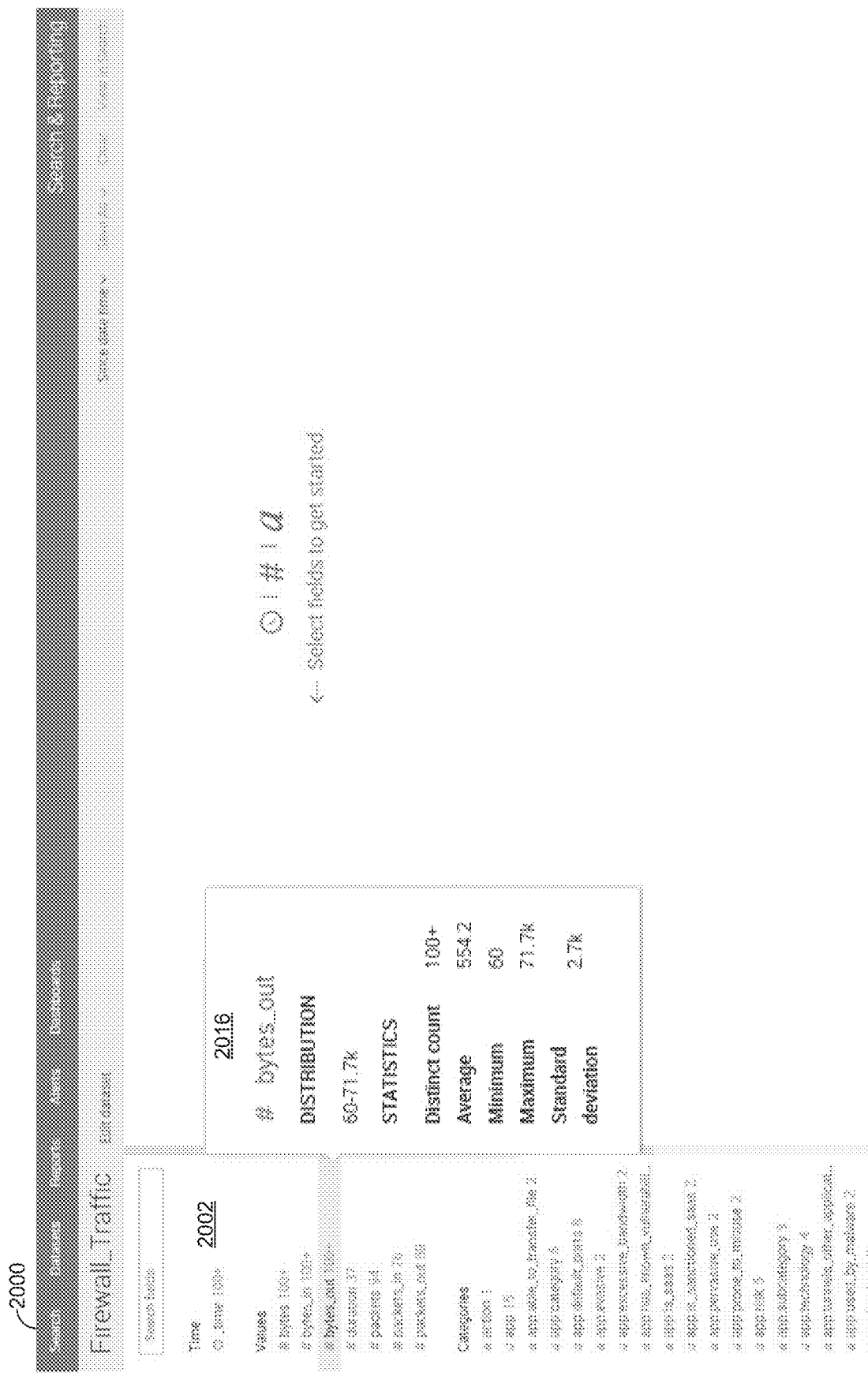
Figure 20C:
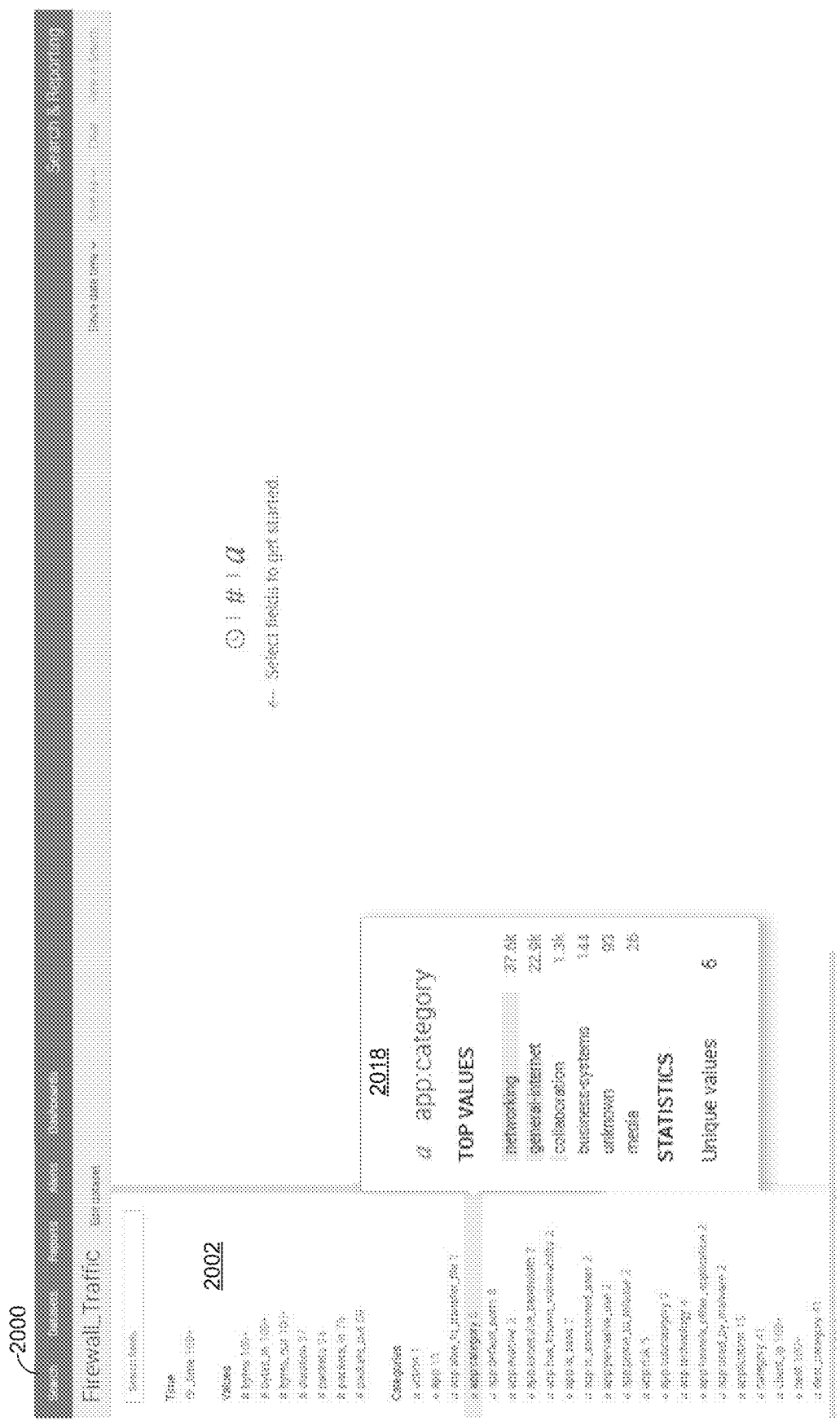

FIGS. 20A-20C show screen captures of an example data analysis interface 2000 that illustrate various interactive features related to an example interactive "field picker" element 2002. In some embodiments, example interface 2000 as shown in FIG. 20A is displayed to a user in response to a user selection to analyze an available dataset (e.g. by detecting interaction with element 1910 in FIG. 19). Alternatively, example interface 2000 as shown in FIG. 20A may be displayed to a user in response to a user selection to analyze results of a submitted search query (e.g. by detecting interaction with an element (not shown) in search screen 600 shown in FIG. 6A.

As shown in FIG. 20A, example field picker 2002 (highlighted by a dotted line box) may include a displayed list of one or more field identifiers (e.g. field names) that reference fields present in a dataset (e.g. a set of events). For example, the displayed field identifiers may reference fields present in a set of events returned in response to a search query. Each displayed field identifier may include a field name (e.g. bytes, bytes_in, action, app category, etc.), a value type identifier 2010 (e.g. # for fields that include numerical values, and a for fields that include literal values), and a value count 2012. For example, the value count 2012 may display a number indicating the total number of values occurring in the associated field, or as shown in FIG. 20A, a count of the number of unique values that occur in the associated field. The displayed field identifiers may optionally be arranged by field type to better aid a user's analysis. For example, in some embodiments fields can be classified and organized in field picker 2002 as either measures (i.e. "values") 2006 or as dimensions (i.e. "categories") 2008. Note that as used in this disclosure, the term "values" may refer to the values (whether numerical or literal) that occur in all field types (both measures and dimensions). This is not to be confused with the field type label of "values" used, for example, in the field picker 2002 as shown in FIG. 20A to identify fields that are measures. The field identifiers listed as dimensions (i.e. under the field type label of "categories") reference fields that technically include values, albeit values comprising, for example, strings literals. Example, field picker 2002 may also include a listed field identifier 2004 referencing a time dimension. As will be described with reference to later figures, selection of field identifier 2004 may cause display of a visualization based on values in a selected field but in time series (e.g. represented as a line graph with the time dimension along the x-axis). Finally, field picker 2002 may include a search option 2014 through which a user can provide input to search for identified fields that occur in the dataset.

The example field picker 2002 shown in FIG. 20A is provided for illustrative purposes and is not to be construed as limiting. More or fewer elements (as well as different arrangements of those elements) than are shown in FIG. 20A may be implemented in field picker elements according to other embodiments. For example, in some embodiments, the fields may not be organized according to type. Also, the selection mechanics may differ in other embodiments. For example, in some embodiments, a user may select from field identifiers in a pull down menu, by entering a field identifier in a editable text field, etc.

FIGS. 20B and 20C show example interactive features that may be associated with field picker 2002. For example, as shown in FIG. 20B, in response to detecting user interaction with a particular field identifier, a graphical element 2016 may be displayed to the user that includes additional information associated with the field (and the included values) referenced by the field identifier. Specifically, FIG. 20B shows graphical element 2016 displayed in response to a user placing a cursor over a field identifier titled "bytes_out." As suggested by the title, this example field identifier references a field present in a set of events that are part of a dataset titled "Firewall_Traffic." The referenced field in this example includes numerical values indicating a measure of the outbound bytes passing through a firewall. The events included in the Firewall_Traffic" dataset may, for example, include machine data from a log gathered at a device operating as part of a firewall. As shown in FIG. 20B, graphical element 2016 displays information related to the values included in the particular field referenced by the field identifier ("bytes_out"). Note again, that this information may be based on the values that are present in a "bytes_out" field for events returned in response to an initial search query. This is not to say that every event that satisfies the criteria of the initial search query necessarily includes values in this field. In this case, because the values included in the "bytes_out" field are numerical, graphical element 2016 includes statistical aggregates of the set of values present in the dataset (e.g. machine data in the set of returned events). For example, graphical element 2016 may display to a user a distinct count of events including values in the particular field, an average of the values in the field, the minimum and maximum values, and a standard deviation.

FIG. 20C shows a similar graphical element 2018 except with information relating to a categorical field. For example, as shown in FIG. 20C, shows graphical element 2018 being displayed in response to a user placing a cursor over a field identifier titled "app:category." As suggested by the title, this example field identifier references values containing a string literal identifying a category of an application that was related to a particular event. For example, the particular event, although logged by a firewall, may include machine data specifically referencing or at least suggesting a category of application related to the data transfer (either source or destination). Note again that this field may have been extracted based on an inference and according to a late-binding schema by data intake and query system 108 at search time. A shown in FIG. 20C, example graphical element 2018 includes information on the total number of unique values occurring in the particular field as well as a list of the counts for each of the unique values. Specifically, as shown in FIG. 20C, the value counts are displayed graphically with an order list of representative bar charts.

The example informational graphical elements 2016 and 2018 shown in FIGS. 20B and 20C are provided for illustrative purposes and is not to be construed as limiting. More or fewer elements (as well as different arrangements of those elements) that are shown in FIGS. 20B and 20C may be implemented in similar graphical elements according to other embodiments. For example, depending on the requirement for a given implementation, different statistical aggregations may be presented via graphical element 2016 and/or different visualizations of value counts may be presented via graphical element 2018. Further, the features described with respect to FIGS. 20B and 20C do not necessarily appear in all embodiments of the presently described innovations.

Figure 21A:
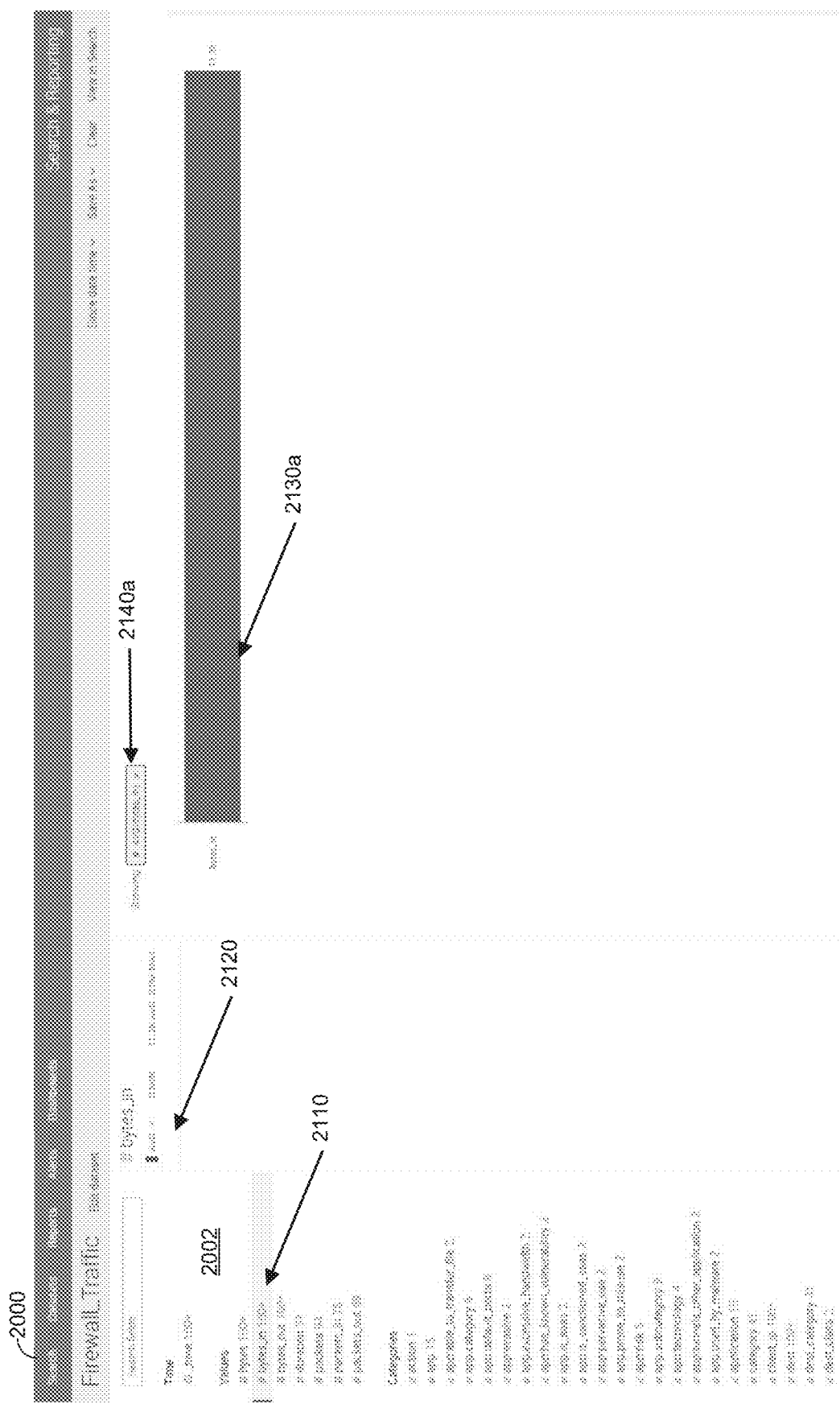
FIGS. 21A-21B how a series of screen captures of an example data analysis interface illustrating an example response to a user selection of a field identifier via a "field picker" element in accordance with the disclosed embodiments.
Figure 21B:
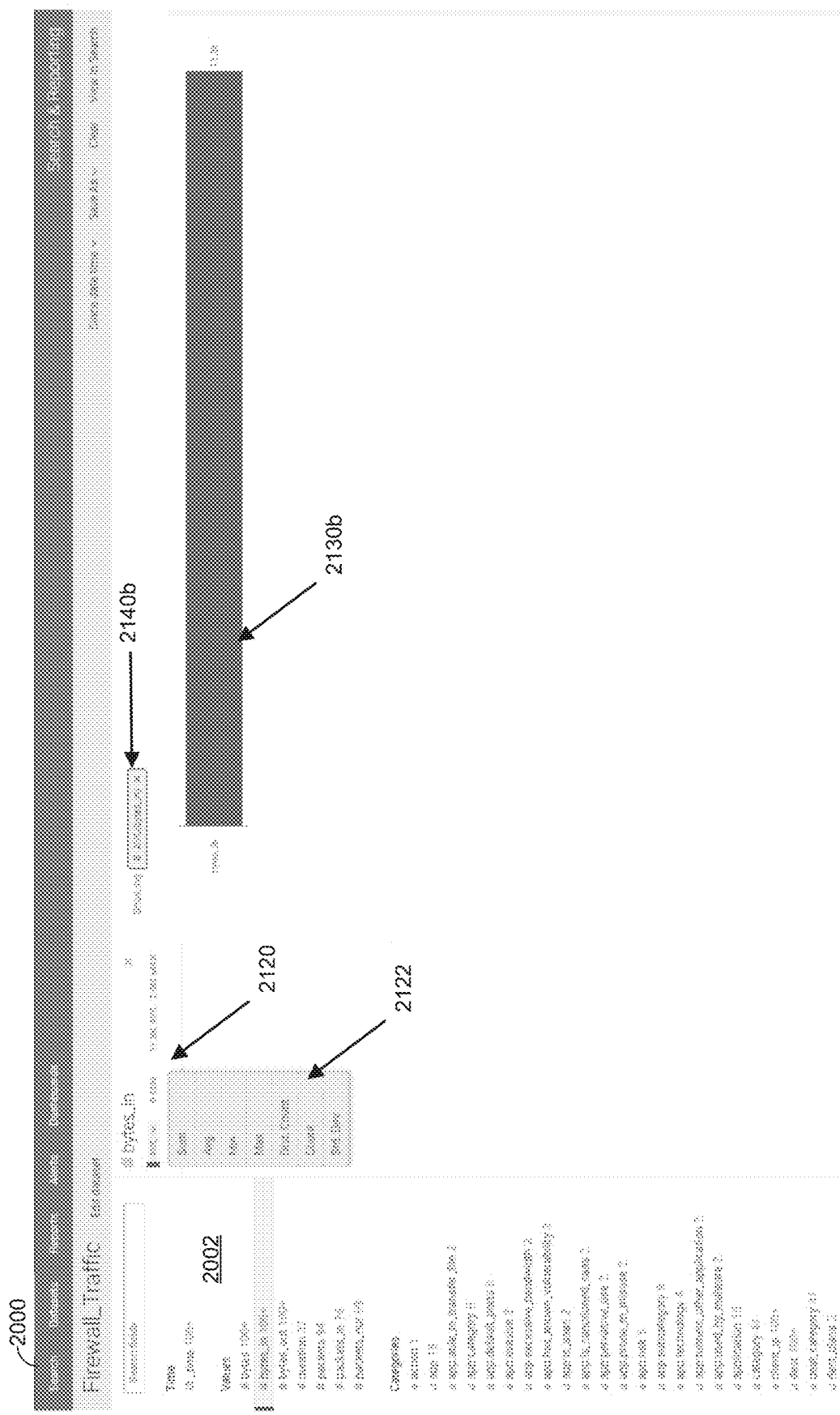

FIGS. 21A and 21B show a series of screen captures of example data analysis interface 2000 illustrating an example response to a user selection of a particular field identifier via field picker 2002. As shown in FIG. 21A, in response to a user selection of a particular field identifier (e.g. the user clicking on the "bytes_in" field identifier) several responses may occur. First, in response to the user selection, a computer system (for example implementing data analysis module 1800) will cause display of an manipulable visualization 2130a based on the values of included in the field referenced by the selected field identifier. As previously discussed, the automatic display of the visualization 2130a may include automatically defining certain parameters for the visualization without any further input from the user. For example, as shown in FIG. 20A, interface 2000 is displaying a bar chart of the average of the measures of the incoming bytes through a firewall. Note that all the user has done to produce this visualization is to select the field identifier ("bytes_in"). The user was not necessarily prompted to define the parameters of the resulting visualization. Accordingly, the user is immediately presented with a recognizable insight into the events included in the data set. As mentioned, example field picker 2002 includes an option to select a time dimension, which if selected may result in line graph visualization of the average of the bytes_in over a certain time period, however that option has not been selected in the scenario depicted in FIGS. 21A-21B.

As further illustrated in FIG. 21A, optionally in response to the user selection of a field identifier, a computer system (for example implementing data analysis module 1800) may cause display of an editable expression 2140a of the visualization 2130a. The example expression 2140a shown in FIG. 21A simply states "# AVG(bytes_in)," however further features of this editable expression will become more apparent with respect to later described figures.

As further illustrated in FIG. 21A, optionally in response to the user selection of a field identifier, a computer system (for example implementing data analysis module 1800) may cause display of an option 2120 to, for example, set or change an aggregation function to be applied to the values for visualization. As shown in FIG. 21A, option 2120 may be part of a graphical element that summarizes the currently selected field, current aggregation of values in the field, and certain statistical information relating to the values for the selection field (e.g. min value, max value, avg., etc.). As suggested in FIG. 21A, in some embodiments, numerical values may default to using averaging aggregation function. For example in this case, the average of the values a "bytes_in" measure would provide more insight to the user than a "summation" of the values for this measure. This is, however, an example and should not be construed as limiting. The default in other cases may be based on some other aggregation function. A shown in FIG. 21B, in response to user interaction with option 2120, a menu 2122 may be displayed showing available aggregation functions that may be applied to the values in the selected field for visualization. For example, available aggregation functions for numerical values may include any of minimum value, maximum value, average value, summation, value count, distribution count, standard deviation, etc. In response to a user selection of a different aggregation function, the computer system (for example implementing data analysis module 1800) may dynamically update and cause display of new visualization 2130b and/or visualization expression 2140b. Note, that dynamically updating the visualization may in some cases involve updating (i.e. redefining) certain visualization parameters. For example, the scale applied to a bar chart of the average of the values may differ than the scale applied to a bar chart of the maximum value.

The example features shown in FIGS. 21A and 21B are provided for illustrative purposes and are not to be construed as limiting. More or fewer elements (as well as different arrangements of those elements) than are shown in FIGS. 21A and 21B may be implemented in other embodiments. Further, the features described with respect to FIGS. 21A and 21B (specifically option 2120 and expression 2140a-b) do not necessarily appear in all embodiments of the presently described innovations.

Figure 22A:
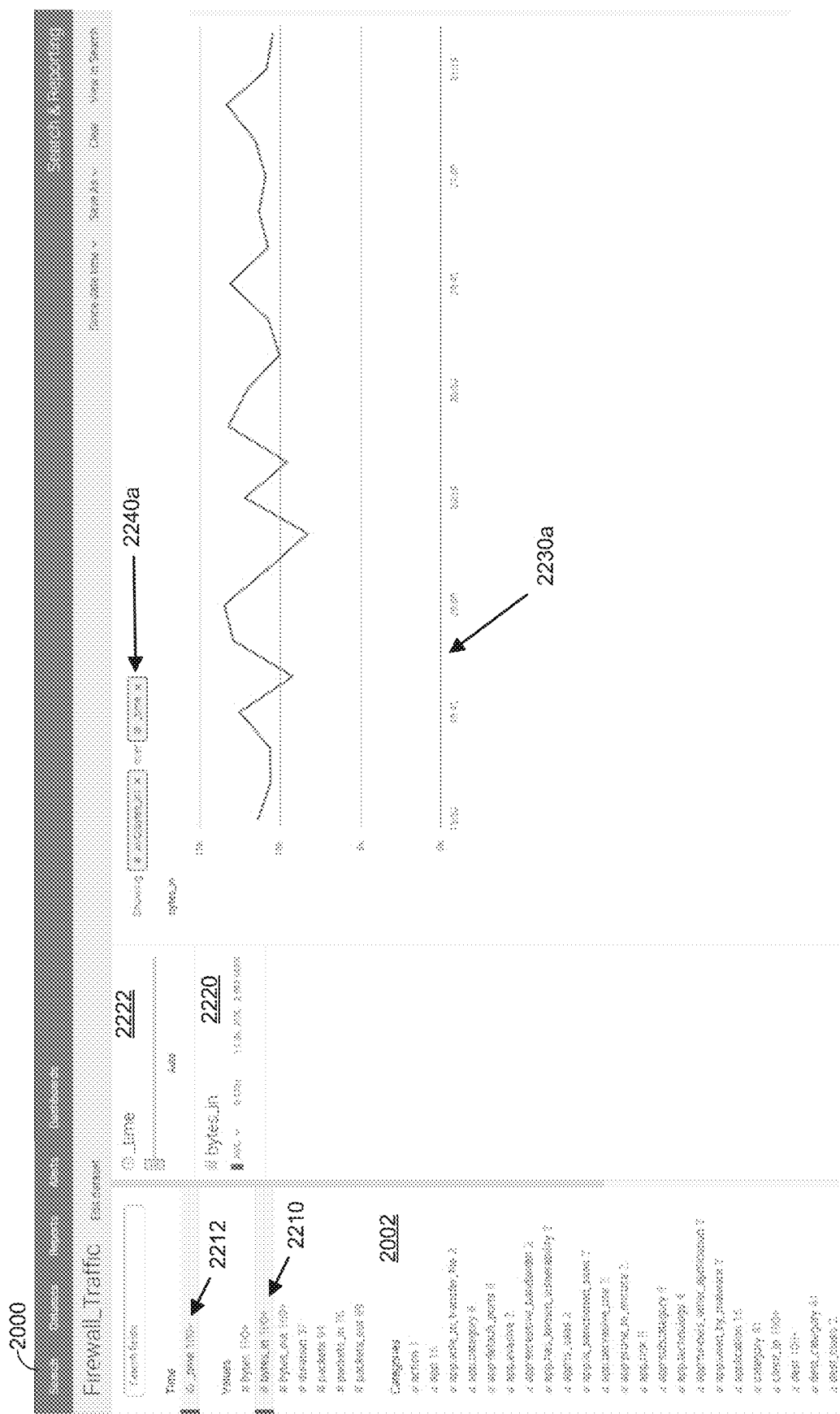
FIGS. 22A-22B show a series of screen captures of an example data analysis interface illustrating an example response to a user selection of a particular field identifier along with a time dimension identifier via a "field picker" element in accordance with the disclosed embodiments.
Figure 22B:
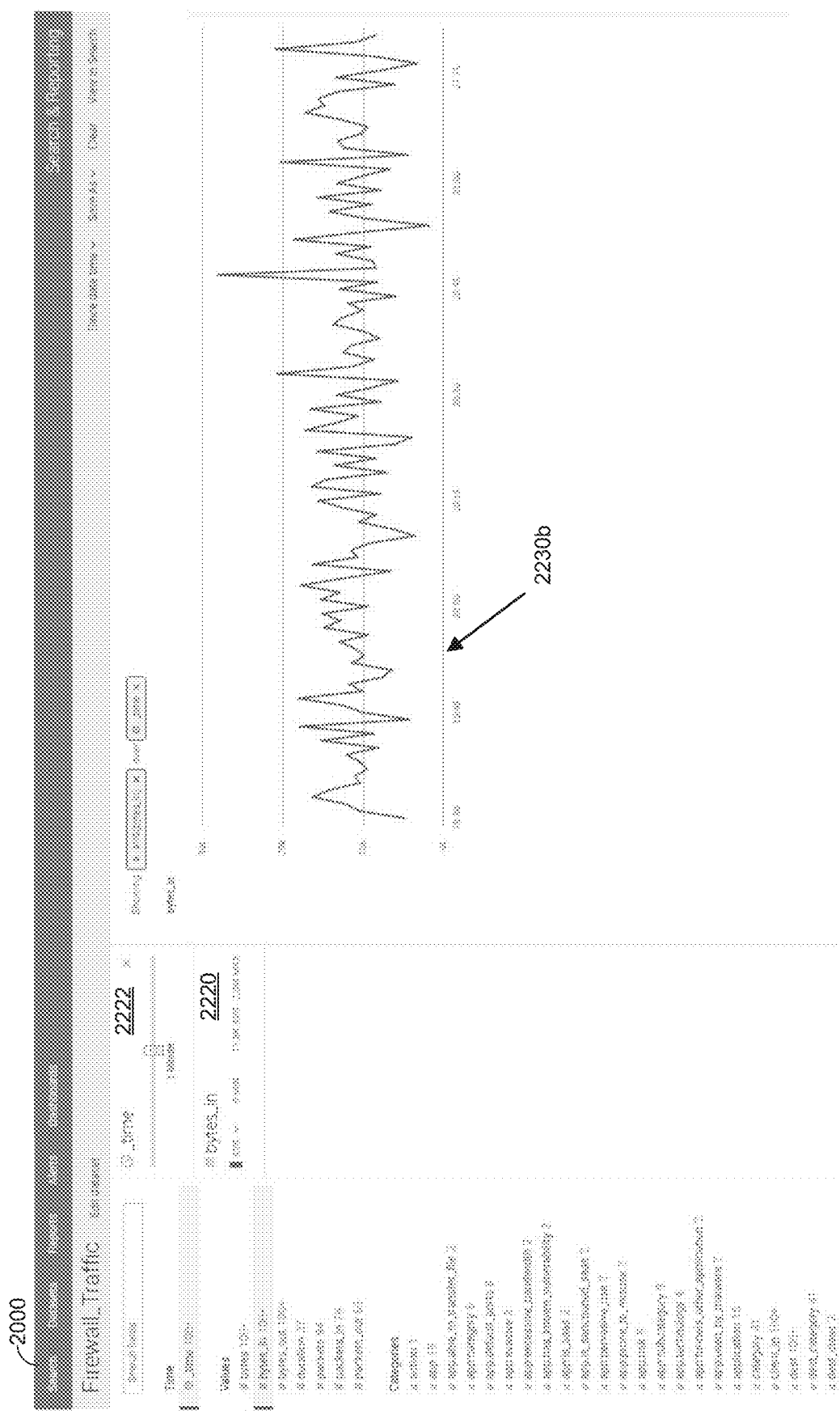

FIGS. 22A and 22B show a series of screen captures of example data analysis interface 2000 illustrating an example response to a user selection of a particular field identifier along with a time dimension identifier via field picker 2002. As previously mentioned the automatically defined parameters for a given visualization will depend at least in part on the fields selected by a user. In the scenario illustrated in FIG. 22A, a user has selected both the "bytes_in" field (e.g. by clicking the "bytes_in" field identifier 2210 via field picker 2002) and has further selected the time dimension field (e.g. by clicking the "time" field identifier 22102 via field picker 2002). As shown in FIG. 22A, in response to such user selections several responses may occur. First, in response to the user selection, a computer system (for example implementing data analysis module 1800) will cause display manipulable visualization 2230a based on the two selected field. In some cases the displayed visualization 2230a may be an update to a previously displayed visualization. For example, as mentioned, in response to a user selection of the "bytes_in field," the system may cause display of a bar chart (see e.g. visualizations 2130a-b in FIGS. 21A-21B) showing the average value of bytes in for the given dataset. In response to the user additionally selecting the time dimension field 2212, the previously displayed bar chart is dynamically updated into the line graph illustrated in FIG. 22A. A line graph of the average of the bytes in over a given time period may provide more insight to a viewing user than a bar chart.

As further illustrated in FIG. 22A, optionally in response to the user selection of a the two field identifiers 2212 and 2210, a computer system (for example implementing data analysis module 1800) may cause display of corresponding options 2220 and 2222. Option 2220 which corresponds to the "bytes_in" field is the same or similar to option 2120 described with respect to FIGS. 21A-21B. Option 2222, on the other hand, corresponds to the time dimension field indicated by the selection of identifier 2212. Example option 2222 shown in FIG. 22A may include graphical element including an interactive adjustment mechanism that enables a user to adjust an aspect of the visualization. For example, in example option 2222, a slider bar is displayed though which a user can adjust the time span over which the aggregation functions are applied to the values occurring in the field reference by selected identifier 2210. As previously mentioned, each event may have a timestamp associated with the machine data. Accordingly, the values in certain fields of the event can be visualized over time. Similarly, aggregation functions may be applied to those values over different time spans by referencing those timestamps. Note however, that a user input to option 2222 or 2220 is not required to produce a visualization. Option 2222 may automatically default to a predefined time span or may automatically default to a timespan dynamically selected based on the values in the selected field(s) (e.g. through a statistical analysis of those values) to produce a visualization intended to provide the use with insight into the visualized data. For example, as shown in FIG. 22B, in response to a user input to option 2222 setting the aggregation time span at 1 minute, a very different (perhaps less insightful) line graph 2230b results. Again, the example line graph 2230 which may or may not provide insight to a viewing user has been displayed to them simply by selecting two field identifiers. This ability to quickly and automatically make assumptions to define certain visualization parameters based on field selection(s) enables iterative and exploratory analysis of a dataset perhaps leading to serendipitous insights.

As further illustrated in FIG. 22A, optionally in response to the user selection of a field identifiers 2212 and 2210, a computer system (for example implementing data analysis module 1800) may cause display of an editable expression 2240a of the visualization 2230a based on those field selections. The example expression 2240a shown in FIG. 22A simply states "# AVG(bytes_in) over time," however further features of this editable expression will become more apparent with respect to later described figures.

The example features shown in FIGS. 22A and 22B are provided for illustrative purposes and are not to be construed as limiting. More or fewer elements (as well as different arrangements of those elements) than are shown in FIGS. 22A and 22B may be implemented in other embodiments. Further, the features described with respect to FIGS. 22A and 22B (specifically options 2220, 2222 and expression 2240a) do not necessarily appear in all embodiments of the presently described innovations.

Figure 23:
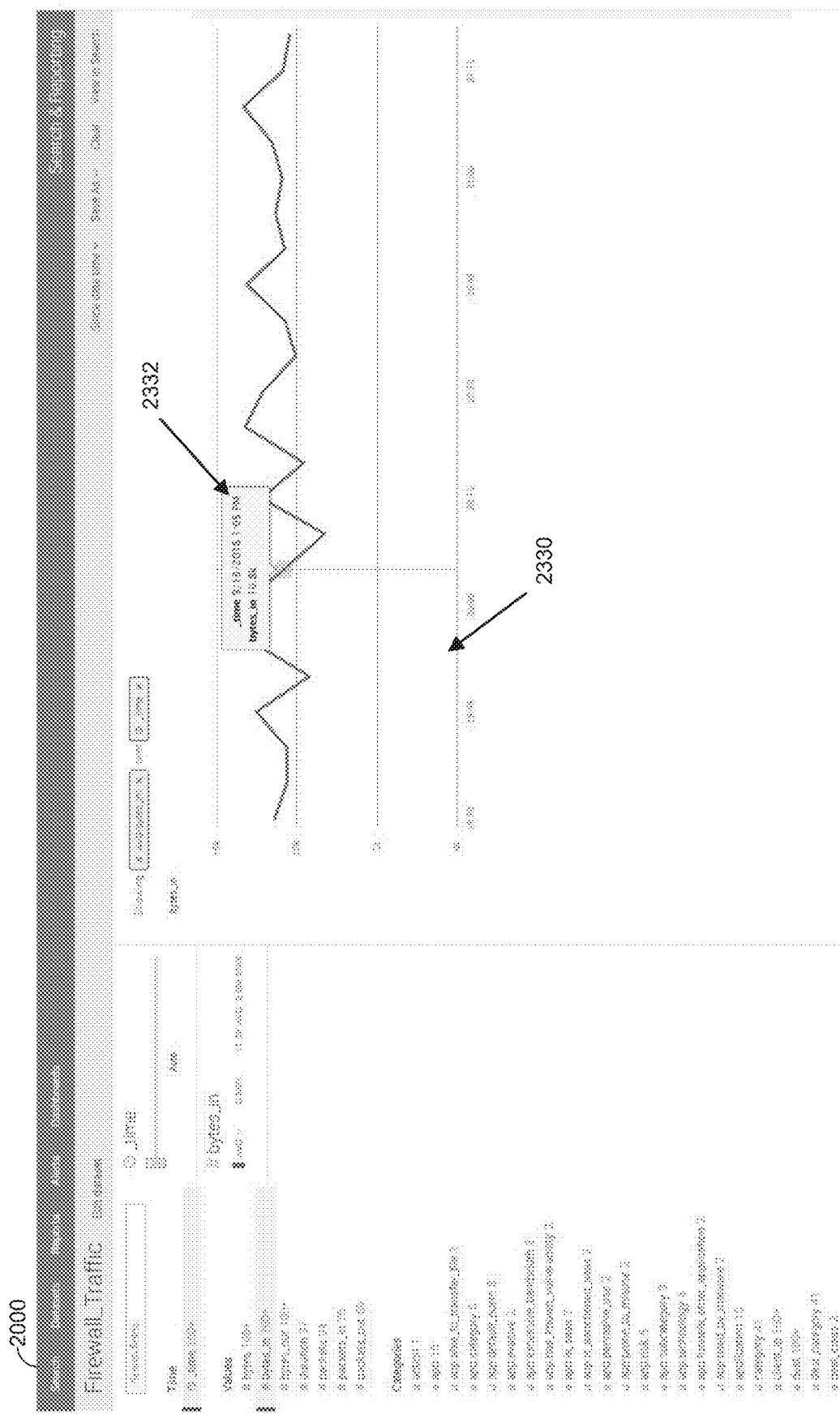
FIG. 23 shows a screen capture of an example data analysis interface illustrating an example response to a user interaction with a displayed visualization in accordance with the disclosed embodiments.

FIG. 23 shows a screen capture of example data analysis interface 2000 illustrating an example response to a user interaction with a displayed visualization 2230. For example, in some embodiments, in response to detecting a user interaction with a particular portion of the displayed manipulable visualization, a computer system (e.g. implementing data analysis module 1800) may cause display of information associated with the events upon which the selected particular portion of the displayed visualization is based. For example, as shown in FIG. 23, in response to a user placing a cursor over a portion of a displayed visualization 2330 based on certain selected fields, the computer system may cause display of a graphical element 2332 including information associated with the events upon which the particular portion of the displayed visualization 2330 is based. In the example element 2332, the information indicates that the graphed data point at the particular portion is based on a calculated average bytes 10.8 k at a particular time (Sep. 18, 2016 at 1:05 PM). Note that the information provided in example element 2332 is provided for illustrative purposes and is not to be construed as limiting. In other embodiments, other information may be displayed such as other aggregations (e.g. count, mac, min, etc.) of the set of values that form the graphed data point.

Further, although not shown in FIG. 23, in some embodiments, in response to detecting a user interaction with a particular portion of the displayed manipulable visualization, a computer system (e.g. implementing data analysis module 1800) may cause display of the events (e.g. including raw machine data of the events) upon which the visualized particular portion is based. For example, in an embodiment, element 2332 may be displayed to a user as they move the cursor over visualization 2330. However, in response to clicking the particular portion (or element 2332), the computer system may cause display of a list of events (in some cases including raw machine data) upon which the particular portion is based in a format similar to the events list 608 shown with respect to FIG. 6A.

The example features shown in FIG. 23 is provided for illustrative purposes and is not to be construed as limiting. More or fewer elements (as well as different arrangements of those elements) than are shown in FIG. 23 may be implemented in other embodiments. Further, the features described with respect to FIG. 23 (specifically graphical element 2332) do not necessarily appear in all embodiments of the presently described innovations.

Figure 24A:
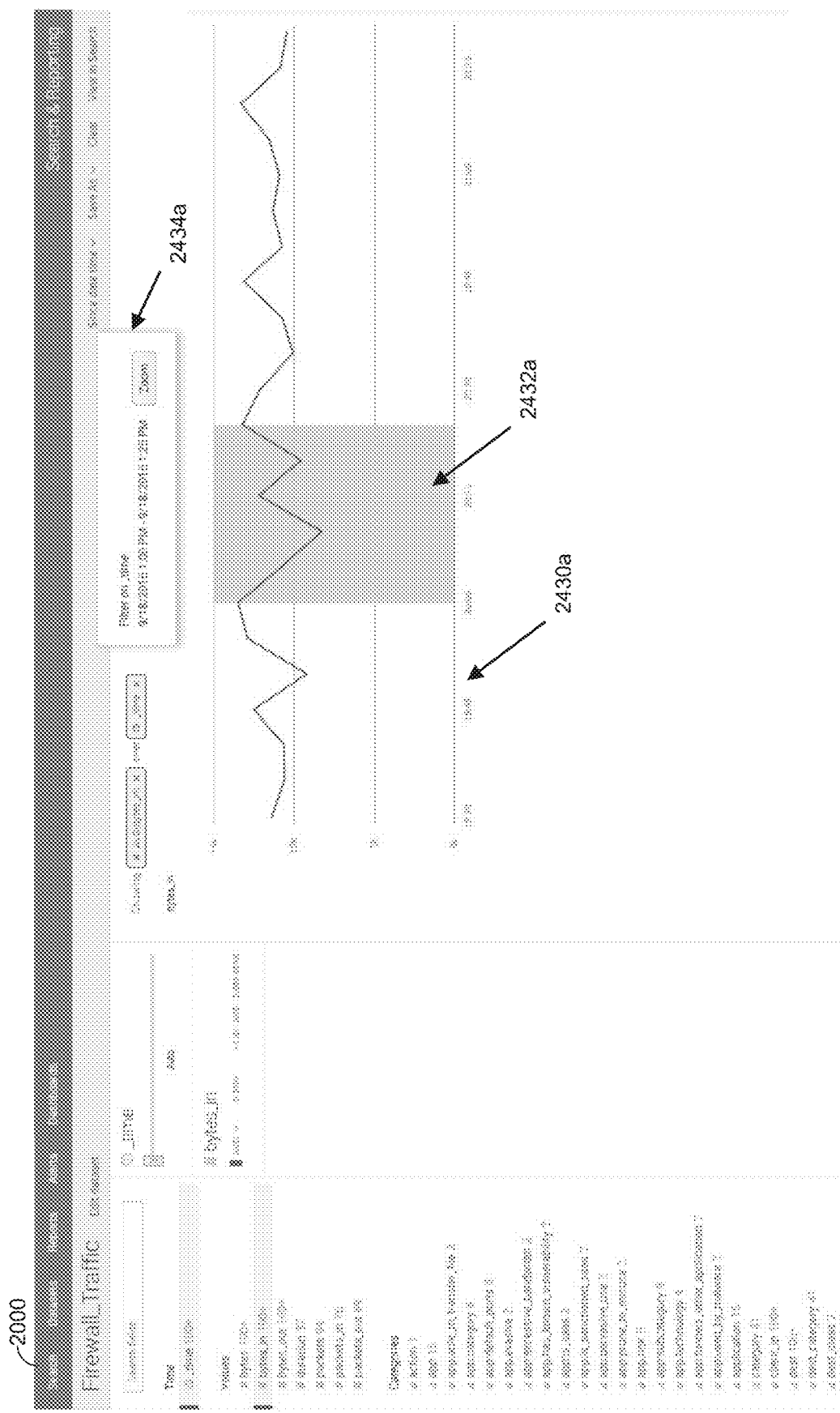
FIGS. 24A-24B show a series of screen captures of an example data analysis interface illustrating an example zoom functionality to adjust a time range in a displayed visualization in accordance with the disclosed embodiments.
Figure 24B:
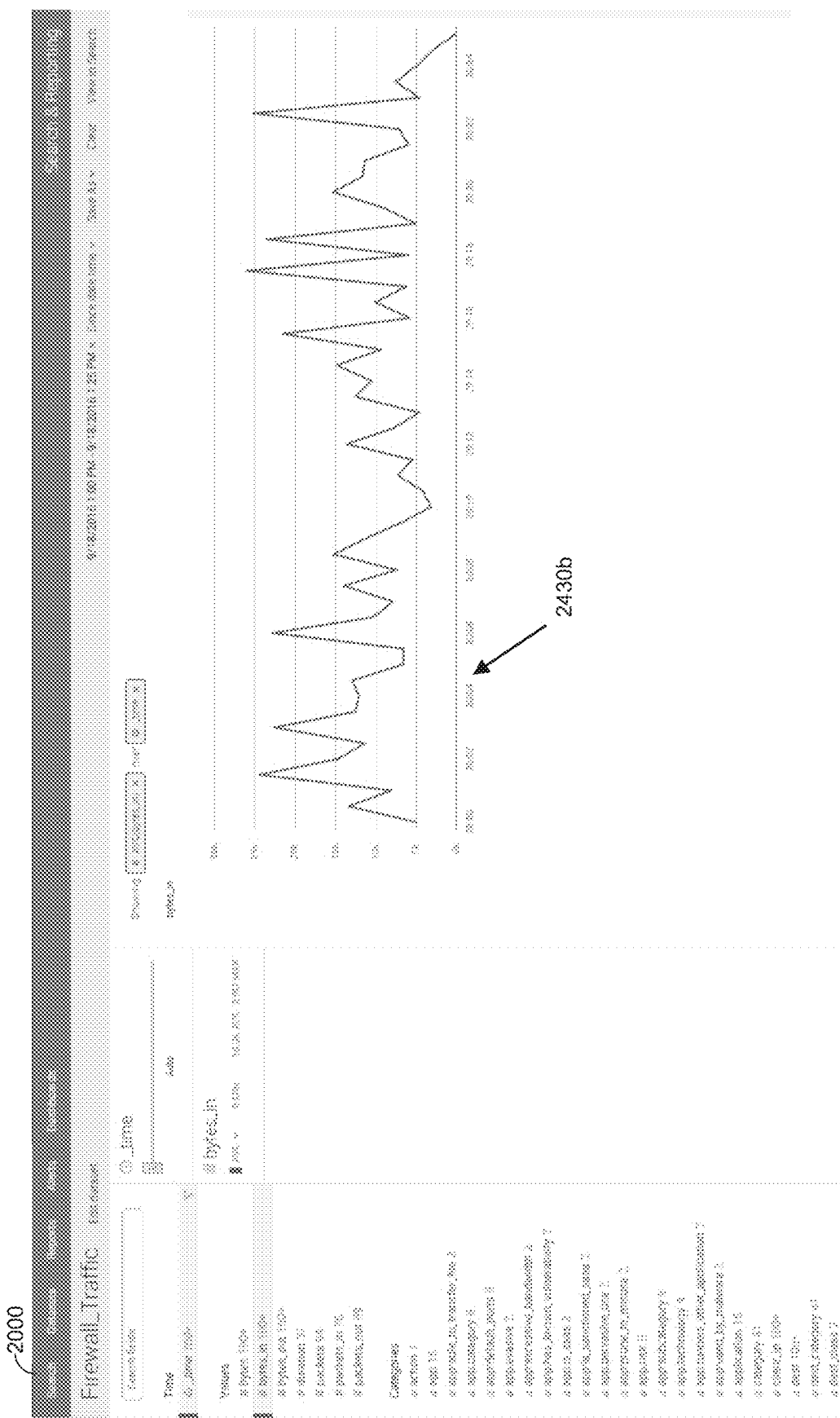

FIGS. 24A-24B show a series of screen captures of example data analysis interface 2000 illustrating an example zoom functionality to adjust the time range of a time series visualization. As shown in FIG. 24A, a user may select a range of time 2432a in a displayed visualization 2430a, for example, by clicking and dragging the cursor in the direction of the x-axis of example visualization 2430a to select the time range 2432a. In response to the selection a computer system may cause display of an option 2434a to "zoom" the displayed visualization to the selected time range. In response to a user input via option 2434 confirming the request to zoom, visualization 2432a may be dynamically updated to new visualization 2430b shown in FIG. 24B. Note that in some embodiments, the request to zoom may result in merely graphically zooming into the already displayed visualization 2430a. In other words, the zoomed visualization may look exactly like the portion of visualization 2430 with the selected range 2432a, but bigger. Alternatively, in some embodiments, the request to zoom will result in an updated visualization, perhaps based on updated visualization parameters. For example, "zoomed" visualization 2430b shown in FIG. 24B is at a higher data resolution than visualization 2430a shown in FIG. 24A. This may be based on an adjusted time span over which aggregation functions are applied to the values in the selected field(s). Again, adjustment in visualization parameters may be performed by the system automatically with little to no input require from the user with a goal of providing greater data insight to the user.

The example features shown in FIGS. 24A-24B are provided for illustrative purposes and are not to be construed as limiting. More or fewer elements (as well as different arrangements of those elements) than are shown in FIGS. 24A-24B may be implemented in other embodiments. Further, the features described with respect to FIGS. 24A-24B (specifically the zoom functionality) do not necessarily appear in all embodiments of the presently described innovations.

Figure 25A:
FIGS. 25A-25C show a series of screen captures of an example data analysis interface illustrating example options to adjust the time range of values to be included for analysis in accordance with the disclosed embodiments.
Figure 25B:
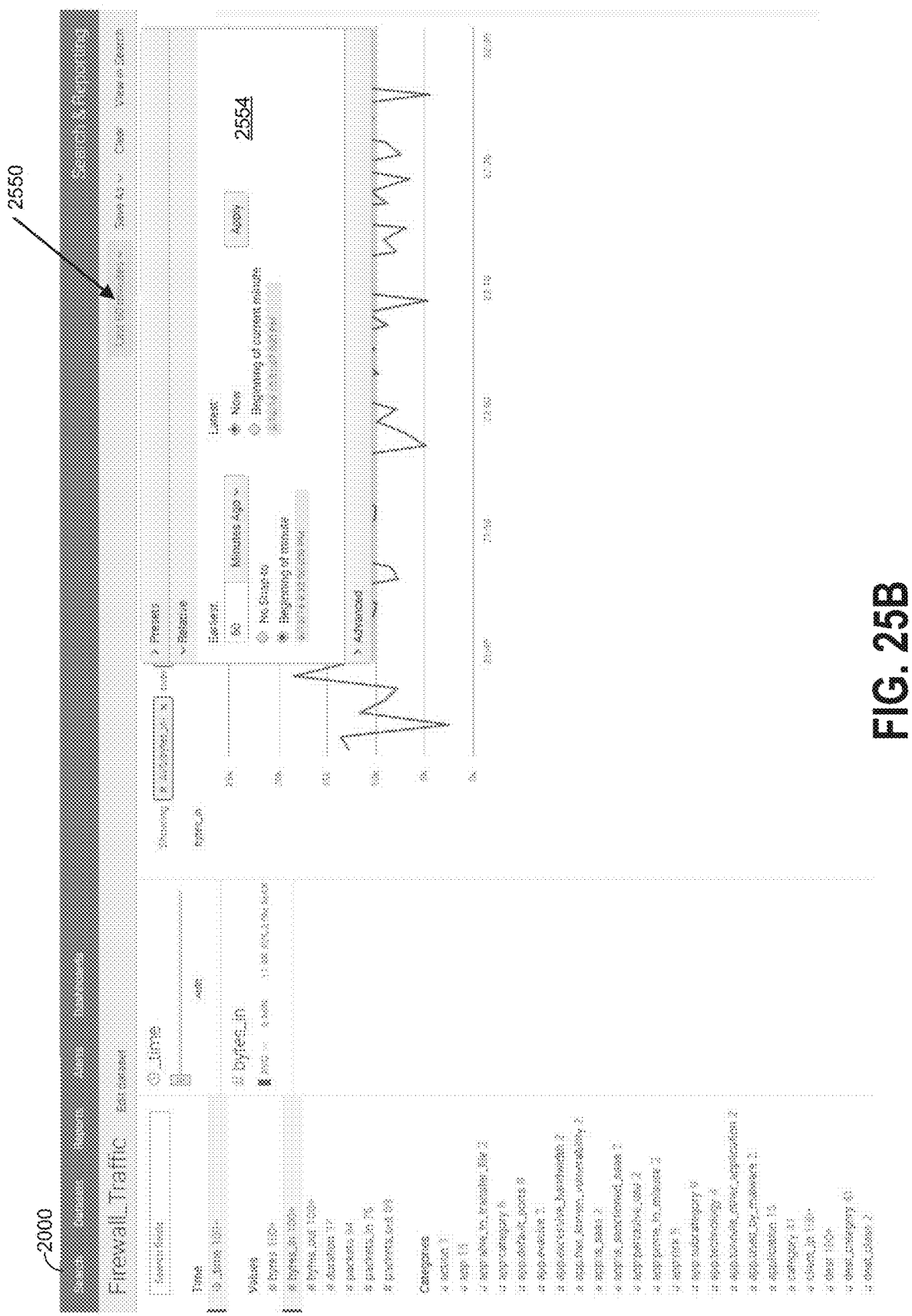
Figure 25C:

FIGS. 25A-25C show a series of screen captures of example data analysis interface 2000 illustrating example options to adjust the time range of values to be included for analysis. For example, in response to a user input via menu 2550, a use may be presented with one or more options for setting the time span of the values from a given dataset to be analyzed. Specifically, option 2552 shown in FIG. 25A shows an interactive list of preset time spans (e.g. last 60 mins, today, last week, all time, etc.) from which the user can select. In response to a user selection of one of the preset time ranges, analysis will be restricted to values for selected fields included in timestamped events that fall within the selected time range. Further, selection of a particular time range may optionally impact list of field identifiers displayed via field picker 2002. For example if a particular field does not occur in the events that fall within a selected time range, the field identifier referencing that particular field may not be displayed in field picker 2002. As shown in FIGS. 25B and 25C, additional menus 2554 and 2556 (respectively) may be displayed to provide the user with different ways to select a time range for the dataset.

The example features shown in FIGS. 25A-25C are provided for illustrative purposes and are not to be construed as limiting. More or fewer elements (as well as different arrangements of those elements) than are shown in FIGS. 25A-25C may be implemented in other embodiments. Further, the features described with respect to FIGS. 25A-25C (specifically menus 2550-2556) do not necessarily appear in all embodiments of the presently described innovations.

Figure 26A:
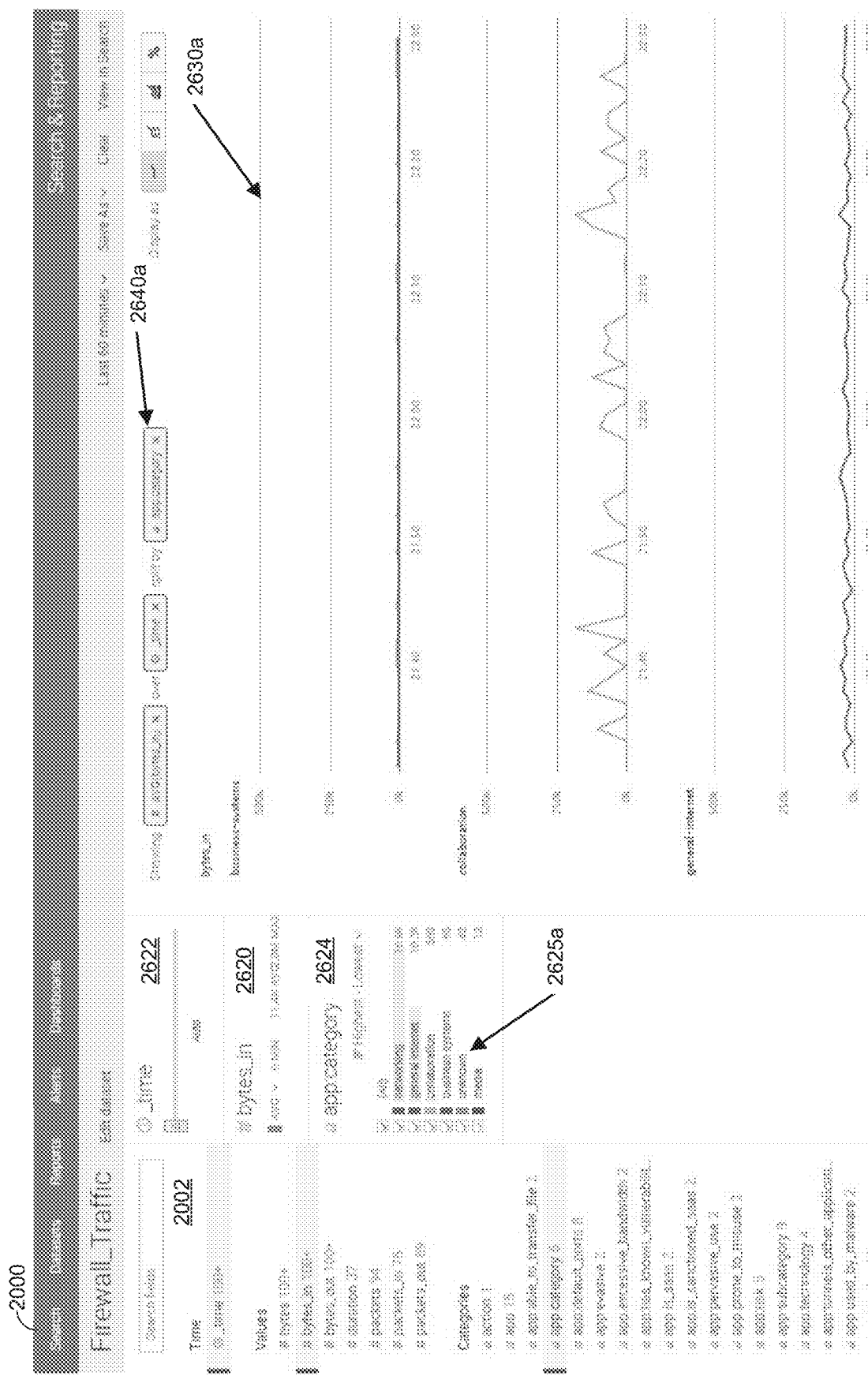
FIGS. 26A-26B show a series of screen captures of an example data analysis interface illustrating features related to splits in displayed time series visualizations in accordance with the disclosed embodiments.
Figure 26B:

FIGS. 26A-26B show a series of screen captures of example data analysis interface 2000 illustrating features related to splits in displayed time series visualizations.

Consider the example scenario illustrated in FIG. 26A. As described with respect to the scenario in FIG. 22A, a user here has selected the "bytes_in" field as well as the "time" dimension field. However, in the scenario illustrated in FIG. 26A, the user has additionally selected the "app:category field" thereby resulting in a visualization 2630a in the form of a split line graph. In other words in response to selecting of the "app:category" field at the screen illustrated in FIG. 22A, the computer system may dynamically update visualization 2230a resulting in visualization 2630a. As shown in FIG. 26A, the line graph of average bytes in over time is now split into multiple graphs according to the values (e.g. application categories) in the subsequently selected field (e.g. "app: category"). In other words, the user is presented with multiple line graphs that show the average incoming bytes for traffic associated with applications in various categories, thereby enabling the user to gain some insight into which applications (e.g. collaboration applications vs. business systems) are associated with the most incoming network traffic.

As shown in FIG. 26A, in response to a user selection of the "app:category" field identifier, the system may cause display of an option 2624 to filter according to the values included in the field referenced by the selected "app:category" field identifier. Option 2624, may be displayed along with options associated with previously selected fields (e.g. 2620 and 2622). As previously mentioned, the "app:category" field may be of a categorical field type including literal values that describe a dimension of a given event. For example some of the events included in a dataset may be based on network activity that is associated with the execution one or more applications. An application may be classified as belonging to one or more categories. Here, as shown in option 2624, the values occurring in the selected "bytes_in" field are associated with one of several categories of application (e.g. networking, general intent, collaboration, business systems, media, and unknown). The values occurring in the "app:category" field may be displayed to a user as a n interactive list 1225a through which the user may select and deselect values to filter. Again, the displayed application categories in option 2624 may be based on values that occur in "app:category" field in events that also include "bytes_in" field measures (i.e. due to the concurrent selection of the "bytes_in" field). Displayed list 2625a may include graphical elements such as a bar chart for each value showing statistics associated with that value (e.g. the count of events that include that value, the associated measure of another field related to the categorical values, etc.). Such information may provide the user with a quick indication of the distribution of measures in certain categories to aid in their exploratory analysis. Displayed list 2625a may also include a color key that maps to a color of one split line graphs in visualization 2630a. For example, as shown in FIG. 26A, the "collaboration" application category is associated with a yellow color key. Accordingly, the corresponding line graph showing average bytes in for traffic associated with collaboration applications is shown in visualization 2630a as a yellow line.

Again, the arrangement (including splits, color, axis assignments, scale, etc.) of visualization 2630a may be based on automatically defined visualization parameters with little to no input from the user apart from the field selections. Note that the multiple line graphs of visualization 2630a graph data (e.g. aggregates) based on the values in the "bytes_in" field over the "time" dimension split according to the values in the "app:category" field. The visualization could also potentially have been configured in reverse. For example graph of a count of the values in the "app:category" over the "time" dimension split according to the values in "bytes_in" field. However, for obvious reasons, the resulting visualization may provide limited insight to the user because it would result in the splitting of visualization 2630a into hundreds and possible thousands of individual line graphs split according to each unique value in the "bytes_in" field. Accordingly, in some embodiments a logic is applied to the set of user selected fields to determine how to arrange a resulting visualization (include how to split graphs, charts, etc.). Alternatively, in some embodiments may be based on the order in which the user selects fields. For example, a user may select the "bytes_in" field as shown in FIG. 22A resulting in a graph 2230a of the average incoming bytes over a time period. After selecting the "bytes_in" field, the user subsequently selects the "app:category" field thereby splitting the graph 2230a into multiple graphs according to the values included in subsequent field selection as shown in visualization 2630a.

As further illustrated in FIG. 26A, optionally in response to the user selection of the multiple field identifiers, a computer system (for example implementing data analysis module 1800) may cause display of an editable expression 2640a of the visualization 2630a based on those field selections. The example expression 2640a shown in FIG. 26A states "# AVG(bytes_in) over time split by app: category."

As shown in FIG. 26B, in response to a user input via option 2624 de-selecting one or more of the categorical values included in the "app:category" field, the system may dynamically update visualization 2630a to display new visualization 2630b. A shown in updated list 2625b the user has deselected (or filtered out) values associated with networking apps, business systems apps, and unknown apps. As shown in FIG. 26B, visualization 2630b includes multiple graphs of the average income bytes over time split according to the three selected application categories (collaboration, general intent, and media). Note also that, as shown in FIG. 26B, visualization parameters (e.g. color of the line and scale of the y-axis) may be dynamically updated without any input by the user.

Recall that an event may include multiple fields. Further, an event may be based on activity associated with an application that can be classified under two or more of the included application categories. For example, an application may be classified as both media and collaboration. Accordingly, the filtering mechanism described with respect to option 2624 may be configured in a number of different ways. In some embodiments, deselecting (or filtering out) one the categorical values) may cause the visualization to be based only those events that do not include the filtered value. In other words an event that includes both a filtered and un-filtered value would not be used in the visualization. Alternatively, selecting a categorical value (e.g. "media") may cause the visualization to be based all events that include the selected value including those events that also include a de-selected or filtered value.

The example features shown in FIGS. 26A-26B are provided for illustrative purposes and are not to be construed as limiting. More or fewer elements (as well as different arrangements of those elements) than are shown in FIGS. 26A-26B may be implemented in other embodiments. Further, the features described with respect to FIGS. 26A-26B (specifically option 2624 and associated lists 2625a-b) do not necessarily appear in all embodiments of the presently described innovations.

Figure 27A:
FIGS. 27A-27C show a series of screen captures of an example data analysis interface illustrating features related to the juxtaposition of splits in time series visualizations in accordance with the disclosed embodiments.
Figure 27B:
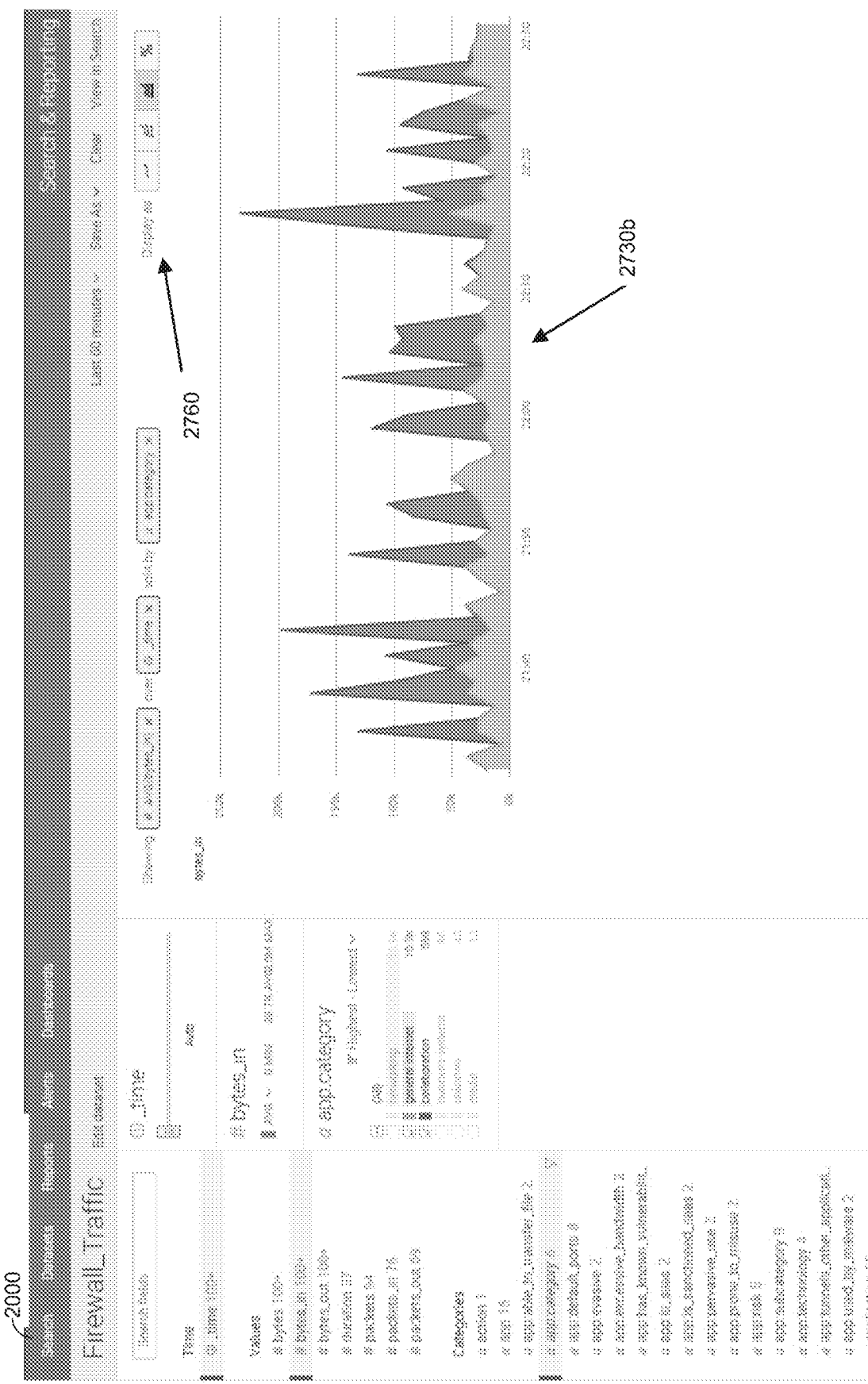
Figure 27C:
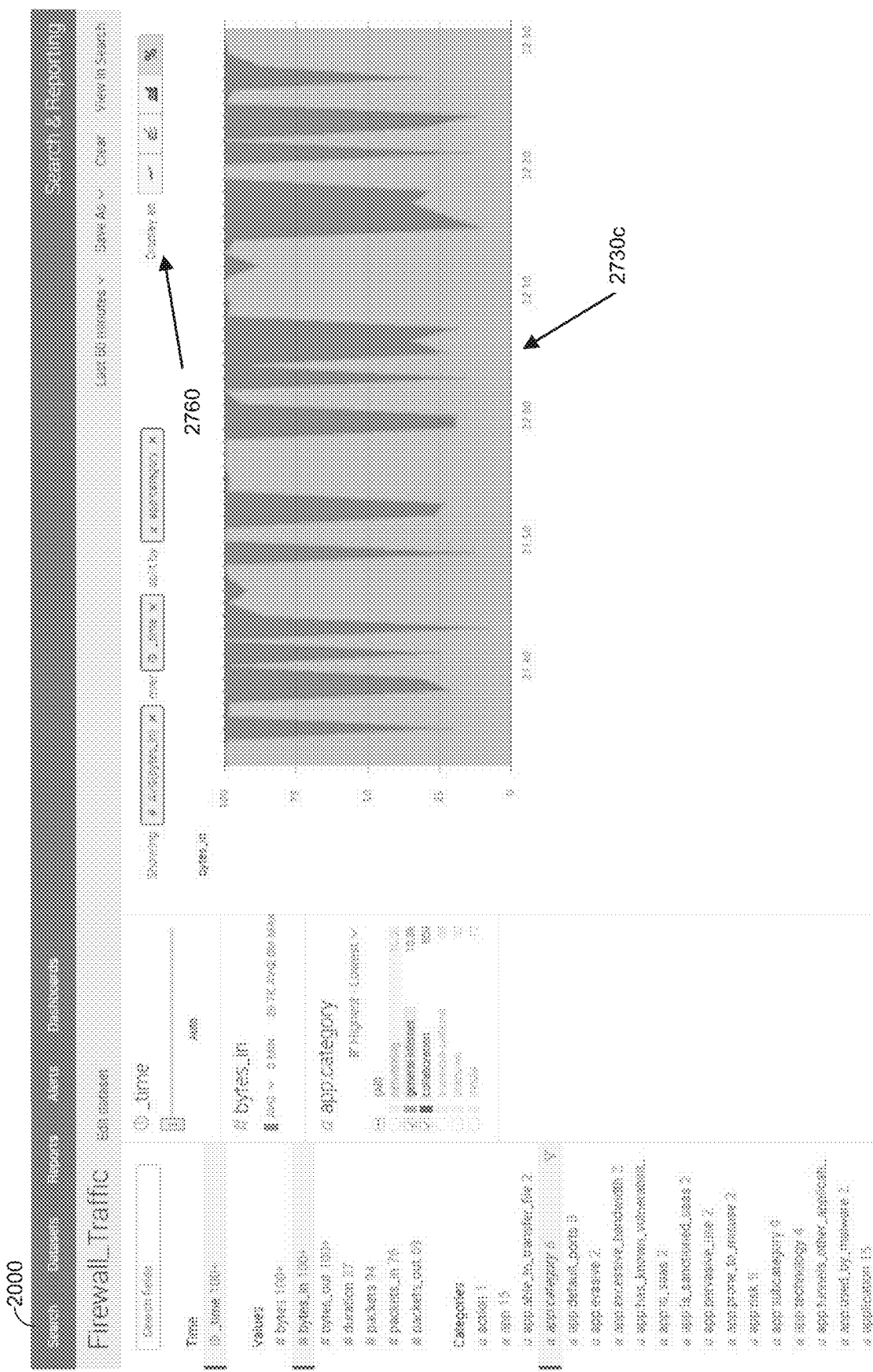

FIGS. 27A-27C show a series of screen captures of example data analysis interface 2000 illustrating features related to the juxtaposition of split time series visualizations. As shown in FIG. 27A, example data analysis interface 2000 may include a juxtaposition option 2760 through which a user can select different options to juxtapose split visualizations. In the example embodiment shown in FIG. 27A, option 2760 is shown as an interactive graphical element that can be toggled between four available juxtaposition options (individual line, overlapping lines, layered cumulative, and percentage. The specific arrangement of option 2760 and the selectable juxtaposition options are examples provided for illustrative purposes and are not to be construed as limiting. Other juxtaposition options may similarly be provided in other embodiments.

Similar to FIGS. 26A-26B, FIG. 27A shows a visualization 2730a of the average incoming bytes, over time, split by application category. The category split has been simplified into a two-way split (i.e. "general internet" and "collaboration") for clarity and to illustrate the juxtaposition options, however similar juxtapositions may be applied in visualizations that are split more than two ways. As mentioned, a user interacting with the screen shown at FIG. 26B could effectuate this two was split by deselecting the "media" value via interactive list 2625b. Note also that the split visualization 2630b shown in FIG. 26B was based on a default juxtaposition option (i.e. multiple graphs including single lines). Returning to FIG. 27A, in response to the user toggling option 2760, the system may dynamically update the visualization to display updated visualization 2730a according to a second juxtaposition option, namely overlaid lines on single graph. As shown in FIG. 27A, the split visualization 2730a now includes two lines that graph the average bytes in over time for traffic associated with each of two application categories (collaboration in blue and general intent in yellow). Note also that, as shown in FIG. 27A in relation to FIGS. 26A-26B, certain visualization parameters (e.g. scale of the y-axis) may be dynamically updated without any input by the user to accommodate the two line graphs. FIG. 27B shows visualization 2730b based on the same underlying data as visualization 2730a, but according to a different juxtaposition option, namely layered cumulative. Similarly FIG. 27C shows a visualization 2730c based on the same underlying data as visualization 2730a, but according to another juxtaposition option, namely percentage-based.

The example features shown in FIGS. 27A-27C are provided for illustrative purposes and are not to be construed as limiting. More or fewer elements (as well as different arrangements of those elements) than are shown in FIGS. 27A-27C may be implemented in other embodiments. Further, the features described with respect to FIGS. 27A-27C (specifically juxtaposition option 2760) do not necessarily appear in all embodiments of the presently described innovations.

Figure 28A:
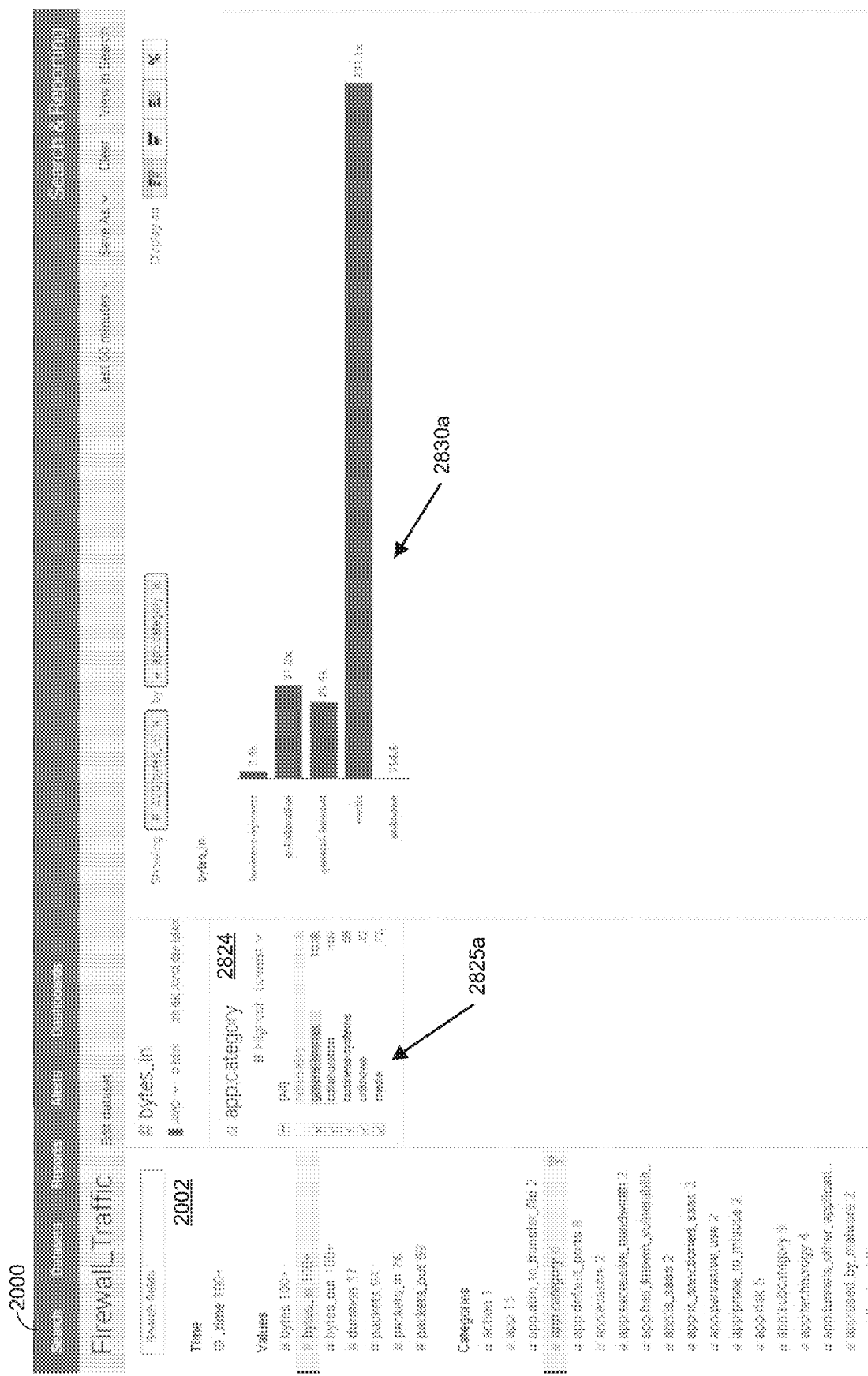
FIGS. 28A-28B show a series of screen captures of example data analysis interface illustrating features related to splits in displayed non-time series visualizations in accordance with the disclosed embodiments.
Figure 28B:
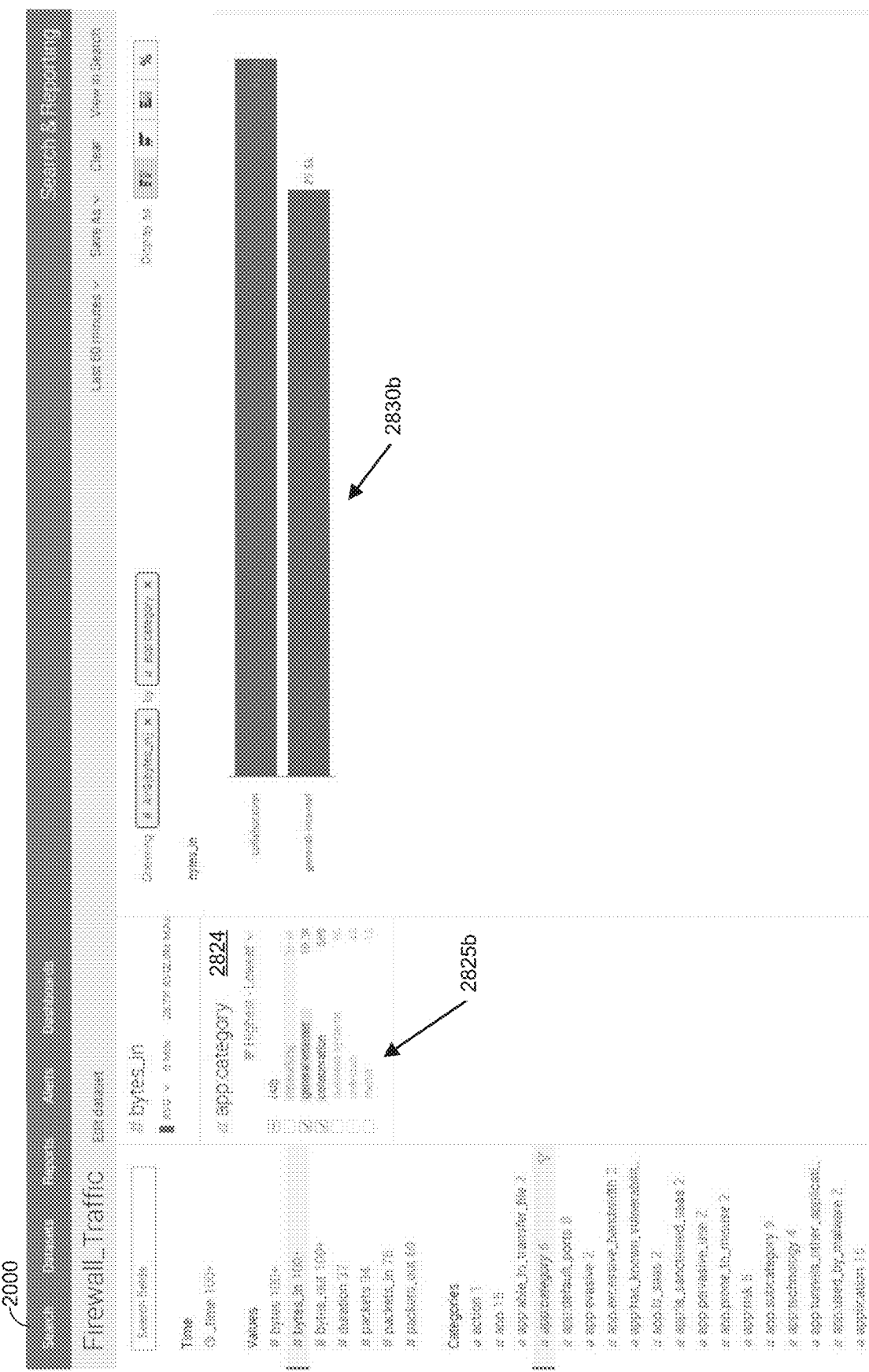

FIGS. 28A-28B show a series of screen captures of example data analysis interface 2000 illustrating features related to splits in displayed non-time series visualizations. The scenario illustrated in FIG. 28A is similar to the scenario illustrated in FIG. 26A, except in FIG. 28A, the "_time" dimension is not selected. Recall that in some embodiments, a visualizations can be displayed as line graphs with time on the x-axis when the "_time" dimension field is selected and as bar charts when the "_time" dimension field is not selected. As shown in FIG. 28A, the user here has selected the "bytes_in" field as well as the "app:category" field by selecting corresponding field identifiers via field picker 2002. Accordingly, in response to the selections, visualization 2830*a* is displayed in the form of a split bar chart. Specifically, the visualization 2830*a* shows the average incoming bytes at a firewall split according to the category of application associated with the traffic. Again this dynamic change in the visualization (e.g. line graph 2630*a* to bar chart 2830*a*) occurs automatically without any input from the user to define parameters of the visualization apart from deselecting the "_time" dimension field. The specific mechanics by which splits are defined according to field values is described with respect to FIGS. 26A-26B and similarly would apply here. Further, similar to as described with respect to FIGS. 26A-26B, a user may elect to filter categorical values (e.g. by using the interactive list 2825*a* of option 2824). For example, in response to a user input via option 2824 deselecting some of the categorical values that occur in "app:category" field, (as indicated by updated list 2825*b*), the system may dynamically update visualization 2830*a* and cause display of updated visualization 2830*b*, now in the form of a two-way split bar chart.

The example features shown in FIGS. 28A-28B are provided for illustrative purposes and are not to be construed as limiting. More or fewer elements (as well as different arrangements of those elements) than are shown in FIGS. 28A-28B may be implemented in other embodiments. Further, the features described with respect to FIGS. 28A-28B (specifically option 2824 and associated lists 2825*a-b*) do not necessarily appear in all embodiments of the presently described innovations.

Figure 29A:
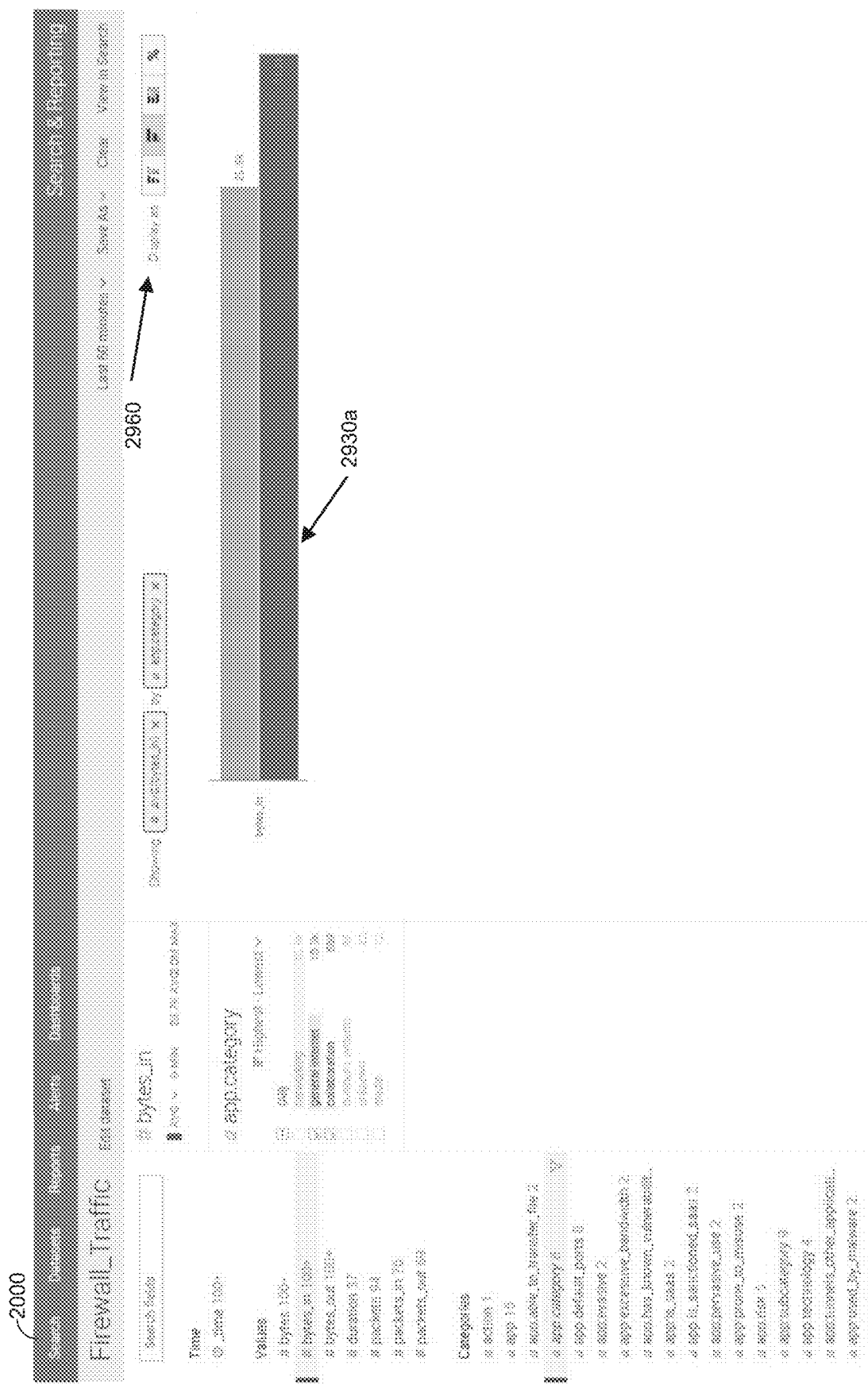
FIGS. 29A-29C show a series of screen captures of an example data analysis interface illustrating features related to the juxtaposition of splits in non-time series visualizations in accordance with the disclosed embodiments.
Figure 29B:
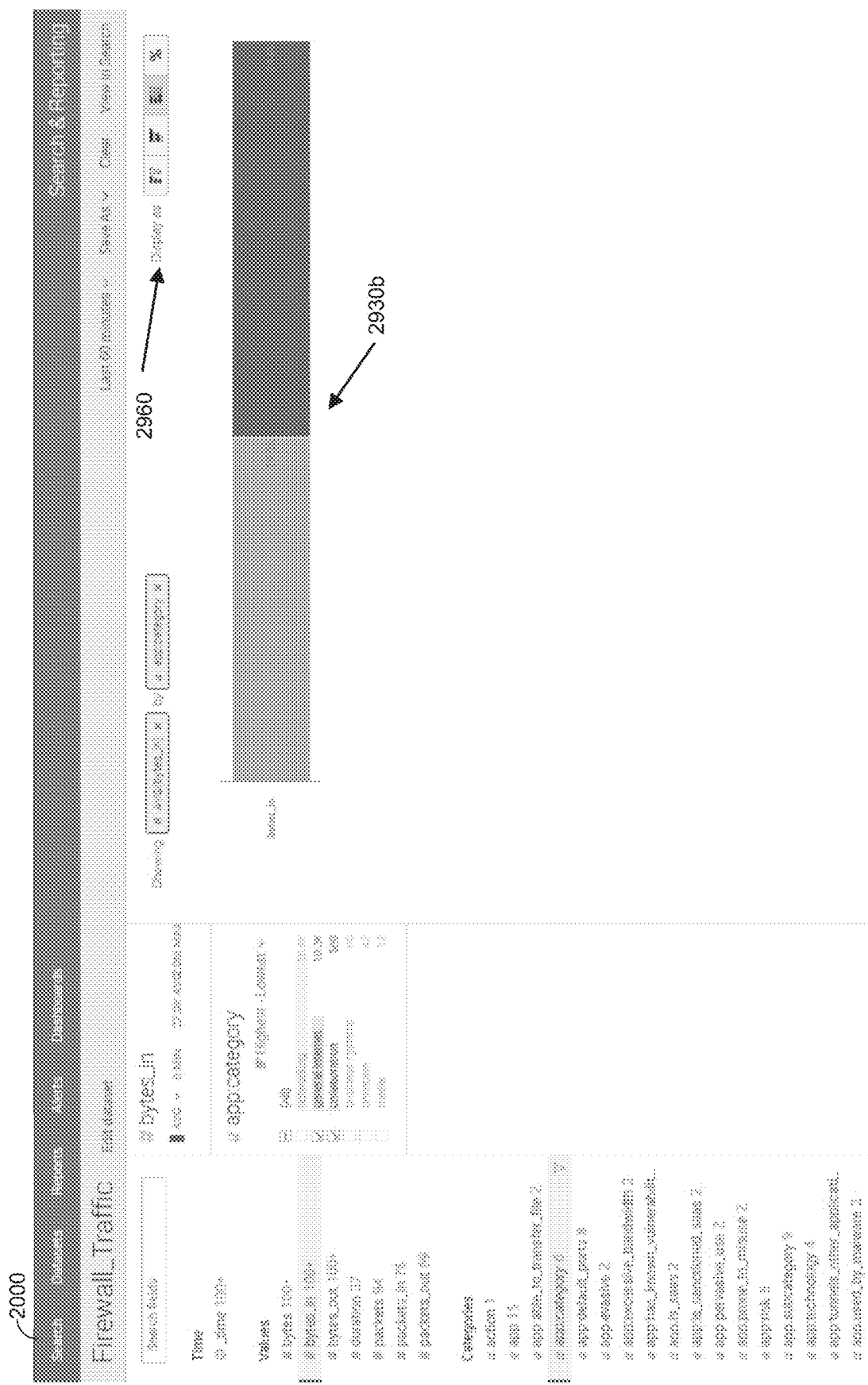
Figure 29C:
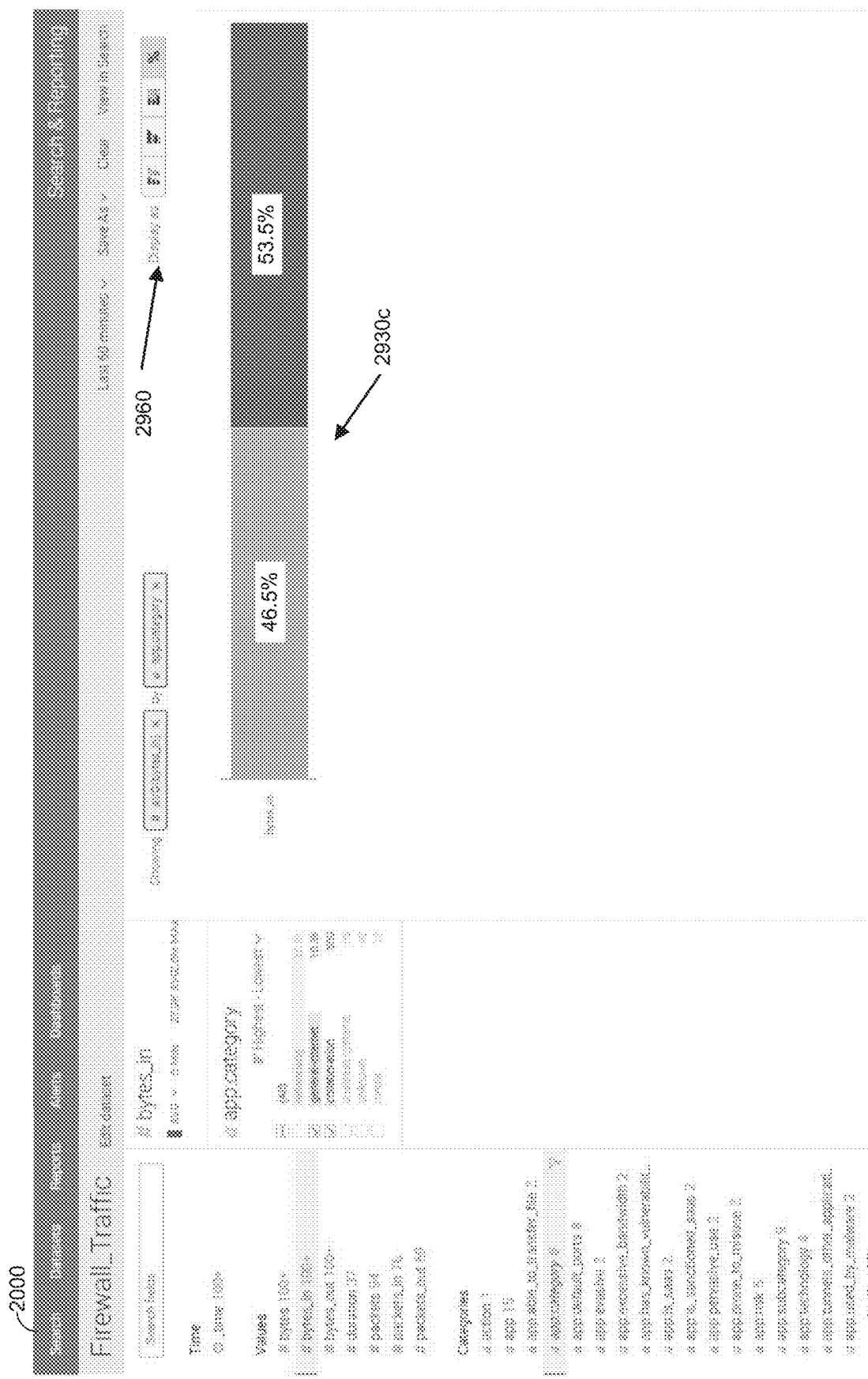

FIGS. 29A-29C show a series of screen captures of example data analysis interface 2000 illustrating features related to the juxtaposition of split non-time series visualizations. The scenario illustrated in FIG. 29A is similar to the scenario illustrated in FIG. 27A, except in FIG. 29A, the "_time" dimension is not selected. Recall that in some embodiments, a visualizations can be displayed as line graphs with time on the x-axis when the "_time" dimension field is selected and as bar charts when the "_time" dimension field is not selected. As shown in FIG. 29A, the user here has selected the "bytes_in" field as well as the "app: category" field by selecting corresponding field identifiers via field picker 2002. Accordingly, in response to the selections, visualization 2930*a* is displayed in the form of a split bar chart. Specifically, the visualization 2930*a* shows the average incoming bytes at a firewall split according to the category of application associated with the traffic. Again this dynamic change in the visualization (e.g. line graph 2730*a* to bar chart 2930*a*) occurs automatically without any input from the user to define parameters of the visualization apart from deselecting the "_time" dimension field. Further, similar to as described with respect to FIGS. 27A-27C, a user may select different juxtaposition options for the displayed bar chart, for example, by interacting with toggling element 2960. For example, according to a first juxtaposition option, split visualization 2930*a* shown in FIG. 29A is displayed as bar chart including two bars (one for each category split). Alternatively, according to a second juxtaposition option, split visualization 2930*b* shown in FIG. 29B is displayed as a bar chart including a cumulative bar including the two categorical splits (i.e. the two bars of visualization 2930*a* stacked on top of each other). Alternatively, according to a third juxtaposition option, split visualization 2930*c* shown in FIG. 29C is displayed as a bar chart including a single bar that reflects the relative percentage of the measure values in each category split. The specific mechanics by juxtaposition options may be selected are described with respect to FIGS. 27A-27C and similarly would apply here.

The example features shown in FIGS. 29A-27C are provided for illustrative purposes and are not to be construed as limiting. More or fewer elements (as well as different arrangements of those elements) than are shown in FIGS. 29A-29C may be implemented in other embodiments. Further, the features described with respect to FIGS. 29A-29C (specifically juxtaposition option 2960) do not necessarily appear in all embodiments of the presently described innovations.

Certain aspects of a data analysis tool such as dataset selection, field selection, aggregation, filtering, time series vs. non-time series, splits, and juxtaposition have been described with respect to FIGS. 19-29C. FIGS. 30A-30G show a series of screen captures of example data analysis interface 2000 following a specific user interaction flow that build on these features to further illustrate the benefits of the presently described innovations.

Figure 30A:
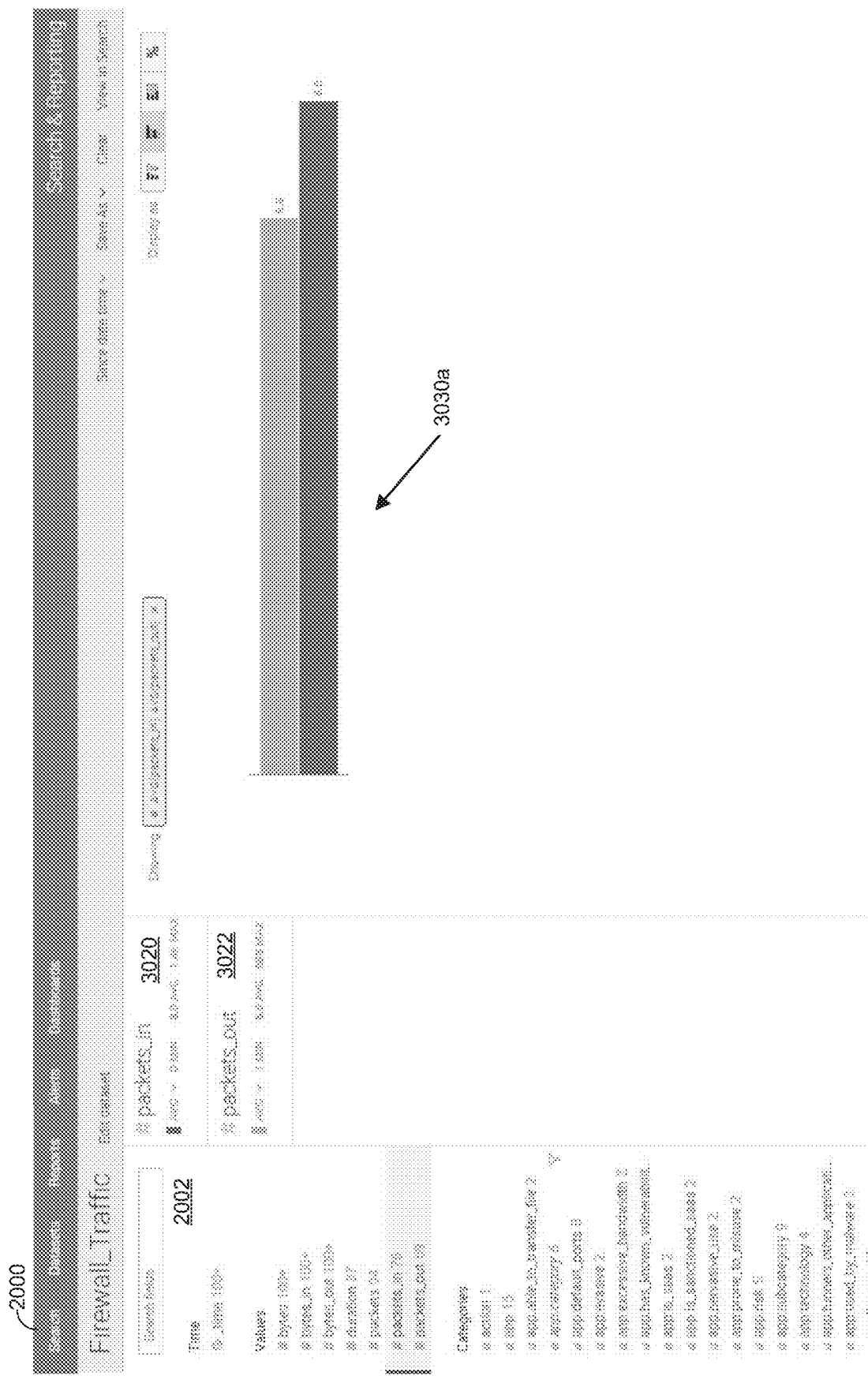
FIGS. 30A-30G show a series of screen captures of user interaction flow through an example data analysis interface in accordance with the disclosed embodiments.

FIG. 30A shows a bar chart visualization 3030*a* that is displayed to a user via interface 2000 in response to user selection of field identifiers via field picker 2002. Specifically, the user here has selected two fields in the "Values" category (i.e. measures) of field picker 2002, "packets_in" and "packets_out." Again, a default aggregation function ("average") is applied to the numerical values included in the selected fields for visualization as indicated by graphical elements 3020 and 3022. Accordingly, the automatically displayed visualization 3030*a* includes two color coded bars (yellow for the average number of outgoing packets (6.6) and blue for the average number of incoming packets (8.0) over a particular time range). Note that these aggregated values for these two measures (6.6 and 8.0) may represent scaled values.

It is worth noting that the two bars in visualization 3030*a* are based on two measures (i.e. bytes in and bytes out) instead of a categorical split of one measure, for example as described with respect to FIG. 29A. Again, the visualization parameters may be automatically defined based on the selected fields. In FIG. 29, a measure field (including numerical values) was selected followed by a categorical field (including literal values). In response, the system automatically determined that the most useful visualization based on those selected fields was likely a chart based on the measure values split according to the categorical values. Here, in FIG. 30A, the user has instead selected two measure fields. Instead of splitting the first measure according to the 69 different unique values (as indicated in field picker 2002 as part of the field identifier) in the subsequently selected measure, the system determined that the most useful visualization (form the user's perspective) is one that includes a bar representing each selected measure.

Figure 30B:
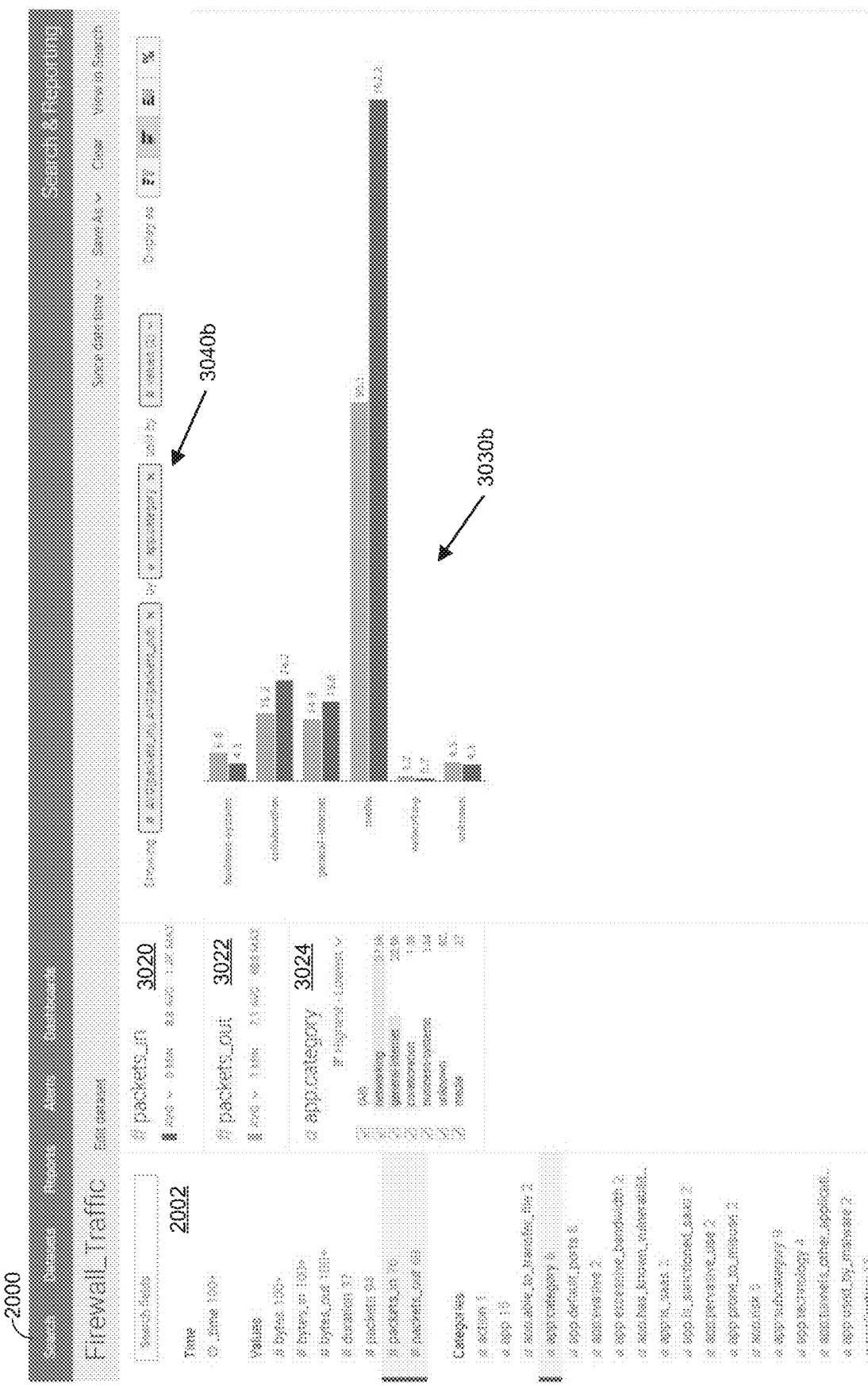

FIG. 30B shows an updated visualization 3030*b* displayed to the user in response to the user subsequently selecting a categorical field, specifically "app:category" via field picker 2002. As suggested by the displayed options 3020, 3022, and 3024, the updated visualization 3030*b* is now based on three selected fields (two measure fields and one categorical field). Accordingly, the resulting visualization 3030*b* displays bars for both the average packets in (in blue) and the average packets out (in yellow) split by the values in the selected categorical field, "app:category." A description of visualization 3030*b* is reflected in an updated editable expression of the visualization 3040*b*, which states "AVG(packets_in), AVG(packets_out), by "app:category," split by "# values (2)" (i.e. split by the two measures for each category). As shown in FIG. 30B, visualization 3030*b* includes a stacked series of color coded bars, each pair (i.e. yellow and blue) representing each measure split by application category.

Based on the information presented in visualization 3030*b*, the user can now see, for example, that by far most of the packets in and out comprise network traffic associated with applications classified as media applications. Again, in contrast to existing reporting tools, which would have required the user to strictly define all of the visualization parameters (e.g. which measures to visualize, how to split visualizations, how to color code visualization, etc.), the user has quickly arrived at an actionable insight through three simple interactions, specifically the selection three field identifiers listed in field picker 2002.

Figure 30C:
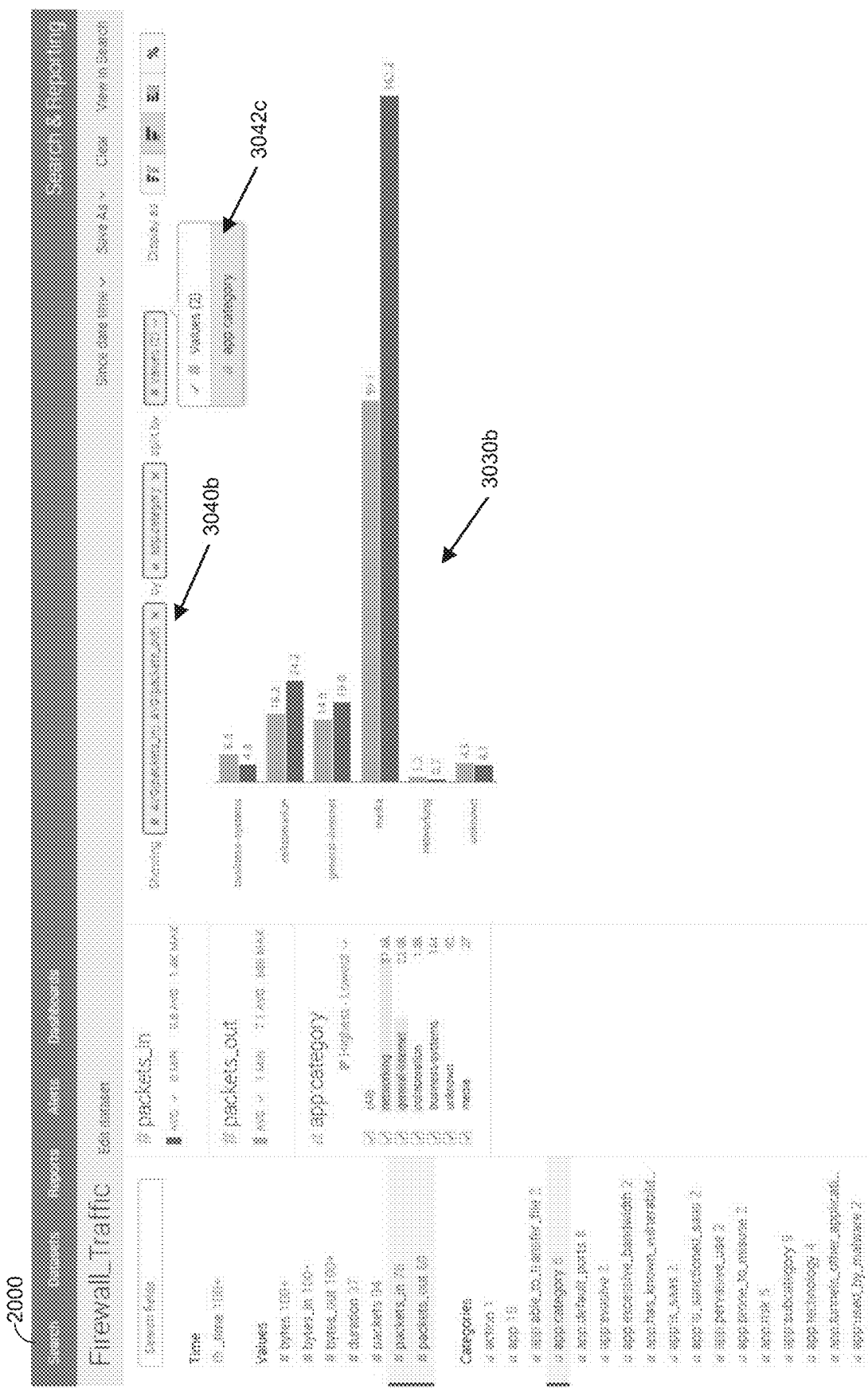
Figure 30D:
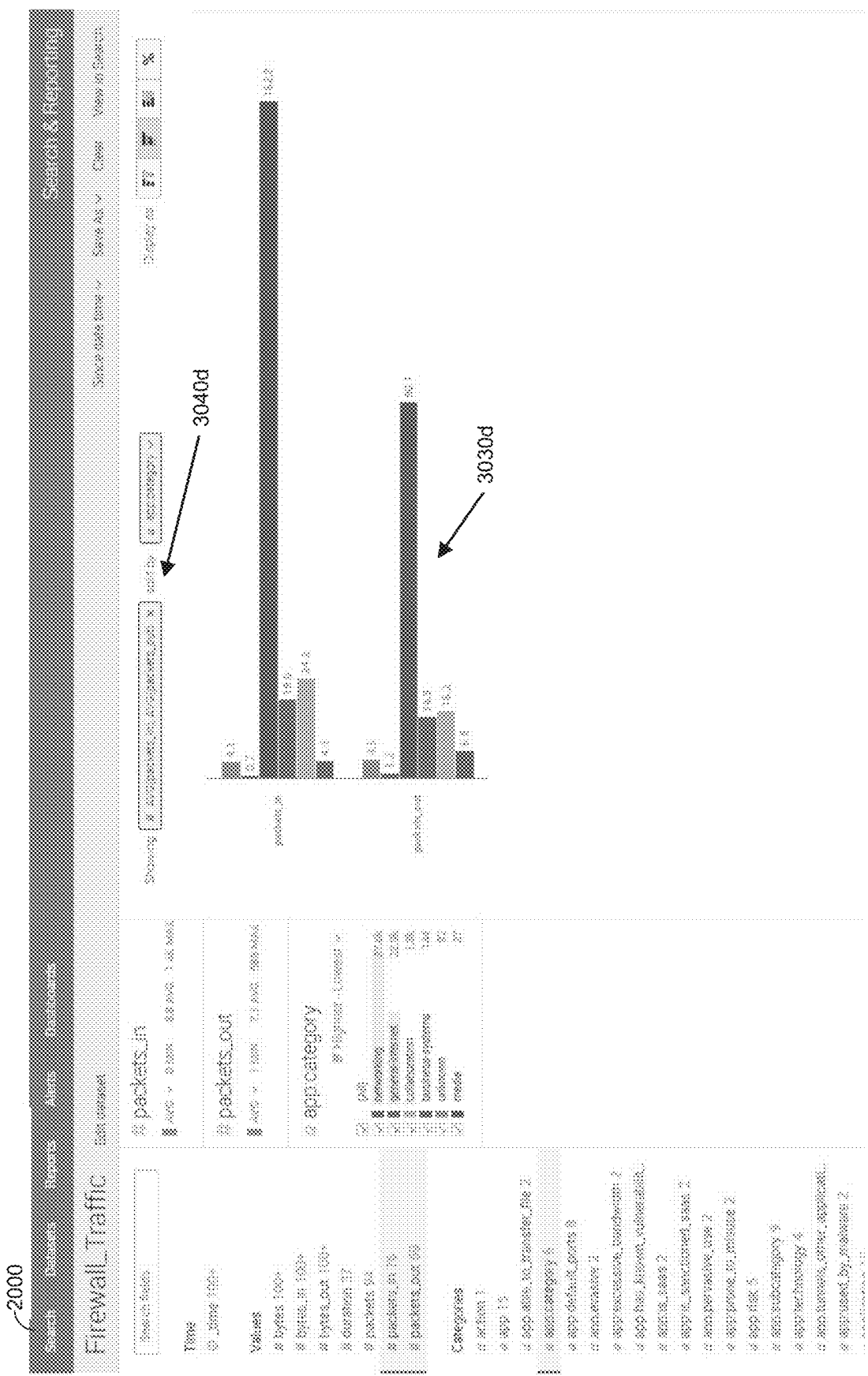

As previously alluded to, a displayed literal expression of a given visualization is in some cases editable by the user to, for example, modify splits in a particular visualization. For example, as shown in FIG. 30C, in response to a user selection of one of the elements in the literal expression 3040*b* (e.g. "# values (2)"), the system may cause display of an option 3042*c* to modify (e.g. via a pull down menu) the selected element in the literal expression. For example, as shown in FIG. 30C, visualization 3030*b* is currently split by "# values(2)" however the use may elect to instead split by "app:category." Updated visualization 3030*d* shown in FIG. 30D is an example result of such an election. As expressed in updated literal expression 3030*d*, visualization 3030*d* is now shows AVG(packets_in), AVG(packets_out) split by "app:category." For example as shown, updated visualization 3030*d* shows five color coded categorically split (by app category) bar charts for each measure (average packets in and average packets out).

Figure 30E:
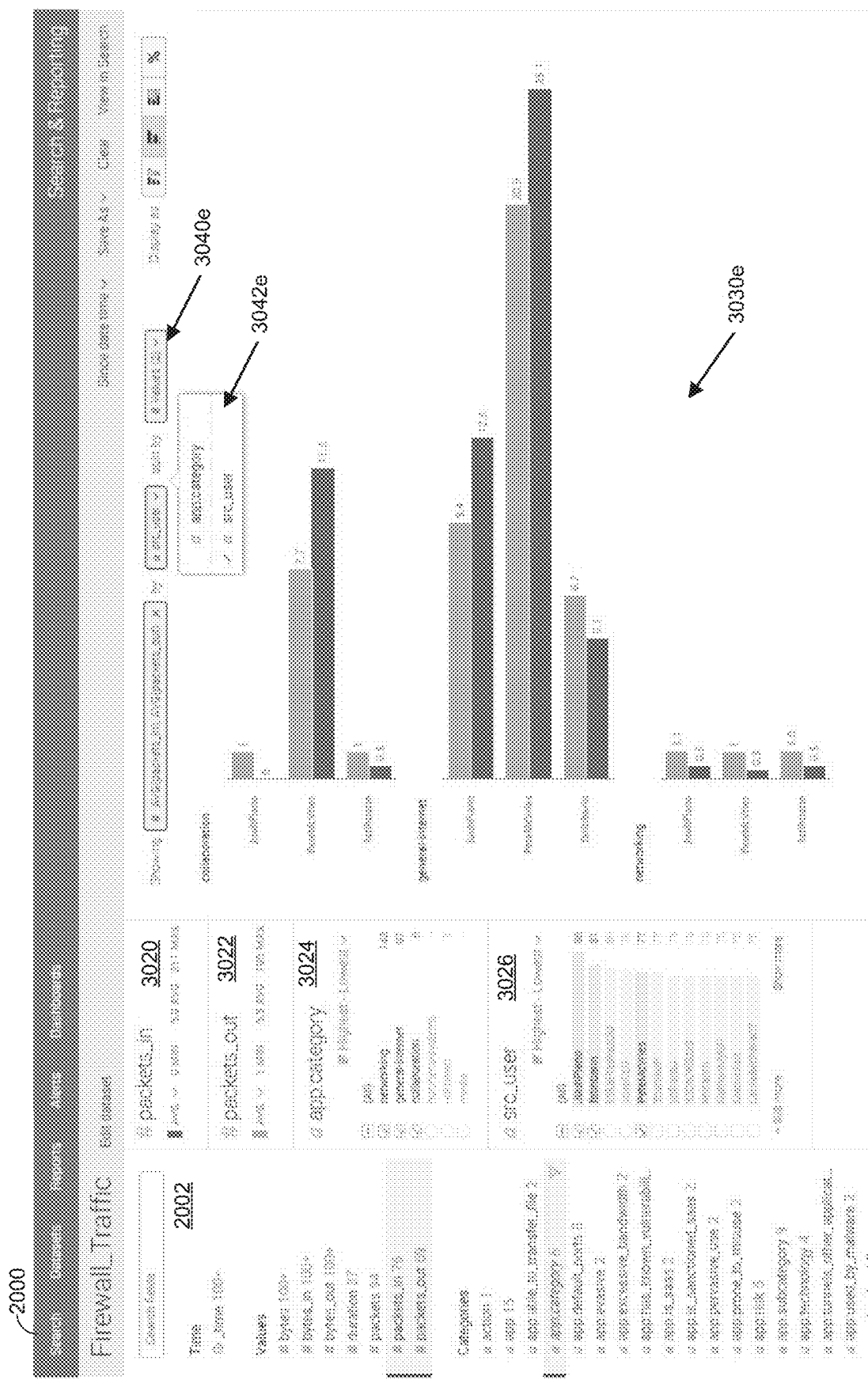

To further explore a data set and uncover additional insights, a user can continue to select additional fields. For example, FIG. 30E shows an example updated visualization 3030*e* that may be displayed in response to a user selection of a fourth field. As shown in FIG. 30E, a user has additionally selected a fourth field, "src_user" that includes categorical literal values referencing specific user names. For example, as indicated by graphical elements 3020, 3022, 3024, and 3026, the updated visualization 3030*e* is now based on two measure fields (packets_in and packets_out) as and two category fields (app:category and src_user). Note that the two category fields have filters applied (e.g. as indicated by elements 3024 and 3026) to simplify the resulting visualization 3030*e* for clarity. As shown in FIG. 30E, the resulting visualization 3030*e* now includes color coded bar charts of the two measures (i.e. avg. packets_in and avg. packets_out) for each selected use (i.e. selected value in the "src_user" field), split by the selected application categories (i.e. by the selected values in the "app:category" field). Based on the information presented in visualization 3030*e*, the user can now see, for example, that for a given time frame, applications classified as "general internet" are associated with heavier network traffic that applications classified as "collaboration" or "networking." The user can further see that certain users (e.g. Peter McVries) may be associated with heavier traffic in certain application categories.

Figure 30F:
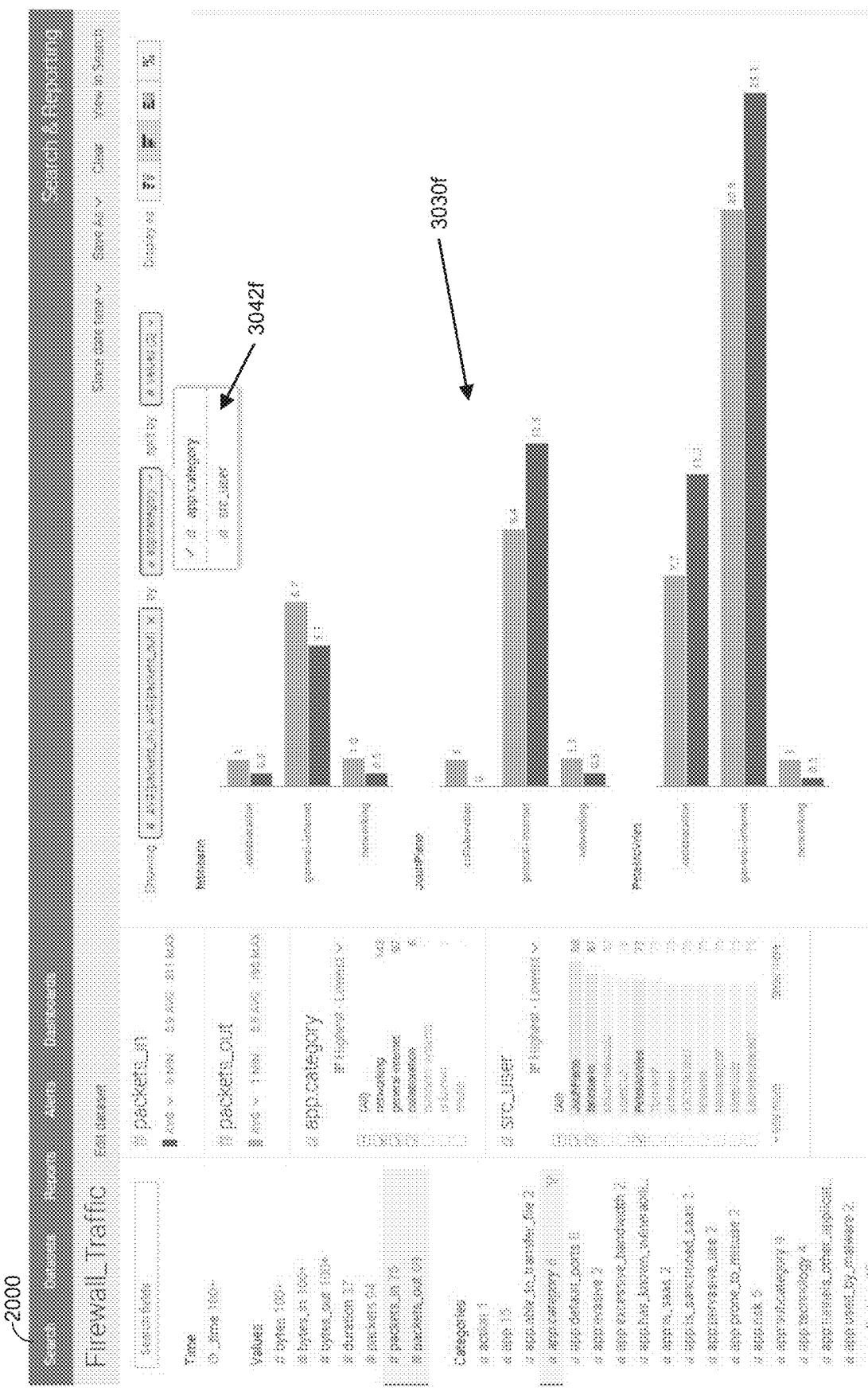
Figure 30G:
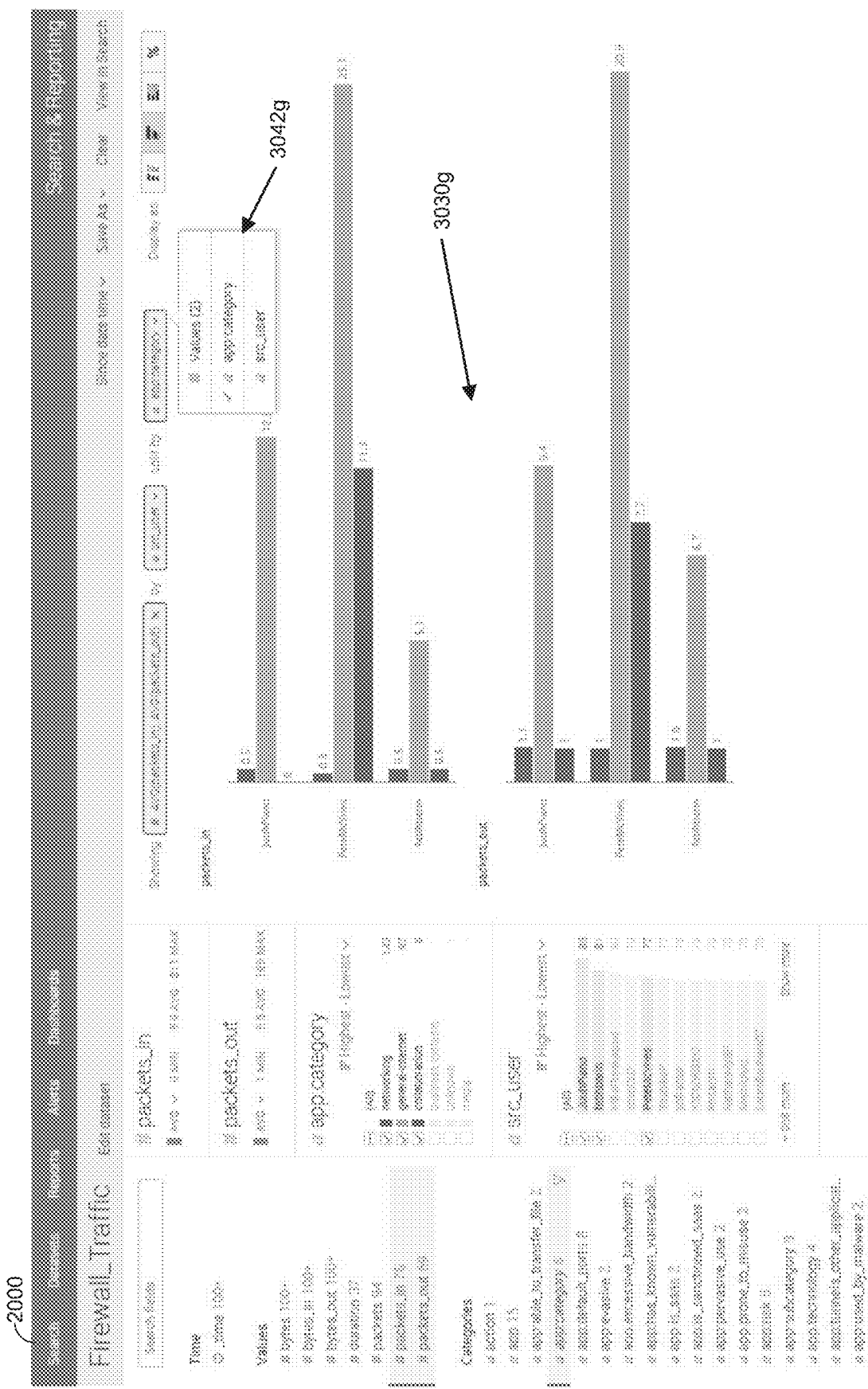

Again, similar to literal expression 3040*b* described with respect to FIGS. 30B and 30C, updated visualization 3030*e* may correspond to an updated literal expression 3040*e*. For example, as shown in FIG. 30E, updated literal expression 3040*e* now shows AVG(packets_in), AVG(packets_out), by "src_user" split by "# values (2)." Further similar to as described with respect to FIGS. 30B and 30C, the system may cause display of options to modify (e.g. via a pull down menu) select elements in the literal expression. For example, as shown in FIG. 30F, a user as selected, via option 3042*f*, to change the literal expression to AVG(packets_in), AVG (packets_out), by "app:category" split by "# values (2)," thereby causing display of an updated visualization 3030*f*. Similarly, as shown in FIG. 30G, a user as selected, via option 3042*g*, to change the literal expression to AVG (packets_in), AVG(packets_out), by "src_user" split by "app:category," thereby causing display of an updated visualization 3030*g*.

The user interaction flow through interface 2000 described with respect to FIGS. 30A-30G has been provided to further illustrate the exploratory nature of data analysis that may be possible using one or more of the features of a data analysis tool, according to some embodiments. More or fewer elements (as well as different arrangements of those elements) than are shown in FIGS. 30A-30G may be implemented in other embodiments. Further, the features described with respect to FIGS. 30A-30G do not necessarily appear in all embodiments of the presently described innovations.

For clarity the visualizations via the data analysis interface 2000 have been described with respect to FIGS. 21A-30G in the form of bar charts and line graphs (e.g. based on whether a time dimension field is selected). However, these example visualization types (ad their basis of selection) are examples and not to be construed as limiting. In some embodiments, other visualization types (e.g. pie charts, Sankey diagrams, scatter plots, maps, network diagrams, etc.) may be implemented to provide analytical insight to a user. For example, in some embodiments, a data analysis tool may dynamically update the manipulable visualization to be a geographical map in response to selection by a user of a field identifier referencing a field including location values (e.g. location names, coordinates, etc.). As another example, a data analysis tool may dynamically update the manipulable visualization to be a network diagram in response to selection by a user of a field identifier referencing a field including network entity identifiers (e.g. IP addresses, device UIDs, etc.).

Figure 31:
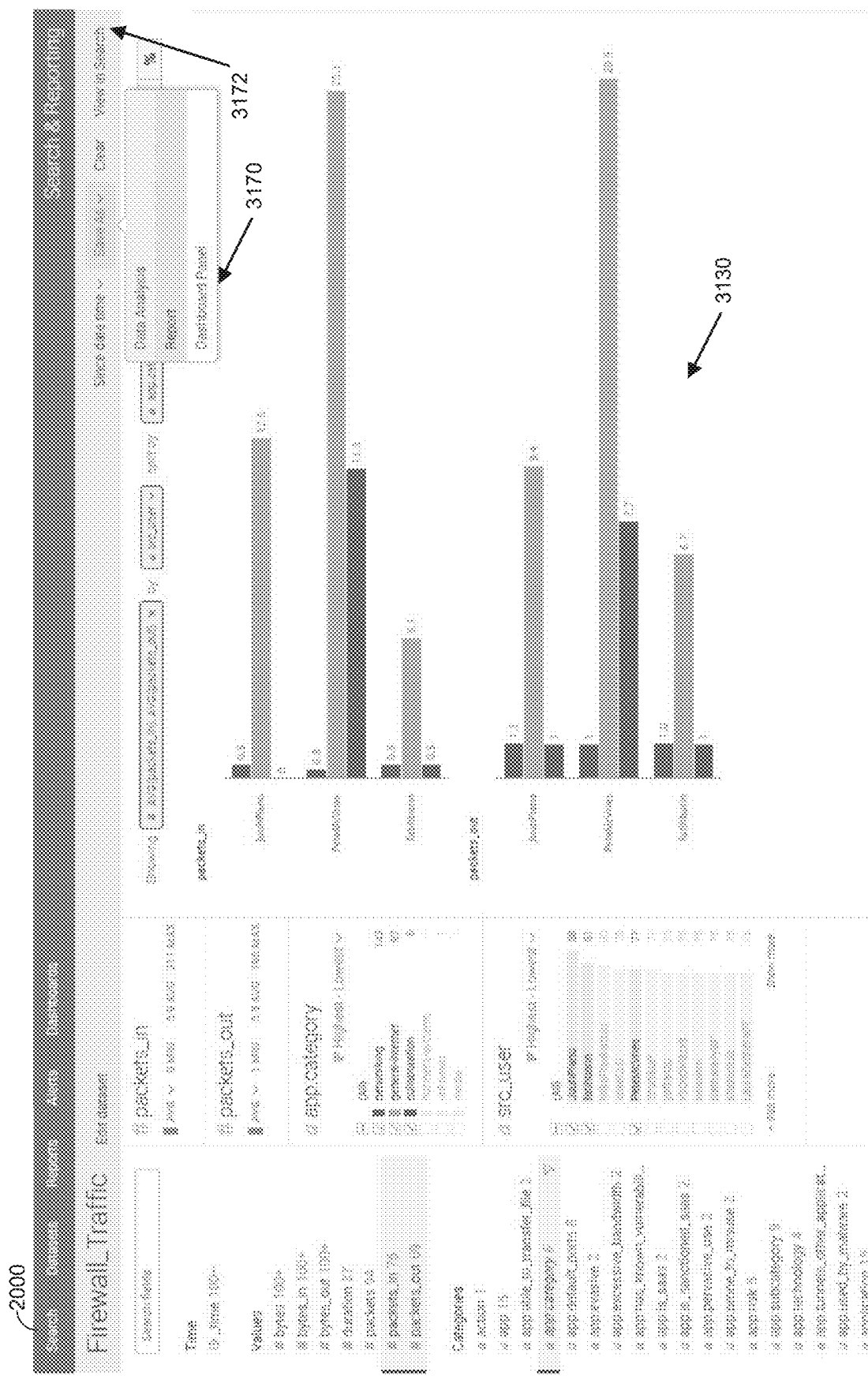
FIG. 31 shows a screen capture of an example data analysis interface illustrating options to save an analysis of a dataset in accordance with the disclosed embodiments.

As shown in FIG. 31, in some embodiments, example interface 2000 may further include an option 3170 to save a particular visualization 3130 as any of a saved state of the data analysis tool (i.e. set of field selections, etc.), a report, or a dashboard panel.

Figure 32:
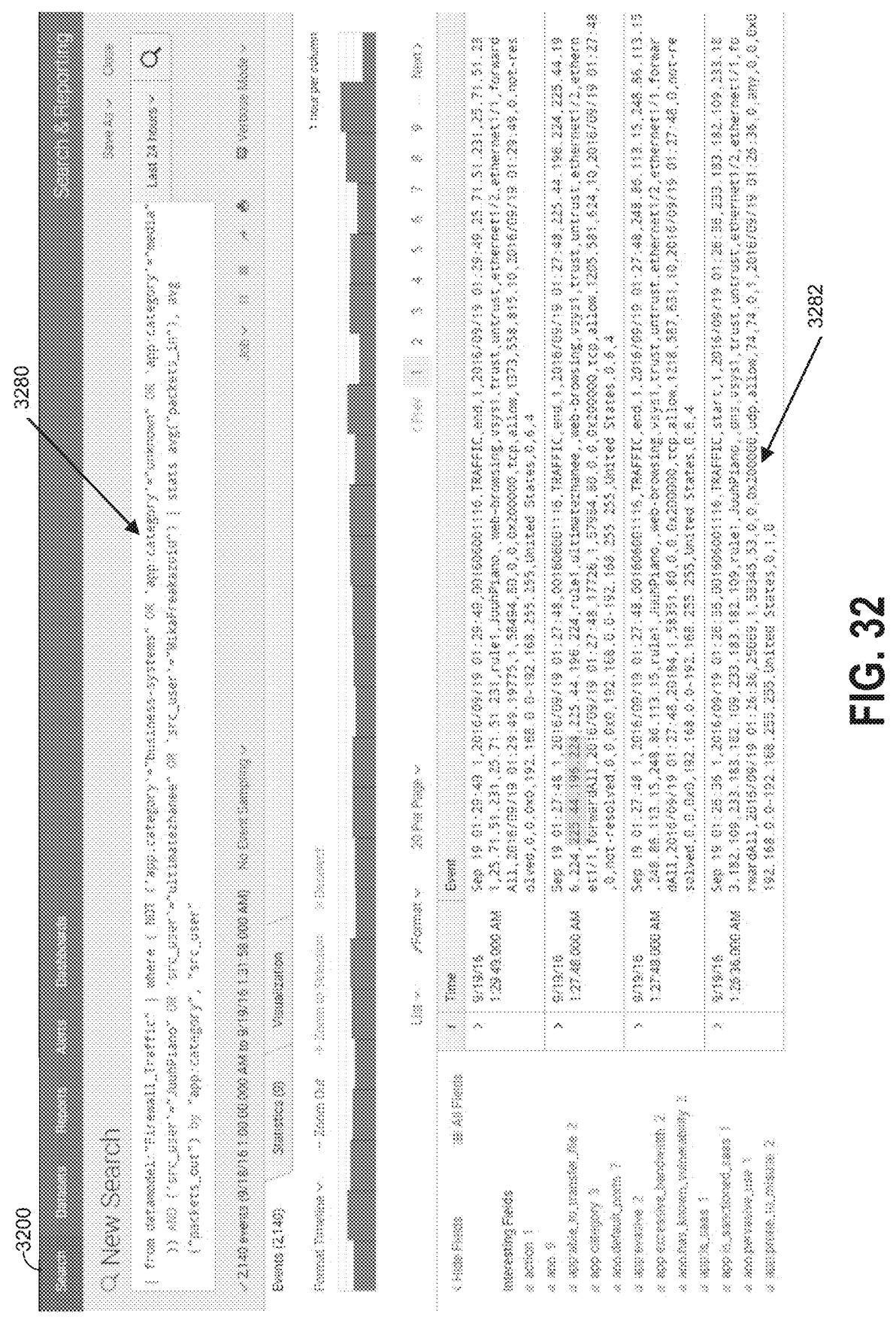

Also as shown in FIG. 31, in some embodiments, example interface 2000 may include an option 3172 to view the particular visualization 3130 as search query. As previously described, in some embodiments, each iteration of a visualization displayed via interface 2000 can correspond to a search query expressed in a query language (e.g. SPL). For example in response to a user selecting option 3172 to view visualization 3130 in search, the system may cause display of search screen 3200 as shown in FIG. 32 (for example the same or similar to search screen 600 shown in FIG. 6A) that includes a generated search query expressed in a query language (e.g. SPL) 3280 that corresponds to the selected fields, aggregation functions, filters, etc. upon which visualization 3130 is based. The search query may be automatically generated for the user in the particular query language. If desired, a user can then edit the search query 3280 to further dig into the data. In some embodiments, search screen 3200 may further include an events list 3283 that includes a listing of events (and in some cases raw and/or processed machine data included in the events) that satisfy a criteria of the generated search query 3280.

4.0 Computer Processing System

Figure 33:
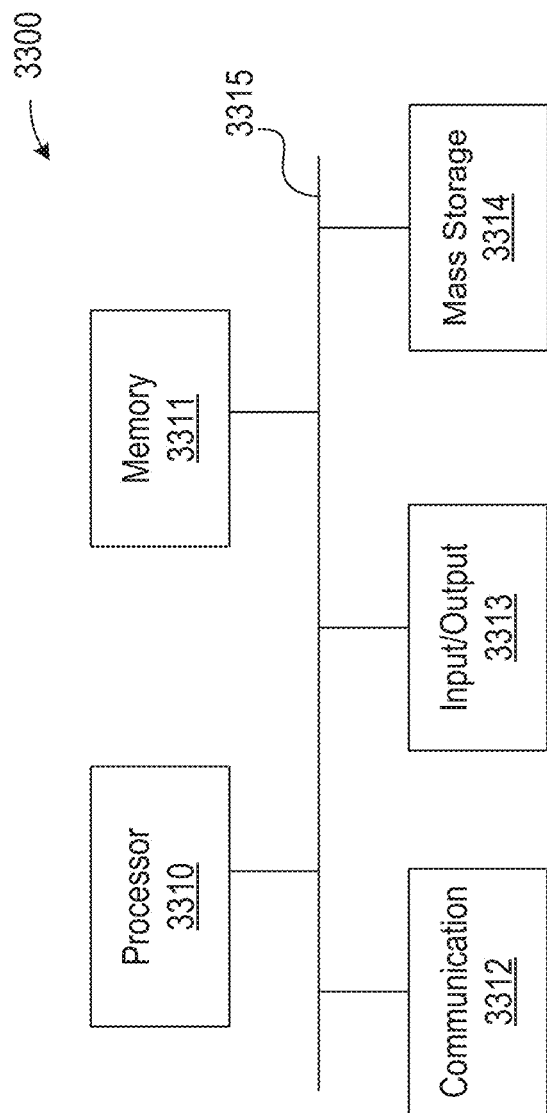
FIG. 33 shows high-level example of a hardware architecture of a processing system that can be used to implement the disclosed techniques.

FIG. 33 shows a high-level example of a hardware architecture of a processing system that can be used to implement any one or more of the functional components referred to above (e.g., the data analysis tool, forwarders, indexer, search head, data store, etc.). One or multiple instances of an architecture such as shown in FIG. 33 (e.g., multiple computers) can be used to implement the techniques described herein, where multiple such instances can be coupled to each other via one or more networks.

The illustrated processing system 3300 includes one or more processors 3310, one or more memories 3311, one or more communication device(s) 3312, one or more input/output (I/O) devices 3313, and one or more mass storage devices 3314, all coupled to each other through an interconnect 3315. The interconnect 3315 may be or include one or more conductive traces, buses, point-to-point connections, controllers, adapters and/or other conventional connection devices. Each processor 3310 controls, at least in part, the overall operation of the processing device 3300 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 3311 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 3314 can be or include one or more hard drives, digital versatile disks (DVDs), flash memories, or the like. Each memory 3311 and/or mass storage 3314 can store (individually or collectively) data and instructions that configure the processor(s) 3310 to execute operations to implement the techniques described above. Each communication device 3312 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 3300, each I/O device 3313 can be or include a device such as a display (which may be a touch screen display), audio speaker, keyboard, mouse or other pointing device, microphone, camera, etc. Note, however, that such I/O devices may be unnecessary if the processing device 3300 is embodied solely as a server computer.

In the case of a user device, a communication device 3312 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 3312 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, comprising:
    causing display of an interactive field picker element in a graphical user interface (GUI), the interactive field picker element including a set of interactive field identifiers, wherein each interactive field identifier in the set of interactive field identifiers references a corresponding field of a set of fields in a set of events returned in response to a search query, and wherein each event in the set of events includes a time-stamped portion of raw machine data reflecting activity of a component in an information technology (IT) environment;
    receiving, via the interactive field picker element, a plurality of selections, each of the plurality of selections corresponding to a different one of the interactive field identifiers in the interactive field picker element; and
    in response to each selection of the plurality of selections:
        generating an updated search query based on the selection, wherein the updated search query includes a search criterion based on a field referenced by an interactive field identifier corresponding to the selection;
        executing the updated search query; and
        receiving an updated set of events in response to execution of the updated search query.

2. The method of claim 1, further comprising:
    causing display, in the GUI, of an editable expression of the updated search query in a query language.

3. The method of claim 1, further comprising:
    causing display, in the GUI, of an editable expression of the updated search query in a query language;
    enabling editing of the displayed editable expression of the updated search query; and
    updating at least the search criterion of the updated search query based on an edit to the displayed editable expression of the updated search query.

4. The method of claim 1, wherein the updated search query is in Splunk Processing Language (SPL).

5. The method of claim 1,
    wherein the plurality of selections include:
        a first selection of a first interactive field identifier from the interactive field picker element; and
        a second selection of a second interactive field identifier from the interactive field picker element;
    wherein generating the updated search query in response to each of the plurality of selections includes:
        generating a first updated search query in response to the first selection, wherein the first updated search query includes a first search criterion based on a first field referenced by the first interactive field identifier; and
        generating a second updated search query in response to the second selection, wherein the second updated search query includes a second search criterion based on a second field referenced by the second interactive field identifier;
    wherein the first search criterion comprises a first command based on the first selection;
    wherein the second search criterion comprises a second command based on the second selection;

wherein the second command operates on a result of the first command; and wherein the second updated search query further comprises a symbol that separates the first command and the second command.

6. The method of claim 1,
wherein the set of interactive field identifiers include a first interactive field identifier and a second interactive field identifier;
wherein the first field identifier corresponds to a first field present in the set of events,
wherein the second field identifier corresponds to a second field present in the set of events;
wherein the first field has a first field type; and
wherein the second field has a second field type.

7. The method of claim 1, further comprising:
causing display of data corresponding to the updated set of events received in response to execution of the updated search query.

8. The method of claim 1,
wherein the set of interactive field identifiers include a first interactive field identifier and a second interactive field identifier;
wherein the first interactive field identifier references a first field associated with a first type of event represented in a first data format; and
wherein the second interactive field identifier references a second field associated with a second type of event represented in a second data format.

9. The method of claim 1,
wherein the set of events include a first type of event and a second type of event;
wherein the first type of event is generated by a first data source; and
wherein the second type of event is generated by a second data source.

10. The method of claim 1, wherein the search query includes an extraction rule for a field included in the search query.

11. The method of claim 1, further comprising:
analyzing the updated search query to identify a first portion of the updated search query and a second portion of the updated search query;
wherein executing the updated search query includes:
distributing the first portion of the updated search query or the second portion of the updated search query to an indexer.

12. The method of claim 1, wherein receiving the updated set of events includes:
identifying a parameter of the updated search query;
using the parameter, obtaining a superset of the updated set of events by querying one or more indexers; and
producing the updated set of events by filtering the superset of the updated set of events.

13. The method of claim 1, wherein the updated search query identifies at least one of an aggregation function and a filter applied to the set of events.

14. A computer system comprising:
a processing unit; and
a storage device having instructions stored thereon, which when executed by the processing unit cause the computer system to:
cause display of an interactive field picker element in a graphical user interface (GUI), the interactive field picker element including a set of interactive field identifiers, wherein each interactive field identifier in the set of interactive field identifiers references a corresponding field of a set of fields in a set of events returned in response to a search query, and wherein each event in the set of events includes a time-stamped portion of raw machine data reflecting activity of a component in an information technology (IT) environment;
receive, via the interactive field picker element, a plurality of selections, each of the plurality of selections corresponding to a different one of the interactive field identifiers in the interactive field picker element; and
in response to each selection of the plurality of selections:
generate an updated search query based on the selection, wherein the updated search query includes a search criterion based on a field referenced by an interactive field identifier corresponding to the selection;
execute the updated search query; and
receive an updated set of events in response to execution of the updated search query.

15. The computer system of claim 14, wherein the instructions, when executed by the processing unit, further cause the computer system to:
cause display, in the GUI, of an editable expression of the updated search query in a query language.

16. The computer system of claim 14, wherein the instructions, when executed by the processing unit, further cause the computer system to:
cause display, in the GUI, of an editable expression of the updated search query in a query language;
enable editing of the displayed editable expression of the updated search query; and
update at least the search criterion of the updated search query based on an edit to the displayed editable expression of the updated search query.

17. The computer system of claim 14, wherein the updated search query is in Splunk Processing Language (SPL).

18. The computer system of claim 14,
wherein the plurality of selections include:
a first selection of a first interactive field identifier from the interactive field picker element; and
a second selection of a second interactive field identifier from the interactive field picker element;
wherein generating the updated search query in response to each of the plurality of selections includes:
generating a first updated search query based on the first selection, wherein the first updated search query includes a first search criterion based on a first field referenced by the first interactive field identifier; and
generating a second updated search query based on the second selection, wherein the second updated search query includes a second search criterion based on a second field referenced by the second interactive field identifier;
wherein the first search criterion comprises a first command based on the first selection;
wherein the second search criterion comprises a second command based on the second selection;
wherein the second command operates on a result of the first command; and
wherein the second updated search query further comprises a symbol that separates the first command and the second command.

19. The computer system of claim 14, wherein the instructions, when executed by the processing unit, further cause the computer system to:
cause display of data corresponding to the updated set of events received in response to execution of the updated search query.

20. A non-transitory computer-readable medium containing instructions, execution of which in a computer system causes the computer system to:
cause display of an interactive field picker element in a graphical user interface (GUI), the interactive field picker element including a set of interactive field identifiers, wherein each interactive field identifier in the set of interactive field identifiers references a corresponding field of a set of fields in a set of events returned in response to a search query, and wherein each event in the set of events includes a time-stamped portion of raw machine data reflecting activity of a component in an information technology (IT) environment;
receive, via the interactive field picker element, a plurality of selections, each of the plurality of selections corresponding to a different one of the interactive field identifiers in the interactive field picker element; and
in response to each selection of the plurality of selections:
generate an updated search query based on the selection, wherein the updated search query includes a search criterion based on a field referenced by an interactive field identifier corresponding to the selection;
execute the updated search query; and
receive an updated set of events in response to execution of the updated search query.

21. The non-transitory computer-readable medium of claim 20, wherein the instructions, execution of which in the computer system, further cause the computer system to:
cause display, in the GUI, of an editable expression of the updated search query in a query language.

22. The non-transitory computer-readable medium of claim 20, wherein the instructions, execution of which in the computer system, further cause the computer system to:
cause display, in the GUI, of an editable expression of the updated search query in a query language;
enable editing of the displayed editable expression of the updated search query; and
update at least the criterion of the updated search query based on an edit to the displayed editable expression of the updated search query.

23. The non-transitory computer-readable medium of claim 20, wherein the query language is Splunk Processing Language (SPL).

24. The non-transitory computer-readable medium of claim 20,
wherein the plurality of selections include:
a first selection of a first interactive field identifier from the interactive field picker element; and
a second selection of a second interactive field identifier from the interactive field picker element;
wherein generating an updated search query in response to each of the plurality of selections includes:
generating a first updated search query based on the first selection, wherein the first updated search query includes a first search criterion based on a first field referenced by the first interactive field identifier; and
generating a second updated search query based on the second selection, wherein the second updated search query includes a second search criterion based on a second field referenced by the second interactive field identifier;
wherein the first search criterion comprises a first command based on the first selection;
wherein the second search criterion comprises a second command based on the second selection;
wherein the second command operates on a result of the first command; and
wherein the second updated search query further comprises a symbol that separates the first command and the second command.

25. The non-transitory computer-readable medium of claim 20, wherein the instructions, execution of which in the computer system, further cause the computer system to:
cause display of data corresponding to the updated set of events received in response to execution of the updated search query.

26. The non-transitory computer-readable medium of claim 20, wherein the instructions, execution of which in the computer system, further cause the computer system to:
analyze the updated search query to identify a first portion of the updated search query and a second portion of the updated search query;
wherein executing the updated search query includes:
distributing-the first portion of the updated search query or the second portion of the updated search query to an indexer.

27. The non-transitory computer-readable medium of claim 20, wherein receiving the updated set of events includes:
identifying a parameter of the updated search query;
using the parameter, obtaining a superset of the updated set of events by querying one or more indexers; and
producing the updated set of events by filtering the superset of the updated set of events.

* * * * *